United States Patent
Oh et al.

(10) Patent No.: US 11,303,826 B2
(45) Date of Patent: Apr. 12, 2022

(54) METHOD AND DEVICE FOR TRANSMITTING/RECEIVING METADATA OF IMAGE IN WIRELESS COMMUNICATION SYSTEM

(71) Applicant: LG ELECTRONICS INC., Seoul (KR)

(72) Inventors: Sejin Oh, Seoul (KR); Sooyeon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/964,308

(22) PCT Filed: Jan. 31, 2019

(86) PCT No.: PCT/KR2019/001352
§ 371 (c)(1),
(2) Date: Jul. 23, 2020

(87) PCT Pub. No.: WO2019/151798
PCT Pub. Date: Aug. 8, 2019

(65) Prior Publication Data
US 2020/0351449 A1    Nov. 5, 2020

Related U.S. Application Data

(60) Provisional application No. 62/624,121, filed on Jan. 31, 2018.

(51) Int. Cl.
*H04N 5/265* (2006.01)
*H04L 67/131* (2022.01)

(52) U.S. Cl.
CPC ............ *H04N 5/265* (2013.01); *H04L 67/38* (2013.01)

(58) Field of Classification Search
USPC .......................................... 348/36
See application file for complete search history.

(56) References Cited

U.S. PATENT DOCUMENTS

| | | | | |
|---|---|---|---|---|
| 2013/0121525 | A1* | 5/2013 | Chen ............... | G06T 3/0062 382/100 |
| 2016/0086378 | A1* | 3/2016 | Shuster ............ | G06F 3/012 345/633 |
| 2017/0358126 | A1* | 12/2017 | Lim ............... | H04N 13/243 |
| 2018/0063505 | A1* | 3/2018 | Lee ................ | G06T 9/00 |
| 2018/0075635 | A1* | 3/2018 | Choi .............. | H04N 5/23238 |
| 2018/0332265 | A1* | 11/2018 | Hwang ............. | H04N 13/156 |
| 2019/0158813 | A1* | 5/2019 | Rowell ............ | H04N 13/189 |

(Continued)

FOREIGN PATENT DOCUMENTS

| | | |
|---|---|---|
| KR | 101268508 B1 | 6/2013 |
| KR | 101630108 B1 | 6/2016 |

(Continued)

*Primary Examiner* — Behrooz M Senfi
(74) *Attorney, Agent, or Firm* — Dentons US LLP

(57) ABSTRACT

A communication method for an image transmission device in a wireless communication system, in accordance with the present invention, comprises the steps of: acquiring information on at least one image for which stitching is to be performed; generating metadata for the stitching, on the basis of the information on the at least one image; and transmitting the metadata for the stitching to an image reception device.

8 Claims, 43 Drawing Sheets

(56) References Cited

U.S. PATENT DOCUMENTS

2019/0356899 A1* 11/2019 Oh ..................... H04N 21/2343
2019/0379876 A1* 12/2019 Hur ..................... H04N 13/194
2019/0394444 A1* 12/2019 Oh ...................... H04N 13/194

FOREIGN PATENT DOCUMENTS

| KR | 1020170055930 A | 5/2017 |
| KR | 1020170101575 A | 9/2017 |
| KR | 101820359 B1 | 1/2018 |

* cited by examiner

FIG. 8
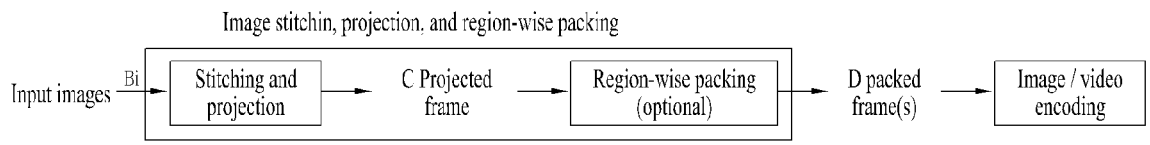
(a)
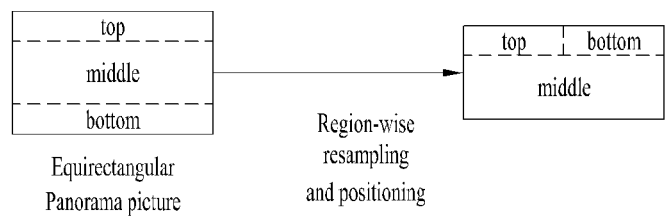
(b)
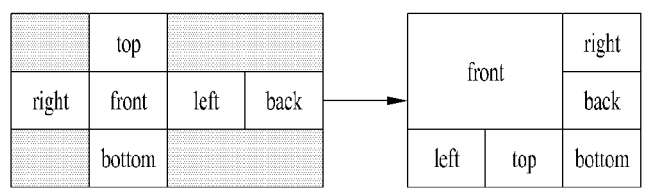
(c)
| Projections | 3D Model | 2D Projection | Vertexes |
|---|---|---|---|
| Tetrahedron (4 faces) | | | 4 |
| Cube (6 faces) | | | 8 |
| Octahedron (8 faces) | | | 6 |
| Dodecahedron (12 faces) | | | 20 |
| Icosahedron (20 faces) | | | 12 |
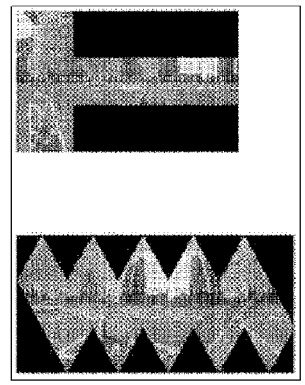
(d)

FIG. 9a
(a) 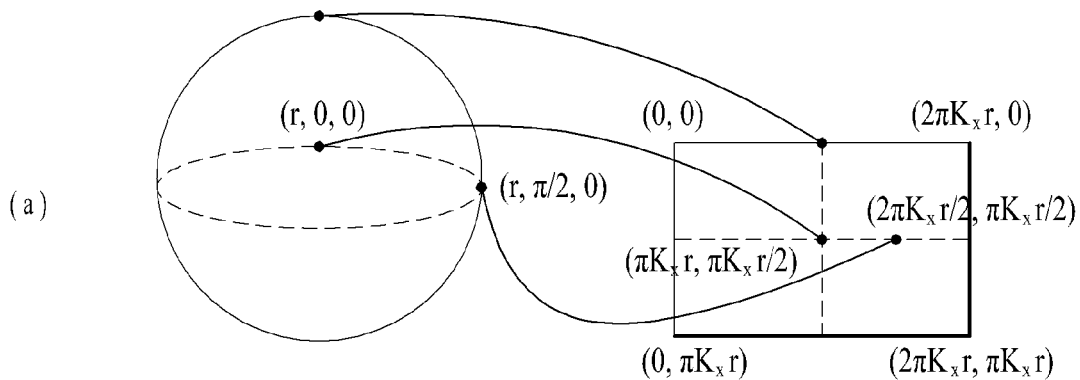
(b) 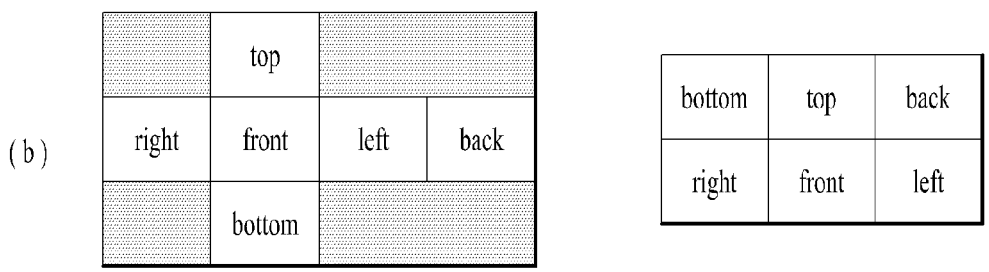
(c) 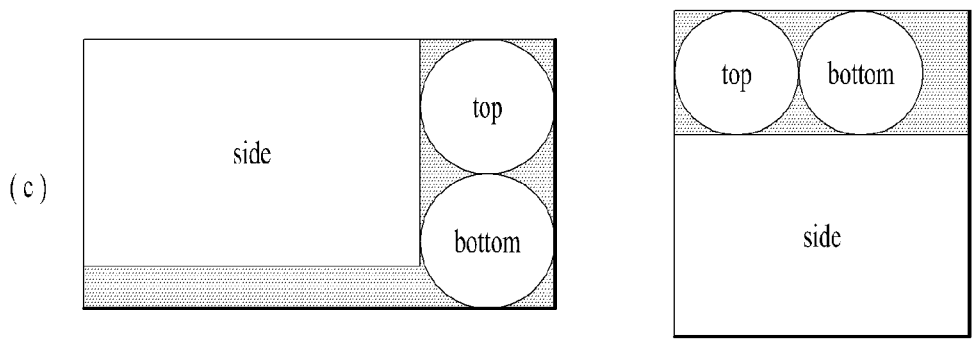
(d) 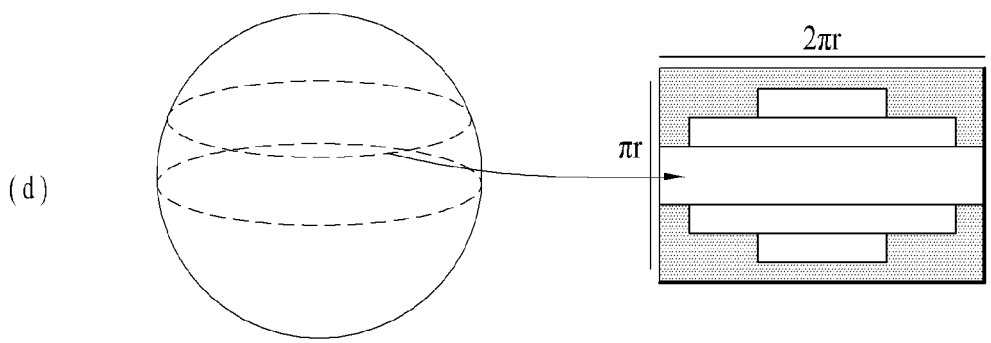

FIG. 9b
(e) 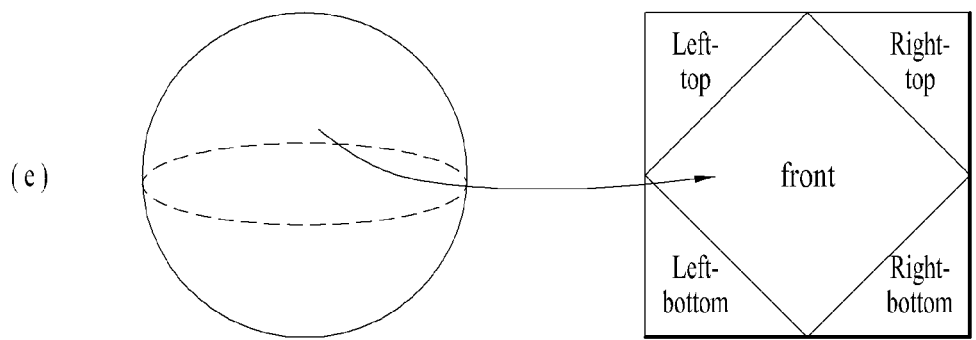
(f) 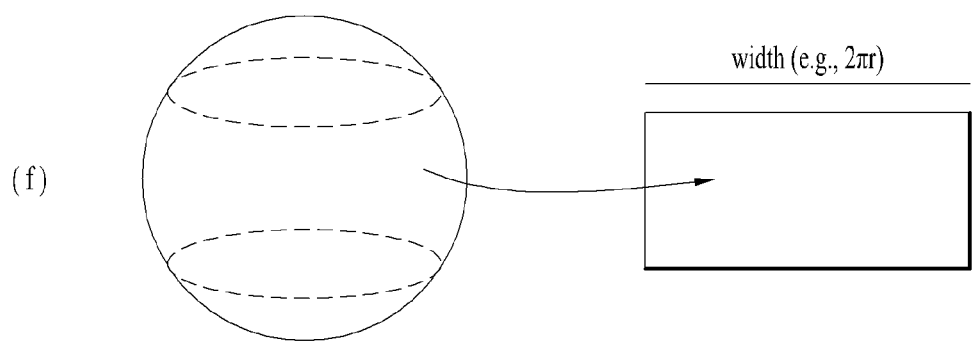
(g) 

FIG. 11

```
...
        < Default metadata >
unsigned    int(8)      vr_geometry;
unsigned    int(8)      projection_schme;
     < Stereoscopic related metadata >
unsigned    int(1)      is_stereoscopic;
unsigned    int(3)      stereo_mode;
      < Initial View related metadata >
signed      int(8)      initial_view_yaw_degree;
signed      int(8)      initial_view_pitch_degree;
signed      int(8)      initial_view_roll_degree;
         < ROI related metadata >
unsigned int(1)         2d_roi_range_flag;
unsigned int(1)         3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
     < Field Of View related metadata >
unsigned int(1)         content_fov_flag;
if (content_fov_flag==1) {
  unsigned int(16)      content_fov;
}
     < Cropped Region related metadata >
unsigned int(1)         is_copped_region;
if (content_fov_flag==1) {
  unsigned int(16)      cr_region_left_top_x;
  unsigned int(16)      cr_region_left_top_y;
  unsigned int(16)      cr_region_width;
  unsigned int(16)      cr_region_height;
}
...
```

METHOD AND DEVICE FOR TRANSMITTING/RECEIVING METADATA OF IMAGE IN WIRELESS COMMUNICATION SYSTEM

This application is the National Stage filing under 35 U.S.C. 371 of International Application No. PCT/KR2019/001352 filed Jan. 31, 2019, which claims the benefit of U.S. Provisional Application No. 62/624,121 filed Jan. 31, 2018, the contents of which are all hereby incorporated by reference herein in their entirety.

TECHNICAL FIELD

The present disclosure relates to metadata about an image, and more particularly, to a method and apparatus for transmitting and receiving metadata about an image in a wireless communication system.

BACKGROUND ART

A virtual reality (VR) system allows a user to experience an electronically projected environment. The system for providing VR content may be further improved to provide higher quality images and stereophonic sound. The VR system may allow a user to interactively consume VR contents.

With the increasing demand for VR or AR content, there is an increasing need for a method of efficiently signaling information about an image for generating VR content between terminals, between a terminal and a network (or server), or between networks.

DISCLOSURE

Technical Problem

An object of the present disclosure is to provide a method and apparatus for transmitting and receiving metadata about an image in a wireless communication system.

Another object of the present disclosure is to provide a terminal or network (or server) for transmitting and receiving metadata about stitching of an image in a wireless communication system, and an operation method thereof.

Another object of the present disclosure is to provide an image reception apparatus for processing an image while transmitting/receiving metadata about the image to/from at least one image reception apparatus, and an operation method thereof.

Another object of the present disclosure is to provide an image reception apparatus for transmitting and receiving metadata about an image to/from at least one image reception apparatus based on at least one acquired image, and an operation method thereof.

Technical Solution

In one aspect of the present disclosure, provided herein is a method for performing communication by an image transmission apparatus in a wireless communication system. The method may include acquiring information about at least one image to be stitched, generating metadata about the stitching based on the information about the at least one image, and transmitting the metadata about the stitching to an image reception apparatus.

In another aspect of the present disclosure, provided herein is an image transmission apparatus for performing communication in a wireless communication system. The image transmission apparatus may include an image acquirer configured to acquirer information about at least one image to be stitched, and a network interface configured to generate metadata about the stitching based on the information about the at least one image and to transmit the metadata about the stitching to an image reception apparatus.

In another aspect of the present disclosure, provided herein is a method for performing communication by an image reception apparatus in a wireless communication system. The method may include receiving image information and metadata about stitching from at least one image transmission apparatus, and processing the image information based on the metadata about the stitching, wherein, when the stitching is not performed by the at least one image transmission apparatus, the image information may include information about at least one non-stitched image, wherein, when the stitching is performed by the at least one image transmission apparatus, the image information may include information about a 360 video generated by stitching the at least one non-stitched image, wherein the metadata about the stitching may contain at least one of information about image processing of the at least one image transmission apparatus, capability information about the at least one non-stitched image, information about a case when a partial coverage function is available, information about a case when a synchronization function is available, characteristics information about at least one camera for acquiring the at least one non-stitched image, information about a case when the stitching is available, information about a case when packing is available, information about a case when region-wise packing is available, or information about a case when a fisheye-related function is available.

In another aspect of the present disclosure, provided herein is an image reception apparatus for performing communication in a wireless communication system. The image reception apparatus may include a network interface configured to receive image information and metadata about stitching from at least one image transmission apparatus, and an image processor configured to process the image information based on the metadata about the stitching, wherein, when the stitching is not performed by the at least one image transmission apparatus, the image information comprises information about at least one non-stitched image, wherein, when the stitching is performed by the at least one image transmission apparatus, the image information may include information about a 360 video generated by stitching the at least one non-stitched image, wherein the metadata about the stitching may contain at least one of information about image processing of the at least one image transmission apparatus, capability information about the at least one non-stitched image, information about a case when a partial coverage function is available, information about a case when a synchronization function is available, characteristics information about at least one camera for acquiring the at least one non-stitched image, information about a case when the stitching is available, information about a case when packing is available, information about a case when region-wise packing is available, or information about a case when a fisheye-related function is available.

Advantageous Effects

In accordance with the present disclosure, information about stitching of images may be efficiently signaled between terminals, between a terminal and a network (or server), or between networks.

In accordance with the present disclosure, VR content may be efficiently signaled between terminals, between a terminal and a network (or server), or between networks in a wireless communication system.

In accordance with the present disclosure, 3DoF, 3DoF+ or 6DoF media information may be efficiently signaled between terminals, between a terminal and a network (or server), or between networks in a wireless communication system.

In accordance with the present disclosure, in providing a streaming service for a 360 video, information related to stitching may be signaled when network-based stitching for uplink is performed.

In accordance with the present disclosure, in providing a streaming service for a 360 video, information about some regions may be signaled when network-based stitching for uplink is performed.

In accordance with the present disclosure, in providing a streaming service for a 360 video, multiple streams for uplink may be packed into one stream and signaled.

In accordance with the present disclosure, even when a streaming service for a 2D or fisheye video other than a 360 video, signaling for uplink may be performed.

In accordance with the present disclosure, in providing a streaming service for 2D and immersive audio, signaling for uplink may be performed.

In accordance with the present disclosure, in providing 3D image/video streaming service for a 360 video, information about packing and information about a video type may be signaled for uplink.

In accordance with the present disclosure, SIP signaling for negotiation between a FLUS source and a FLUS sink may be performed for a 360 video uplink service.

In accordance with the present disclosure, in providing a streaming service for a 360 video, necessary information may be signaled between a FLUS source and a FLUS sink for uplink.

In accordance with the present disclosure, in providing a streaming service for a 360 video, necessary information may be generated between a FLUS source and a FLUS sink for uplink.

DESCRIPTION OF DRAWINGS

FIG. 8 exemplarily illustrates a 2D image to which a 360 video processing process and a projection format-based region-wise packing process are applied.

FIGS. 9A and 9B exemplarily show projection formats in accordance with some embodiments.

FIG. 11 shows an example of 360-degree video-related metadata in accordance with some embodiments.

BEST MODE

Figure 1:
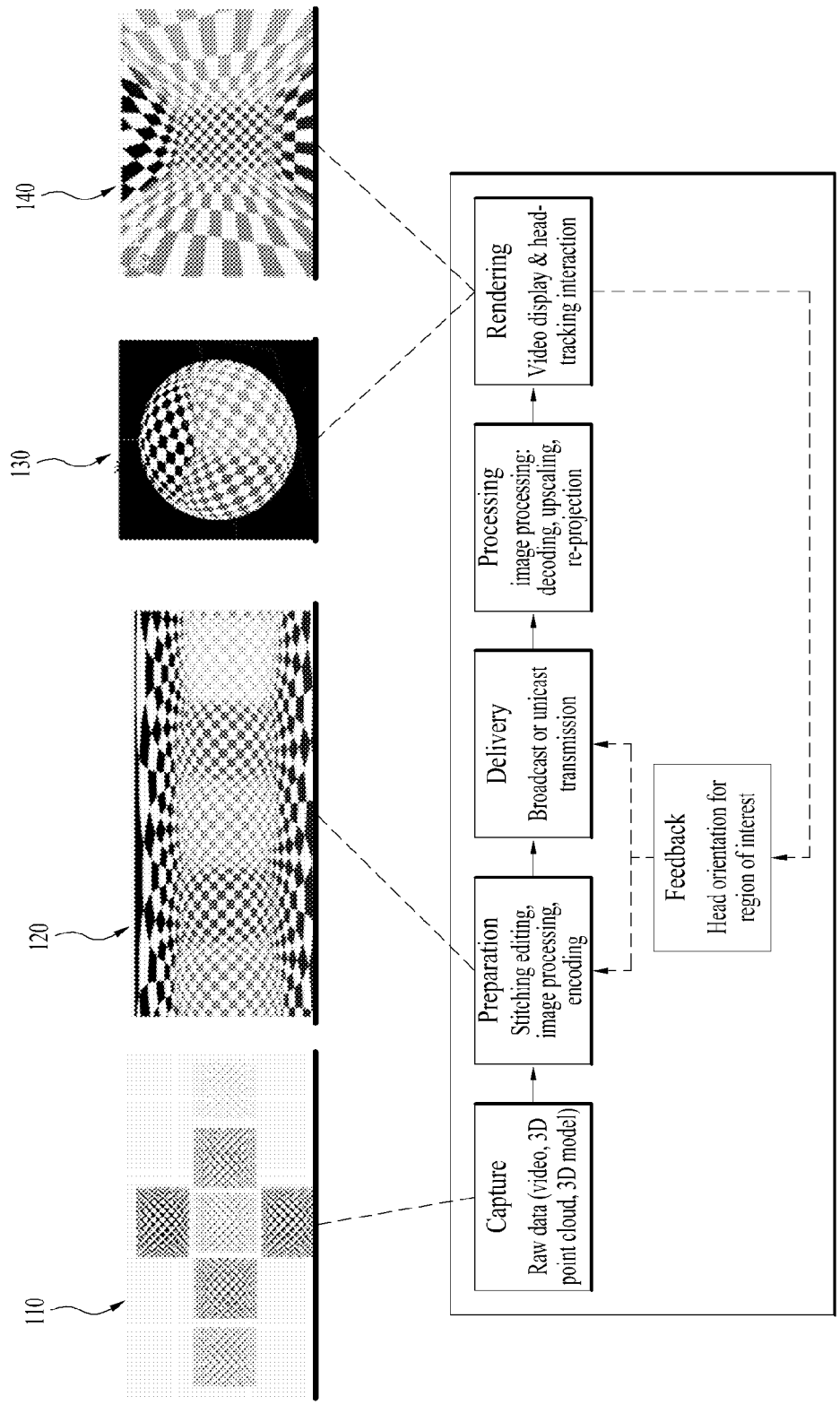
FIG. 1 is a diagram showing an overall architecture for providing 360 content in accordance with some embodiments.

In accordance with some embodiments of the present disclosure, provided herein is a method for performing communication by an image transmission apparatus in a wireless communication system. The method may include acquiring information about at least one image to be stitched, generating metadata about the stitching based on the information about the at least one image, and transmitting the metadata about the stitching to an image reception apparatus.

MODE

The technical features described below may be used in a communication standard by the 3rd generation partnership project (3GPP) standardization organization, or a communication standard by the institute of electrical and electronics engineers (IEEE) standardization organization. For example, communication standards by the 3GPP standardization organization may include long term evolution (LTE) and/or evolution of LTE systems. Evolution of the LTE system may include LTE-A (advanced), LTE-A Pro and/or 5G new radio (NR). A wireless communication device in accordance with some embodiments of the present disclosure may be applied to, for example, a technology based on SA4 of 3GPP. The communication standard by the IEEE standardization organization may include a wireless local area network (WLAN) system such as IEEE 802.11a/b/g/n/ac/ax. The above-described systems may be used for downlink (DL)-based and/or uplink (UL)-based communications.

The present disclosure may be subjected to various changes and may have various embodiments, and specific embodiments will be described in detail with reference to the accompanying drawings. However, this is not intended to limit the disclosure to the specific embodiments. Terms used in this specification are merely adopted to explain specific embodiments, and are not intended to limit the technical spirit of the present disclosure. A singular expression includes a plural expression unless the context clearly indicates otherwise. In In this specification, the term "include" or "have" is intended to indicate that characteristics, figures, steps, operations, constituents, and components disclosed in the specification or combinations thereof exist, and should be understood as not precluding the existence or addition of one or more other characteristics, figures, steps, operations, constituents, components, or combinations thereof.

Though individual elements described in the present disclosure are independently shown in the drawings for convenience of description of different functions, this does not mean that the elements are implemented in hardware or software elements separate from each other. For example, two or more of the elements may be combined to form one element, or one element may be divided into a plurality of elements. Embodiments in which respective elements are integrated and/or separated are also within the scope of the present disclosure without departing from the essence of the present disclosure.

Hereinafter, exemplary embodiments of the present disclosure will be described in detail with reference to the accompanying drawings. The same reference numerals will be used for the same components in the drawings, and redundant descriptions of the same components are omitted.

FIG. 1 is a diagram showing an overall architecture for providing 360 content in accordance with some embodiments.

In this specification, the term "image" may be a concept including a still image and a video that is a set of a series of still images over time. The term "video" does not necessarily mean a set of a series of still images over time. In some cases, a still image may be interpreted as a concept included in a video.

In order to provide virtual reality (VR) to users, a method of providing 360 content may be considered. Here, the 360 content may be referred to as 3 Degrees of Freedom (3DoF) content, and VR may refer to a technique or an environment for replicating a real or virtual environment. VR may artificially provide sensuous experiences to users and thus users may experience electronically projected environments therethrough.

360 content may refer to all content for realizing and providing VR, and may include 360-degree video and/or 360 audio. The 360-degree video and/or 360 audio may also be referred to as 3D video and/or 3D audio 360-degree video may refer to video or image content which is needed to provide VR and is captured or reproduced in all directions (360 degrees) at the same time. Hereinafter, 360-degree video may refer to 360-degree video. 360-degree video may refer to a video or image presented in various types of 3D space in accordance with a 3D model. For example, 360-degree video may be presented on a spherical surface. 360 audio may be audio content for providing VR and may refer to spatial audio content which may make an audio generation source recognized as being located in a specific 3D space. 360 audio may also be referred to as 3D audio. 360 content may be generated, processed and transmitted to users, and the users may consume VR experiences using the 360 content. The 360 video may be called omnidirectional video, and the 360 image may be called omnidirectional image.

To provide a 360-degree video, a 360-degree video may be initially captured using one or more cameras. The captured 360-degree video may be transmitted through a series of processes, and the data received on the receiving side may be processed into the original 360-degree video and rendered. Then, the 360-degree video may be provided to a user.

Specifically, the entire processes for providing 360-degree video may include a capture process, a preparation process, a transmission process, a processing process, a rendering process and/or a feedback process.

The capture process may refer to a process of capturing an images or video for each of multiple viewpoints through one or more cameras. Image/video data as shown in part 110 of FIG. 1 may be generated through the capture process. Each plane in part 110 of FIG. 1 may refer to an image/video for each viewpoint. The captured images/videos may be called raw data. In the capture process, metadata related to the capture may be generated.

A special camera for VR may be used for the capture. In accordance with some embodiments, when a 360-degree video for a virtual space generated using a computer is to be provided, the capture operation through an actual camera may not be performed. In some embodiments, the capture process may be replaced by a process of generating related data.

The preparation process may be a process of processing the captured images/videos and the metadata generated in the capture process. In the preparation process, the captured images/videos may be subjected to stitching, projection, region-wise packing, and/or encoding First, each image/video may be subjected to the stitching process. The stitching process may be a process of connecting the captured images/videos to create a single panoramic image/video or a spherical image/video.

The stitched images/videos may be subjected to the projection process. In the projection process, the stitched images/videos may be projected onto a 2D image. The 2D image may be referred to as a 2D image frame depending on the context. Projection onto a 2D image may be referred to as mapping to the 2D image. The projected image/video data may take the form of a 2D image as shown in part 120 of FIG. 1.

The video data projected onto the 2D image may be subjected to the region-wise packing process in order to increase video coding efficiency. The region-wise packing may refer to a process of dividing the video data projected onto the 2D image into regions and processing the regions. Here, the regions may refer to regions obtained by dividing the 2D image onto which 360-degree video data is projected. In accordance with some embodiments, such regions may be distinguished by dividing the 2D image equally or randomly. In accordance with some embodiments, the regions may be divided in accordance with a projection scheme. The region-wise packing process may be optional, and may thus be omitted from the preparation process.

In accordance with some embodiments, this processing process may include a process of rotating the regions or rearranging the regions on the 2D image in order to increase video coding efficiency. For example, the regions may be rotated such that specific sides of the regions are positioned close to each other. Thereby, coding efficiency may be increased.

In accordance with some embodiments, the processing process may include a process of increasing or decreasing the resolution of a specific region in order to differentiate between the resolutions for the regions of the 360-degree video. For example, the resolution of regions corresponding to a relatively important area of the 360-degree video may be increased over the resolution of the other regions. The video data projected onto the 2D image or the region-wise packed video data may be subjected to the encoding process that employs a video codec.

In accordance with some embodiments, the preparation process may further include an editing process. In the editing process, the image/video data before or after the projection may be edited. In the preparation process, metadata for stitching/projection/encoding/editing may be generated. In addition, metadata about the initial viewpoint or the region of interest (ROI) of the video data projected onto the 2D image may be generated.

The transmission process may be a process of processing and transmitting the image/video data and the metadata obtained through the preparation process. Processing in accordance with any transport protocol may be performed for transmission. The data that has been processed for transmission may be delivered over a broadcast network and/or broadband. The data may be delivered to a receiving side in an on-demand manner. The receiving side may receive the data through various paths.

The processing process may refer to a process of decoding the received data and re-projecting the projected image/video data onto a 3D model. In this process, the image/video data projected onto 2D images may be re-projected onto a 3D space. This process may be referred to as mapping or projection depending on the context. Here, the shape of the 3D space to which the data is mapped may depend on the 3D model. For example, 3D models may include a sphere, a cube, a cylinder and a pyramid.

In accordance with some embodiments, the processing process may further include an editing process and an up-scaling process. In the editing process, the image/video data before or after the re-projection may be edited. When the image/video data has a reduced size, the size of the image/video data may be increased by up-scaling the samples in the up-scaling process. The size may be reduced through down-scaling, when necessary.

The rendering process may refer to a process of rendering and displaying the image/video data re-projected onto the 3D space. The re-projection and rendering may be collectively expressed as rendering on a 3D model. The image/video re-projected (or rendered) on the 3D model may take the form as shown in part 130 of FIG. 1. The part 130 of FIG. 1 corresponds to a case where the image/video data is re-projected onto the 3D model of sphere. A user may view a part of the regions of the rendered image/video through a VR display or the like. Here, the region viewed by the user may take the form as shown in part 140 of FIG. 1.

The feedback process may refer to a process of delivering various types of feedback information which may be acquired in the display process to a transmitting side. Through the feedback process, interactivity may be provided in 360-degree video consumption. In accordance with some embodiments, head orientation information, viewport information indicating a region currently viewed by the user, and the like may be delivered to the transmitting side in the feedback process. In accordance with some embodiments, the user may interact with content realized in a VR environment. In some embodiments, information related to the interaction may be delivered to the transmitting side or a service provider in the feedback process. In some embodiments, the feedback process may be skipped.

The head orientation information may refer to information about the position, angle and motion of the user's head. Based on this information, information about a region currently viewed by the user in the 360-degree video, namely, viewport information may be calculated.

The viewport information may be information about a region currently viewed by the user in the 360-degree video. Gaze analysis may be performed based on this information to check how the user consumes the 360-degree video and how long the user gazes at a region of the 360-degree video. The gaze analysis may be performed at the receiving side and a result of the analysis may be delivered to the transmitting side on a feedback channel. A device such as a VR display may extract a viewport region based on the position/orientation of the user's head, vertical or horizontal field of view (FOV) information supported by the device, and the like.

In accordance with some embodiments, the aforementioned feedback information may be not only delivered to the transmitting side but also consumed on the receiving side. That is, the decoding, re-projection and rendering processes may be performed on the receiving side based on the aforementioned feedback information. For example, only 360-degree video corresponding to a region currently viewed by the user may be preferentially decoded and rendered based on the head orientation information and/or the viewport information.

Here, the viewport or the viewport region may refer to a region of 360-degree video currently viewed by the user. A viewpoint may be a point which is viewed by the user in a 360-degree video and may represent a center point of the viewport region. That is, a viewport is a region centered on a viewpoint, and the size and shape of the region may be determined by FOV, which will be described later.

In the above-described architecture for providing 360-degree video, image/video data which is subjected to a series of processes of capture/projection/encoding/transmission/decoding/re-projection/rendering may be called 360-degree video data. The term "360-degree video data" may be used as a concept including metadata or signaling information related to such image/video data.

To store and transmit media data such as the audio or video data described above, a standardized media file format may be defined. In accordance with some embodiments, a media file may have a file format based on the ISO base media file format (ISO BMFF).

Figure 2:
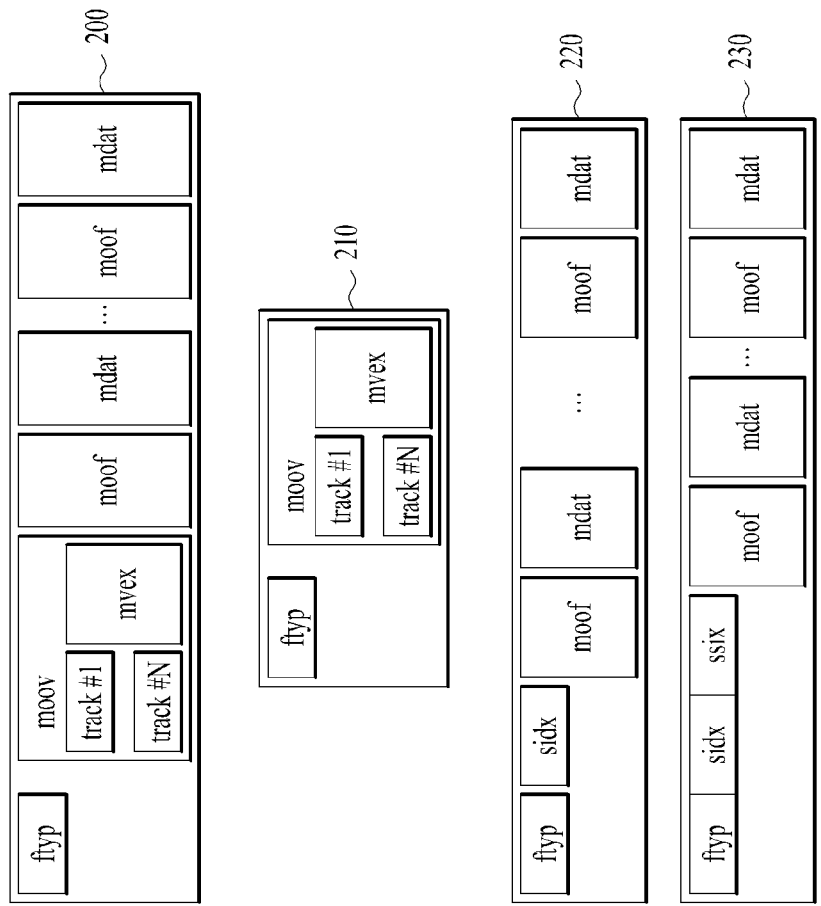
FIGS. 2 and 3 illustrate a structure of a media file in accordance with some embodiments.
Figure 3:
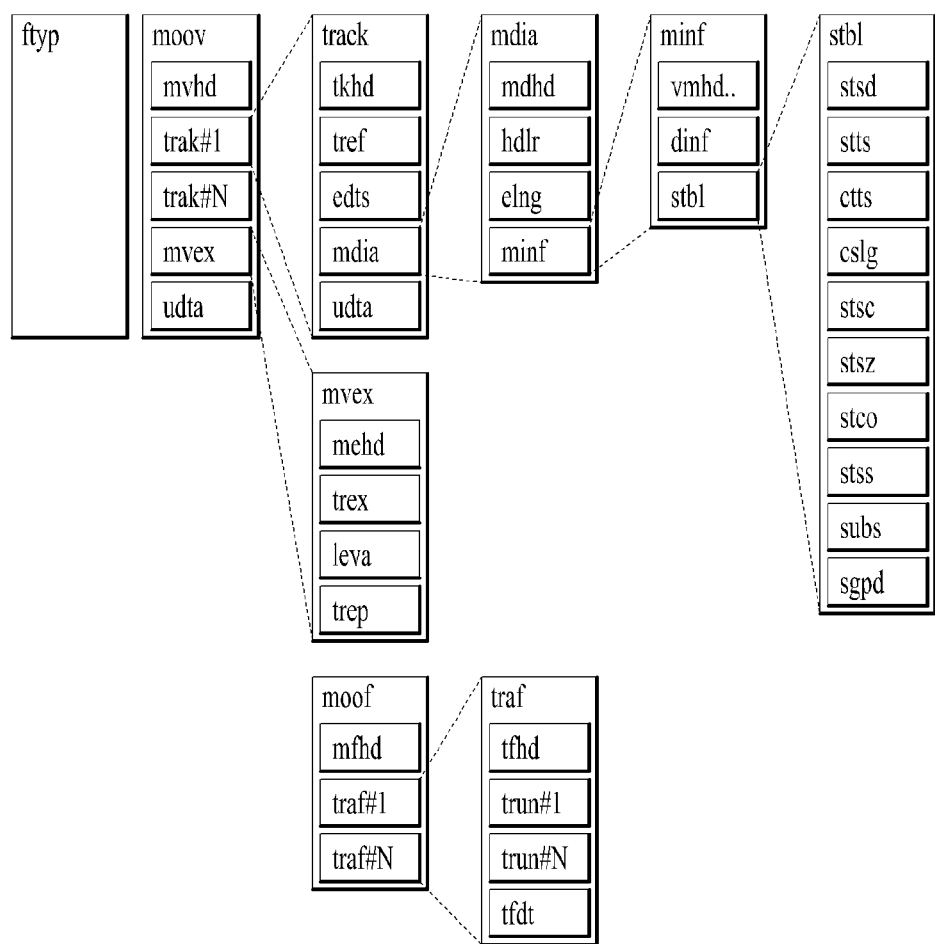

FIGS. 2 and 3 illustrate a structure of a media file in accordance with some embodiment of the present disclosure.

A media file in accordance with some embodiments may include at least one box. Here, the box may be a data block or object containing media data or metadata related to the media data. The boxes may be arranged in a hierarchical structure. Thus, the data may be classified in accordance with the boxes and the media file may take a form suitable for storage and/or transmission of large media data. In addition, the media file may have a structure which facilitates access to media information as in the case where the user moves to a specific point in the media content.

The media file in accordance with some embodiments may include an ftyp box, a moov box and/or an mdat box.

The ftyp box (file type box) may provide information related to a file type or compatibility of a media file. The ftyp box may include configuration version information about the media data of the media file. A decoder may identify a media file with reference to the ftyp box.

The moov box (movie box) may include metadata about the media data of the media file. The moov box may serve as a container for all metadata. The moov box may be a box at the highest level among the metadata related boxes. In accordance with some embodiments, only one moov box may be present in the media file.

The mdat box (media data box) may a box that contains actual media data of the media file. The media data may include audio samples and/or video samples and the mdat box may serve as a container to contain such media samples.

In accordance with some embodiments, the moov box may further include an mvhd box, a trak box and/or an mvex box as sub-boxes.

The mvhd box (movie header box) may contain media presentation related information about the media data included in the corresponding media file. That is, the mvhd box may contain information such as a media generation time, change time, time standard and period of the media presentation.

The trak box (track box) may provide information related to a track of the media data. The trak box may contain information such as stream related information, presentation related information, and access related information about an audio track or a video track. Multiple trak boxes may be provided depending on the number of tracks.

In accordance with some embodiments, the trak box may include a tkhd box (track header box) as a sub-box. The tkhd box may contain information about a track indicated by the trak box. The tkhd box may contain information such as a generation time, change time and track identifier of the track.

The mvex box (movie extend box) may indicate that the media file may have a moof box, which will be described later. The moov boxes may need to be scanned to recognize all media samples of a specific track.

In accordance with some embodiments, the media file in accordance with the present disclosure may be divided into multiple fragments (200). Accordingly, the media file may be segmented and stored or transmitted. The media data (mdat box) of the media file may be divided into multiple fragments and each of the fragments may include a moof box and a divided mdat box. In accordance with some embodiments, the information in the ftyp box and/or the moov box may be needed to utilize the fragments.

The moof box (movie fragment box) may provide metadata about the media data of a corresponding fragment. The moof box may be a box at the highest layer among the boxes related to the metadata of the corresponding fragment.

The mdat box (media data box) may contain actual media data as described above. The mdat box may contain media samples of the media data corresponding to each fragment.

In accordance with some embodiments, the moof box may include an mfhd box and/or a traf box as sub-boxes.

The mfhd box (movie fragment header box) may contain information related to correlation between multiple divided fragments. The mfhd box may include a sequence number to indicate a sequential position of the media data of the corresponding fragment among the divided data. In addition, it may be checked whether there is missing data among the divided data, based on the mfhd box.

The traf box (track fragment box) may contain information about a corresponding track fragment. The traf box may provide metadata about a divided track fragment included in the fragment. The traf box may provide metadata so as to decode/play media samples in the track fragment. Multiple traf boxes may be provided depending on the number of track fragments.

In accordance with some embodiments, the traf box described above may include a tfhd box and/or a trun box as sub-boxes.

The tfhd box (track fragment header box) may contain header information about the corresponding track fragment. The tfhd box may provide information such as a default sample size, period, offset and identifier for the media samples of the track fragment indicated by the traf box described above.

The trun box (track fragment run box) may contain information related to the corresponding track fragment. The trun box may contain information such as a period, size and play timing of each media sample.

The media file or the fragments of the media file may be processed into segments and transmitted. The segments may include an initialization segment and/or a media segment.

The file of the illustrated embodiment 210 may be a file containing information related to initialization of the media decoder except the media data. This file may correspond to the initialization segment described above. The initialization segment may include the ftyp box and/or the moov box described above.

The file of the illustrated embodiment 220 may be a file including the above-described fragments. For example, this file may correspond to the media segment described above. The media segment may include the moof box and/or the mdat box described above. The media segment may further include an styp box and/or an sidx box.

The styp box (segment type box) may provide information for identifying media data of a divided fragment. The styp box may serve as the above-described ftyp box for the divided fragment. In accordance with some embodiments, the styp box may have the same format as the ftyp box.

The sidx box (segment index box) may provide information indicating an index for a divided fragment. Accordingly, the sequential position of the divided fragment may be indicated.

In accordance with some embodiments 230, an ssix box may be further provided. When a segment is further divided into sub-segments, the ssix box (sub-segment index box) may provide information indicating indexes of the sub-segments.

The boxes in the media file may further contain further extended information based on a box as illustrated in some embodiments 250 or a FullBox. In some embodiments, the size field and the largesize field may indicate the length of a corresponding box in bytes. The version field may indicate the version of a corresponding box format. The Type field may indicate the type or identifier of the box. The flags field may indicate a flag related to the box.

The fields (attributes) for 360-degree video in accordance with some embodiments may be carried in a DASH-based adaptive streaming model.

Figure 4:
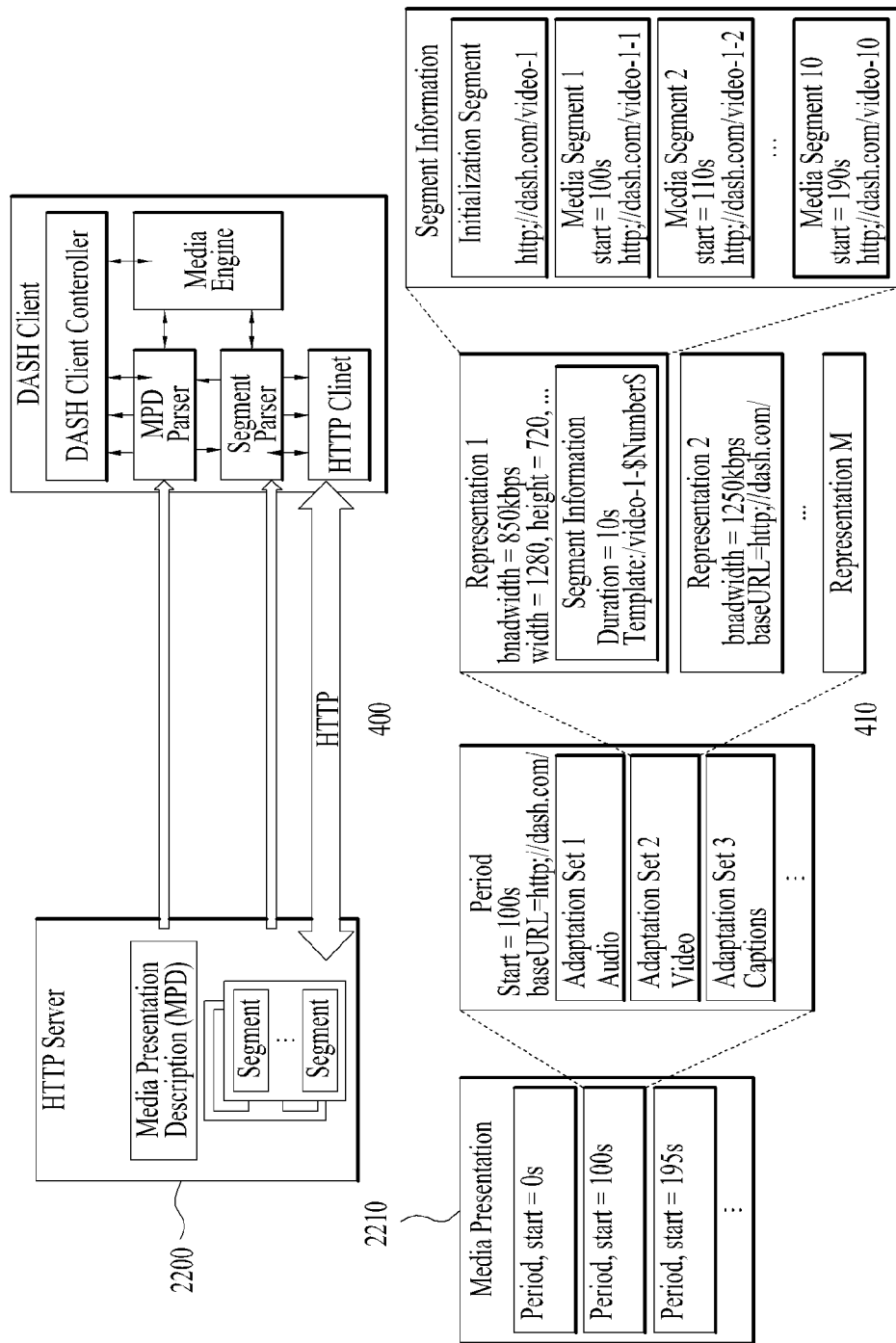
FIG. 4 illustrates an example of the overall operation of a DASH-based adaptive streaming model.

FIG. 4 illustrates an example of the overall operation of a DASH-based adaptive streaming model.

A DASH-based adaptive streaming model in accordance with some embodiments 400 shown in the figure describes operations between an HTTP server and a DASH client. Here, DASH (dynamic adaptive streaming over HTTP) is a protocol for supporting HTTP-based adaptive streaming and may dynamically support streaming in accordance with the network condition. Accordingly, AV content may be seamlessly played.

Initially, the DASH client may acquire an MPD. The MPD may be delivered from a service provider such as the HTTP server. The DASH client may make a request to the server for segments described in the MPD, based on the information for access to the segments. The request may be made based on the network condition.

After acquiring the segments, the DASH client may process the segments through a media engine and display the processed segments on a screen. The DASH client may request and acquire necessary segments by reflecting the playback time and/or the network condition in real time (Adaptive Streaming). Accordingly, content may be seamlessly played.

The MPD (media presentation description) is a file containing detailed information allowing the DASH client to dynamically acquire segments, and may be represented in an XML format.

A DASH client controller may generate a command for requesting the MPD and/or segments considering the network condition. In addition, the DASH client controller may perform a control operation such that an internal block such as the media engine may use the acquired information.

An MPD parser may parse the acquired MPD in real time. Accordingly, the DASH client controller may generate a command for acquiring a necessary segment.

A segment parser may parse the acquired segment in real time. Internal blocks such as the media engine may perform a specific operation in accordance with the information contained in the segment.

The HTTP client may make a request to the HTTP server for a necessary MPD and/or segments. In addition, the HTTP client may deliver the MPD and/or segments acquired from the server to the MPD parser or the segment parser.

The media engine may display content on the screen based on the media data contained in the segments. In this operation, the information in the MPD may be used.

The DASH data model may have a hierarchical structure 410. Media presentation may be described by the MPD. The MPD may describe a time sequence of multiple periods constituting the media presentation. A period may represent one section of media content.

In one period, data may be included in adaptation sets. An adaptation set may be a set of multiple media content components which may be exchanged. An adaption may include a set of representations. A representation may correspond to a media content component. In one representation, content may be temporally divided into multiple segments, which may be intended for appropriate accessibility and delivery. To access each segment, a URL of each segment may be provided.

The MPD may provide information related to media presentation. The period element, the adaptation set element, and the representation element may describe a corresponding period, a corresponding adaptation set, and a corresponding representation, respectively. A representation may be divided into sub-representations. The sub-representation element may describe a corresponding sub-representation.

Here, common attributes/elements may be defined. These may be applied to (included in) an adaptation set, a representation, or a sub-representation. The common attributes/elements may include EssentialProperty and/or SupplementalProperty.

The EssentialProperty may be information including elements regarded as essential elements in processing data related to the corresponding media presentation. The SupplementalProperty may be information including elements which may be used in processing the data related to the corresponding media presentation. In some embodiments, descriptors which will be described later may be defined in the EssentialProperty and/or the SupplementalProperty when delivered through an MPD.

Figure 5:
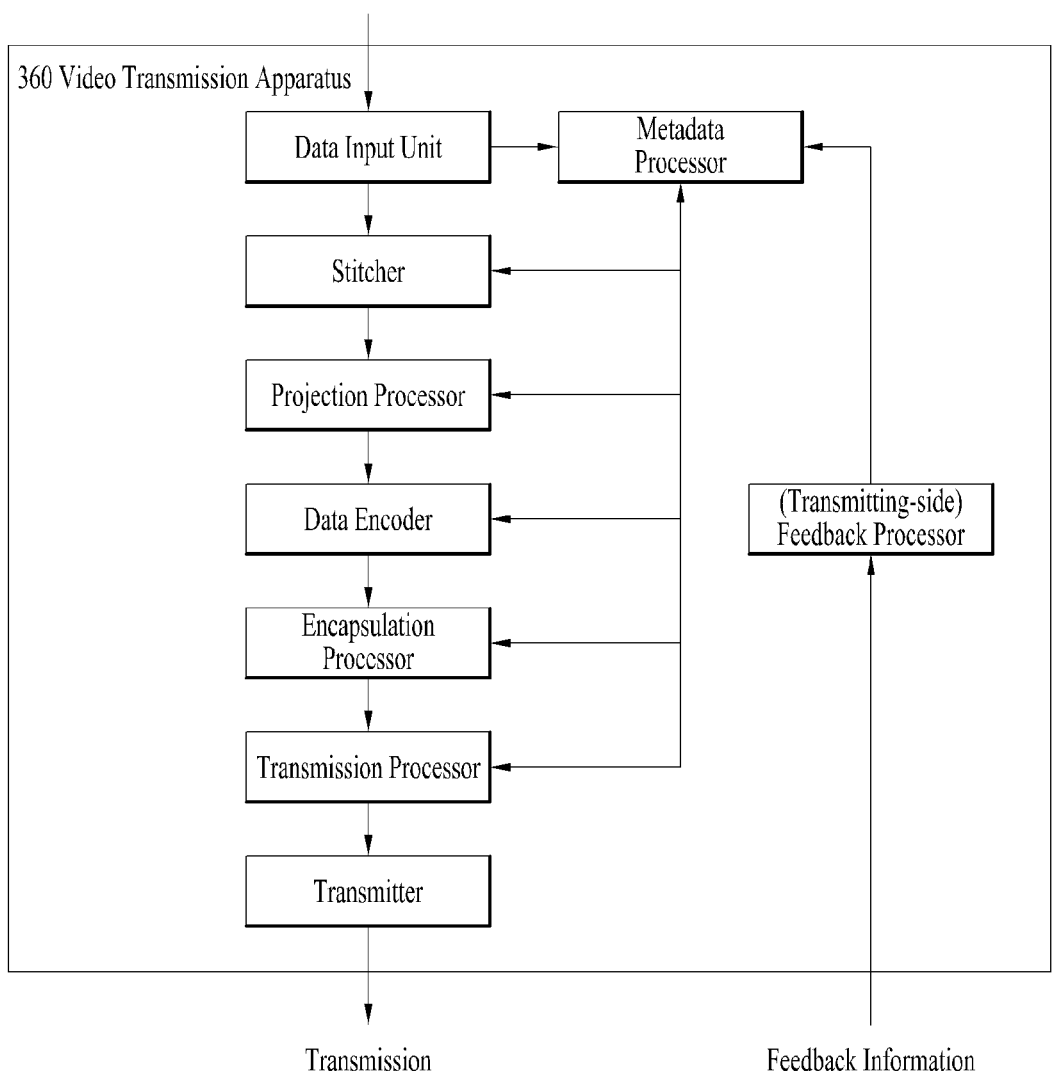
FIG. 5 is a diagram schematically illustrating a configuration of a 360 video transmission apparatus in accordance with some embodiments.

FIG. 5 is a diagram schematically illustrating a configuration of a 360 video transmission apparatus in accordance with some embodiments.

The 360 video transmission apparatus in accordance with some embodiments may perform operations related to the preparation process or the transmission process described above. The 360 video transmission apparatus may include a data input unit, a stitcher, a projection processor, a region-wise packing processor (not shown), a metadata processor, a (transmitting-side) feedback processor, a data encoder, an encapsulation processor, a transmission processor, and/or a transmitter as internal/external elements.

The data input unit may receive inputs of images/videos for each captured viewpoint. These viewpoint-specific images/videos may be images/videos captured by one or more cameras. The data input unit may also receive an input of metadata generated during the capture process. The data input unit may deliver the input images/videos for each viewpoint to the stitcher, and deliver the metadata of the capture process to the signaling processor.

The stitcher may perform stitching on the captured images/videos for each viewpoint. The stitcher may deliver the stitched 360 video data to the projection processor. When necessary, the stitcher may receive necessary metadata from the metadata processor and use the same for stitching. The stitcher may deliver metadata generated in the stitching process to the metadata processor. The metadata of the stitching process may contain information such as an indication of whether stitching has been performed and a stitching type.

The projection processor may project the stitched 360 video data onto a 2D image. The projection processor may perform projection in accordance with various schemes, which will be described later. The projection processor may perform mapping in consideration of a corresponding depth of 360 video data for each viewpoint. When necessary, the projection processor may receive metadata necessary for projection from the metadata processor and use the same in the projection operation. The projection processor may deliver the metadata generated in the projection process to the metadata processor. The metadata of the projection processor may include a type of a projection scheme.

The region-wise packing processor (not shown) may perform the above-described region-wise packing process. That is, the region-wise packing processor may perform processes such as dividing the projected 360 video data into regions, rotating or rearranging each region, or changing the resolution of each region. As described above, the region-wise packing process is optional. When region-wise packing is skipped, the region-wise packing processor may be omitted. When necessary, the region-wise packing processor may receive metadata necessary for region-wise packing from the metadata processor and use the same in the region-wise packing operation. The region-wise packing processor may deliver the metadata generated in the region-wise packing process to the metadata processor. The metadata of the region-wise packing processor may include a degree of rotation and size of each region.

In accordance with some embodiments, the stitcher, the projection processor and/or the region-wise packing processor described above may be implemented by one hardware component.

The metadata processor may process metadata that may be generated in the capture process, the stitching process, the projection process, the region-wise packing process, the encoding process, the encapsulation process, and/or the processing process for transmission. Using the metadata, the metadata processor may generate 360 video-related metadata. In accordance with some embodiments, the metadata processor may generate 360 video-related metadata in the form of a signaling table. Depending on the signaling context, the 360 video-related metadata may be referred to as metadata or 360 video-related signaling information. The metadata processor may deliver the acquired or generated metadata to internal elements of the 360 video transmission apparatus, as necessary. The metadata processor may deliver the 360 video-related metadata to the data encoder, the encapsulation processor, and/or the transmission processor such that the metadata may be transmitted to the receiving side.

The data encoder may encode 360 video data projected onto a 2D image and/or 360 video data packed region-wise. The 360 video data may be encoded in various formats.

The encapsulation processor may encapsulate the encoded 360 video data and/or the 360 video-related metadata in the form of a file. Here, the 360 video-related metadata may be received from the metadata processor described above. The encapsulation processor may encapsulate the data in a file format such as ISOBMFF or CFF, or process the data into DASH segments or the like. In accordance with some embodiments, the encapsulation processor may include the 360 video-related metadata in a file format. For example, the 360-related metadata may be included in boxes of various levels in the ISOBMFF, or included as data in a separate track in the file. In accordance with some embodiments, the encapsulation processor may encapsulate the 360 video-related metadata into a file. The transmission processor may process the encapsulated 360 video data in accordance with the file format so as to be transmitted. The transmission processor may process the 360 video data in accordance with any transport protocol. The processing for transmission may include processing for delivery over a broadcast network, and processing for delivery over a broadband. In accordance with some embodiments, the transmission processor may not only receive the 360 video data, but also receive metadata related to the 360 video from the metadata processor, and may process the same so as to be transmitted.

The transmitter may transmit, over a broadcast network and/or a broadband, the 360 video data and/or the 360 video-related metadata processed for transmission. The transmitter may include an element for transmission over a broadcast network and/or an element for transmission over a broadband.

In accordance with some embodiments, the 360 video transmission apparatus may further include a data storage unit (not shown) as an internal/external element. The data storage unit may store the encoded 360 video data and/or 360 video-related metadata before transmitting the same to the transmission processor. These data may be stored in a file format such as ISOBMFF. When the 360 video is transmitted in real time, the data storage unit may not be needed. However, to deliver the video in an on-demand manner, in non real time (NRT), or over a broadband, the encapsulated 360 data may be stored in the data storage unit for a certain period of time and then transmitted.

In accordance with another embodiment, the 360 video transmission apparatus may further include a (transmitting-side) feedback processor and/or a network interface (not shown) as internal/external elements. The network interface may receive feedback information from the 360 video reception apparatus in accordance with the present disclosure, and deliver the same to the transmitting-side feedback processor. The transmitting-side feedback processor may deliver the feedback information to the stitcher, the projection processor, the region-wise packing processor, the data encoder, the encapsulation processor, the metadata processor, and/or the transmission processor. In accordance with some embodiments, after the feedback information is delivered to the metadata processor, it may in turn be delivered to each internal element. The internal elements that receive the feedback information may perform subsequent processing of the 360 video data in consideration of the feedback information.

In accordance with another embodiment of the 360 video transmission apparatus, the region-wise packing processor may rotate each region and map the same onto a 2D image. In this operation, the respective regions may be rotated at different angles in different directions, and then mapped onto the 2D image. The rotation of the regions may be performed in consideration of a portion that neighbored the 360 video data on the spherical surface or was stitched before projection. Information about the rotation of the regions, that is, the rotation directions, angles, and the like, may be signaled by 360 video-related metadata. In accordance with another embodiment of the 360 video transmission apparatus, the data encoder may encoding each region differently. The data encoder may encode a specific region with high quality and other regions with low quality. The transmitting-side feedback processor may deliver the feedback information received from the 360 video reception apparatus to the data encoder, such that the data encoder uses a differentiated encoding method for each region. For example, the transmitting-side feedback processor may deliver the viewport information received from the receiving side to the data encoder. The data encoder may encode regions including an area indicated by the viewport information with higher quality (UHD, etc.) than the other regions.

In accordance with another embodiment of the 360 video transmission apparatus, the transmission processor may perform processing for transmission on each region differently. The transmission processor may apply different transmission parameters (modulation order, code rate, etc.) for the respective regions, such that the data transmitted for each region may have different robustness.

Then, the transmitting-side feedback processor may deliver the feedback information received from the 360 video reception apparatus to the transmission processor, such that the transmission process performs the differentiated transmission processing for each region. For example, the transmitting-side feedback processor may deliver viewport information received from the receiving side to the transmission processor. The transmission processor may perform processing for transmission on regions including an area indicated by the viewport information, such that the regions may have higher robustness than the other regions.

The internal/external elements of the 360 video transmission apparatus described above may be hardware elements implemented in hardware. In accordance with some embodiments, the internal/external elements may be changed, omitted, or replaced with other elements. In accordance with some embodiments, supplemental elements may be added to the 360 video transmission apparatus.

Figure 6:
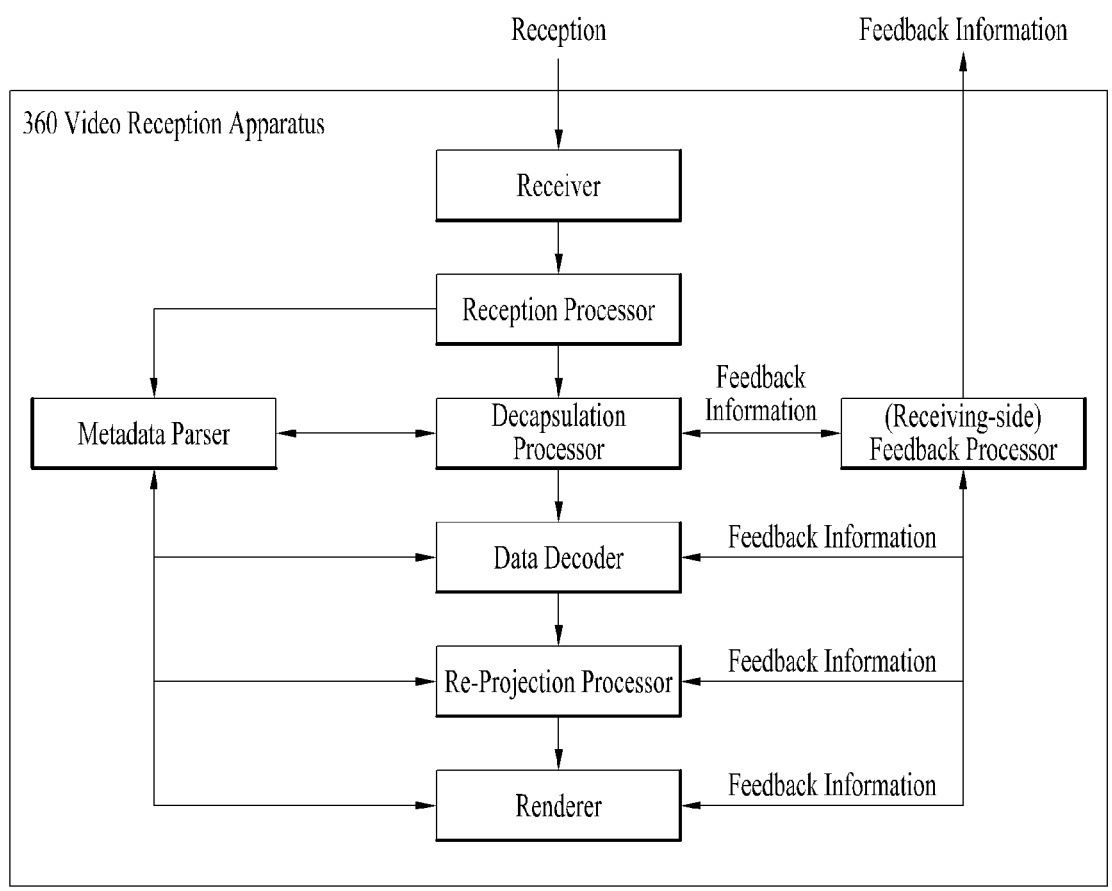
FIG. 6 is a diagram schematically illustrating a configuration of a 360 video reception apparatus in accordance with some embodiments.

FIG. 6 is a diagram schematically illustrating a configuration of a 360 video reception apparatus in accordance with some embodiments.

The 360 video reception apparatus in accordance with some embodiments may perform operations related to the processing process and/or the rendering process described above. The 360 video reception apparatus may include a receiver, a reception processor, a decapsulation processor, a data decoder, a metadata parser, a (receiving-side) feedback processor, a re-projection processor, and/or a renderer as internal/external elements. A signaling parser may be referred to as a metadata parser.

The receiver may receive 360 video data transmitted by the 360 video transmission apparatus in accordance with some embodiments. Depending on the transmission channel, the receiver may receive 360 video data over a broadcast network or a broadband.

The reception processor may process the received 360 video data in accordance with a transport protocol. The reception processor may perform the reverse process of the process of the above-described transmission processor such that the reverse process corresponds to the processing for transmission on the transmitting side. The reception processor may deliver the acquired 360 video data to the decapsulation processor, and deliver the acquired 360 video-related metadata to the metadata parser. The 360 video-related metadata acquired by the reception processor may be in the form of a signaling table.

The decapsulation processor may decapsulate the 360 video data received in the form of a file from the reception processor. The decapsulation processor may decapsulate the files in accordance with ISOBMFF or the like to acquire the 360 video data or 360 video-related metadata. The acquired 360 video data may be delivered to the data decoder, and the acquired 360 video-related metadata may be delivered to the metadata parser. The 360 video-related metadata acquired by the decapsulation processor may be in the form of a box or track in a file format. When necessary, the decapsulation processor may receive metadata needed for decapsulation from the metadata parser.

The data decoder may decode the 360 video data. The data decoder may receive metadata needed for decoding from the metadata parser. The 360 video-related metadata acquired in the data decoding process may be delivered to the metadata parser.

The metadata parser may parse/decode the 360 video-related metadata. The metadata parser may deliver the acquired metadata to the data decapsulation processor, the data decoder, the re-projection processor, and/or the renderer.

The re-projection processor may re-project the decoded 360 video data. The re-projection processor may re-project the 360 video data onto a 3D space. The shape of the 3D space may depend on the employed 3D model. The re-projection processor may receive metadata needed for re-projection from the metadata parser. For example, the re-projection processor may receive information about the type of the employed 3D model and the corresponding detailed information from the metadata parser. In accordance with some embodiments, the re-projection processor may re-project only 360 video data corresponding to a specific area in the 3D space onto the 3D space based on the metadata needed for re-projection.

The renderer may render the re-projected 360 degree video data. As described above, the 360 video data may be rendered in the 3D space. In the case where two processes occur at once as described above, the re-projection processor and the renderer may be integrated with each other, and the processes may all be performed by the renderer. In accordance with some embodiments, the renderer may render only a part that the user is viewing in accordance with the viewpoint information about the user.

The user may view some areas of the rendered 360 video through a VR display or the like. The VR display is a device that plays the 360 video, and may be included in the 360 video reception apparatus (in a tethered state) or connected to the 360 video reception apparatus as a separate device (in an un-tethered state).

In accordance with some embodiments, the 360 video reception apparatus may further include a (receiving-side) feedback processor and/or a network interface (not shown) as internal/external elements. The receiving-side feedback processor may acquire feedback information from the renderer, the re-projection processor, the data decoder, the decapsulation processor, and/or the VR display, and process the same. The feedback information may include viewport information, head orientation information, and gaze information. The network interface may receive the feedback information from the receiving-side feedback processor and transmit the same to the 360 video transmission apparatus.

As described above, the feedback information may not only be delivered to the transmitting side, but also be consumed at the receiving side. The receiving-side feedback processor may deliver the acquired feedback information to internal elements of the 360 video reception apparatus such that the information may be reflected in processes such as rendering. The receiving-side feedback processor may deliver the feedback information to the renderer, the re-projection processor, the data decoder and/or the decapsulation processor. For example, the renderer may preferentially render an area viewed by a user based on the feedback information. The decapsulation processor and the data decoder may preferentially decapsulate and decode the area that the user is viewing or the area to be viewed by the user.

The internal/external elements of the 360 video reception apparatus in accordance with some embodiments described above may be hardware elements implemented in hardware. In accordance with some embodiments, the internal/external elements may be changed, omitted, or replaced with other elements. In accordance with some embodiments, supplemental elements may be added to the 360 video reception apparatus.

In another aspect, an operation method for the 360 video reception apparatus in accordance with some embodiments described above may relate to a method of transmitting 360 video and a method of receiving 360 video. The method of transmitting/receiving a 360 video in accordance with some embodiments may be implemented by the above-described 360 video transmission/reception apparatuses in accordance with the present disclosure or some embodiments of the apparatuses.

Some embodiments of the 360 video transmission/reception apparatuses, the transmission/reception methods, and the internal/external elements thereof in accordance with the present disclosure described above may be combined with each other. For example, some embodiments of the projection processor and some embodiments of the data encoder may be combined with each other to configure as many embodiments of the 360 video transmission apparatus as the combinations.

Figure 7:
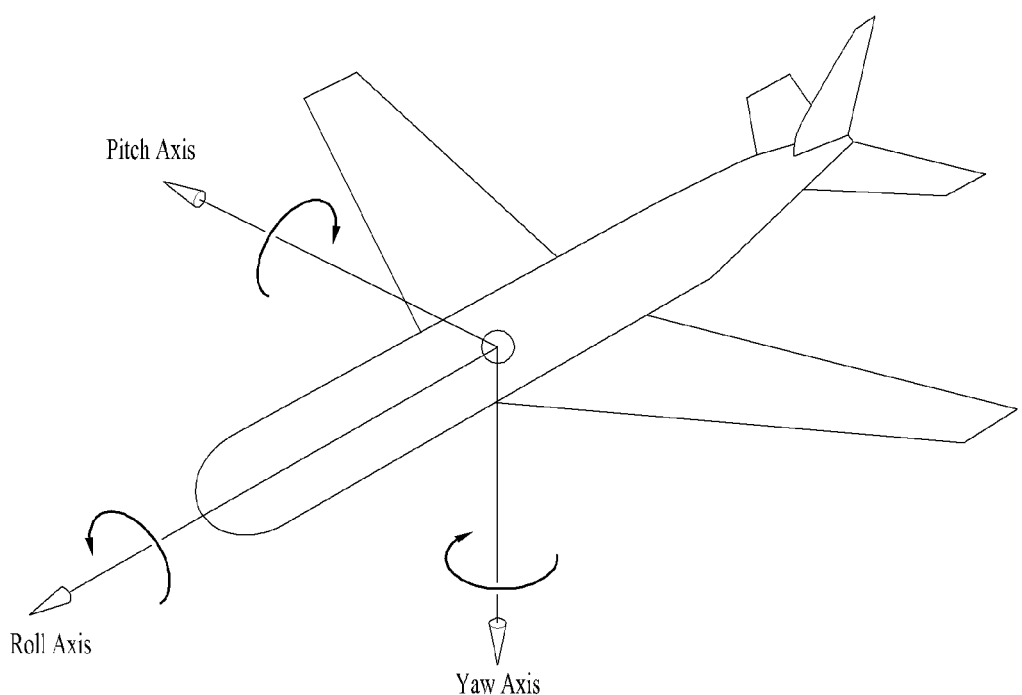
FIG. 7 is a diagram illustrating the concept of aircraft principal axes for describing a 3D space according some embodiments.

FIG. 7 is a diagram illustrating the concept of aircraft principal axes for describing a 3D space according some embodiments.

In the present disclosure, the concept of aircraft principal axes may be used to express a specific point, position, direction, spacing, area, and the like in a 3D space. That is, in the present disclosure, the concept of aircraft principal axes may be used to describe the concept of 3D space given before or after projection and to perform signaling therefor. In accordance with some embodiments, a method based on the Cartesian coordinate system using X, Y, and Z axes or a spherical coordinate system may be used.

An aircraft may rotate freely in three dimensions. The axes constituting the three dimensions are referred to as a pitch axis, a yaw axis, and a roll axis, respectively. In this specification, these axes may be simply expressed as pitch, yaw, and roll or as a pitch direction, a yaw direction, a roll direction.

In one example, the roll axis may correspond to the X-axis or back-to-front axis of the Cartesian coordinate system. Alternatively, the roll axis may be an axis extending from the front nose to the tail of the aircraft in the concept of aircraft principal axes, and rotation in the roll direction may refer to rotation about the roll axis. The range of roll values indicating the angle rotated about the roll axis may be from −180 degrees to 180 degrees, and the boundary values of −180 degrees and 180 degrees may be included in the range of roll values.

In another example, the pitch axis may correspond to the Y-axis or side-to-side axis of the Cartesian coordinate system. Alternatively, the pitch axis may refer to an axis around which the front nose of the aircraft rotates upward/downward. In the illustrated concept of aircraft principal axes, the pitch axis may refer to an axis extending from one wing to the other wing of the aircraft. The range of pitch values, which represent the angle of rotation about the pitch axis, may be between −90 degrees and 90 degrees, and the boundary values of −90 degrees and 90 degrees may be included in the range of pitch values.

In another example, the yaw axis may correspond to the Z axis or vertical axis of the Cartesian coordinate system. Alternatively, the yaw axis may refer to a reference axis around which the front nose of the aircraft rotates leftward/rightward. In the illustrated concept of aircraft principal axes, the yaw axis may refer to an axis extending from the top to the bottom of the aircraft. The range of yaw values, which represent the angle of rotation about the yaw axis, may be from −180 degrees to 180 degrees, and the boundary values of −180 degrees and 180 degrees may be included in the range of yaw values.

In 3D space in accordance with some embodiments, a center point that is a reference for determining a yaw axis, a pitch axis, and a roll axis may not be static.

As described above, the 3D space in the present disclosure may be described based on the concept of pitch, yaw, and roll.

As described above, the video data projected on a 2D image may be subjected to the region-wise packing process in order to increase video coding efficiency and the like. The region-wise packing process may refer to a process of dividing the video data projected onto the 2D image into regions and processing the same in accordance with the regions. The regions may refer to regions obtained by dividing the 2D image onto which 360-degree video data is projected. The divided regions of the 2D image may be distinguished by projection schemes. Here, the 2D image may be called a video frame or a frame.

In this regard, the present disclosure proposes metadata for the region-wise packing process in accordance with a projection scheme and a method of signaling the metadata. The region-wise packing process may be more efficiently performed based on the metadata.

FIG. 8 exemplarily illustrates a 2D image to which a 360 video processing process and a projection format-based region-wise packing process are applied.

FIG. 8(a) may illustrate a process of processing input 360-degree video data. Referring to FIG. 8(a), 360-degree video data of the input viewing position may be stitched and projected onto a 3D projection structure in accordance with various projection schemes. The 360-degree video data projected onto the 3D projection structure may be represented as a 2D image. That is, the 360 video data may be stitched and projected into the 2D image. The 2D image into which the 360 video data is projected may be represented as a projected frame. In addition, the above-described may be performed on the projected frame. That is, processing such as dividing an area including the projected 360 video data on the projected frame into regions, rotating or rearranging each region, or changing the resolution of each region may be performed. In other words, the region-wise packing process may represent a process of mapping the projected frame to one or more packed frames. Performing the region-wise packing process may be optional. When the region-wise packing process is skipped, the packed frame may be identical to the projected frame. When the region-wise packing process is applied, each region of the projected frame may be mapped to a region of the packed frame, and metadata indicating the position, shape, and size of the region of the packed frame to which each region of the projected frame is mapped may be derived.

FIGS. 8(b) and 8(c) may show examples in which each region of the projected frame is mapped to a region of the packed frame. Referring to FIG. 8(b), the 360 video data may be projected into a 2D image (or frame) in accordance with a panoramic projection scheme. The top region, middle region, and bottom region of the projected frame may be subjected to a region-wise packing process and rearranged as shown on the right side of the figure. Here, the top region may represent the top surface of the panorama on a 2D image, the middle region may represent the middle surface of the panorama on the 2D image, and the bottom region may represent the bottom surface of the panorama on the 2D image. Referring to FIG. 8(c), the 360 video data may be projected into a 2D image (or frame) in accordance with a cubic projection scheme. The front region, the back region, the top region, the bottom region, the right region, and the left region of the projected frame may be subjected to the region-wise packing process and rearranged as shown on the right side of the figure. Here, the front region may represent the front face of the cube on the 2D image, and the back region may represent the back face of the cube on the 2D image. In addition, the top region may represent the top face of the cube on the 2D image, and the bottom region may represent the bottom face of the cube on the 2D image. The right region may represent the right face of the cube on the 2D image, and the left region may represent the left face of the cube on the 2D image.

FIG. 8(d) may show various 3D projection formats in which the 360 video data may be projected. Referring to FIG. 8(d), the 3D projection formats may include tetrahedron, cube, octahedron, dodecahedron, and icosahedron. The 2D projections shown in FIG. 8(d) may represent projected frames representing 360 video data projected onto a 3D projection format as a 2D image.

In accordance with some embodiments, as the projection formats, for example, some or all of various projection formats (or projection schemes) may be used. A projection format used for 360 video may be indicated through, for example, the projection format field of metadata.

FIGS. 9A and 9B exemplarily show projection formats in accordance with some embodiments.

FIG. 9A(a) may show an equirectangular projection format. When the equirectangular projection format is used, a point (r, $\theta_0$, 0) on the spherical surface, that is, a point with $\theta=\theta_0$ and $\varphi=0$, may be mapped to a center pixel of the 2D image. In addition, the principal point of the front camera may be assumed to be the point (r, 0, 0) on the spherical surface. Also, $\varphi_0$ may be fixed to $\varphi_0=0$. Accordingly, the value (x, y) obtained by transformation into the XY coordinate system may be transformed into a pixel (X, Y) on the 2D image by the following equation.

$$X = K_x * x + X_o = K_x * (\theta - \theta_0) * r + X_o$$

$$Y = -K_y * y - Y_o \quad \text{Equation 1}$$

In addition, when the left top pixel of the 2D image is positioned at (0,0) of the XY coordinate system, the offset value along the x-axis and the offset value along the y-axis may be given by the following equation.

$$X_o = K_x * \pi * r$$

$$Y_o = -K_y * \pi/2 * r \quad \text{Equation 2}$$

Based on this equation, the equation for a transformation into to the XY coordinate system may be given as follows.

$$X = K_x x + X_o = K_x * (\pi + \theta - \theta_0) * r$$

$$Y = -K_y y - Y_o = K_y * (\pi/2 - \varphi) * r \quad \text{Equation 3}$$

For example, when $\theta_0=0$, that is, when the center pixel of the 2D image indicates data with $\theta=0$ on a spherical surface, the spherical surface may be mapped to an area having a width=$2K_x \pi r$ and a height=$K_x \pi r$ in the 2D image with respect to (0,0). Data having $\varphi=\pi/2$ on the spherical surface may be mapped to the entire top side of the 2D image. In addition, data of (r, $\pi/2$, 0) on the spherical surface may be mapped to a point ($3\pi K_x r/2$, $\pi K_x r/2$) on the 2D image.

On the receiving side, 360 video data on the 2D image may be re-projected onto a spherical surface. The transformation question for this operation may be given as follows.

$$\theta = \theta_0 + X/K_x * r - \pi$$

$$\varphi = \pi/2 - Y/K_y * r \quad \text{Equation 4}$$

For example, on a 2D image, a pixel whose XY coordinate value is (K$x \pi r$, 0) may be re-projected to a point where $\theta=\theta_0$ and $\varphi=\pi/2$ on a spherical surface.

FIG. 9A(b) may show a cubic projection format. For example, stitched 360 video data may be displayed on a spherical surface. The projection processor may divide the 360 video data in a cube shape to project the same onto a 2D image. The 360 video data on the spherical face may correspond to each face of the cube, and may be projected onto the 2D image as shown on the left side or right side of (b) in FIG. 9A.

FIG. 9A(c) may show a cylindrical projection format. Assuming that the stitched 360 video data can be displayed on a spherical surface, the projection processor may divide the 360 video data in a cylinder shape and project the same onto a 2D image. The 360 video data on the spherical surface may correspond to the side, top, and bottom of the cylinder, respectively, and may be projected onto the 2D image as shown on the left side or right side of (c) in FIG. 9A.

FIG. 9A(d) may show a tile-based projection format. When a tile-based projection scheme is used, the above-described projection processor may divide the 360 video data on the spherical surface into one or more detailed regions as shown in FIG. 9A(d) to project the same onto a 2D image. The detailed regions may be referred to as tiles.

FIG. 9B(e) may show a pyramid projection format. When it is assumed that the stitched 360 video data can be displayed on a spherical surface, the projection processor may consider the 360 video data to have a pyramid shape and divide the respective faces thereof to project the same onto a 2D image. The 360 video data on the spherical surface may correspond to the front side of the pyramid and the four sides (left top, left bottom, right top, right bottom) of the pyramid, respectively, and may be projected as shown on the left side or right side of (e) in FIG. 9B. Here, the front may be an area including data acquired by a camera facing forward.

FIG. 9B(f) may show a panoramic projection format. When a panoramic projection format is used, the above-described projection processor may project, onto a 2D image, only a side surface of the 360 video data on a spherical surface, as shown in FIG. 9B(f). This may be the same as the case where the top and bottom are not present in the cylindrical projection scheme.

In accordance with some embodiments, projection may be performed without stitching. FIG. 9B(g) may show a case where projection is performed without stitching. When projection is performed without stitching, the above-described projection processor may project 360 video data onto a 2D image as shown in FIG. 9B(g). In some embodiments, stitching may be skipped, and each image acquired by the camera may be projected directly onto the 2D image.

Referring to FIG. 9B(g), two images may be projected onto a 2D image without stitching. Each image may be a fish-eye image acquired through each sensor in a spherical camera (or a fish-eye camera). As described above, the receiving side may stitch the image data acquired from the camera sensors, and map the stitched image data onto a spherical surface to render a spherical video, that is, 360 video.

Figure 10A:
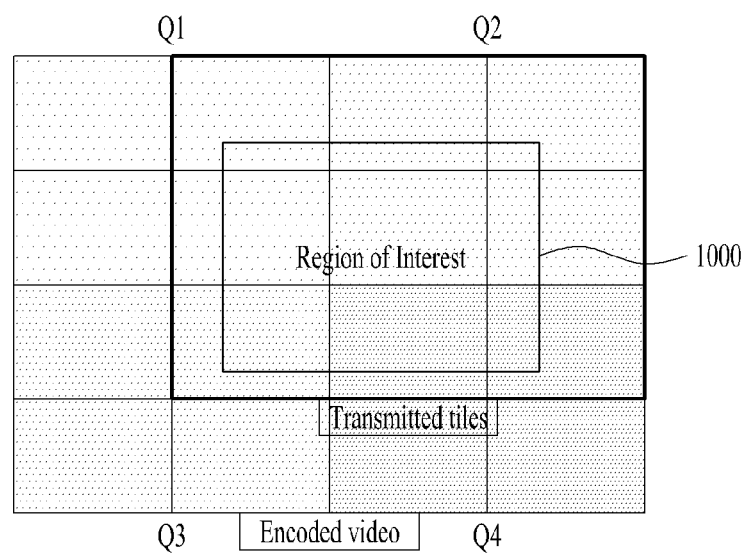
FIGS. 10A and 10B are diagrams illustrating tiles in accordance with some embodiments.
Figure 10B:
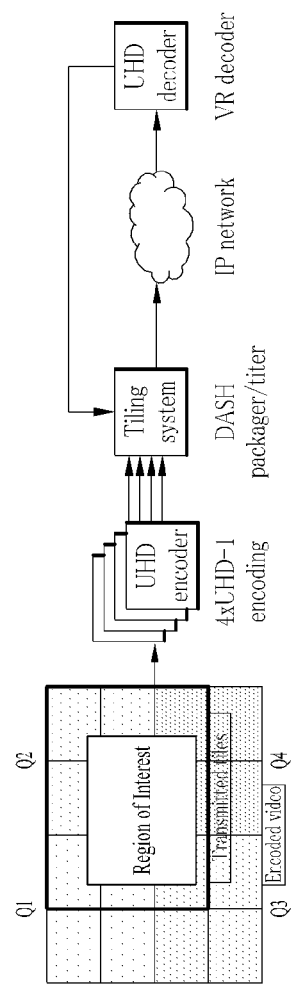

FIGS. 10A and 10B are diagrams illustrating tiles in accordance with some embodiments.

The 360 video data obtained after being projected onto a 2D image or and then subjected to region-wise packing may be divided into one or more tiles. FIG. 10A shows that one 2D image is divided into 16 tiles. Here, the 2D image may be the aforementioned projected frame or packed frame. In accordance with another embodiment of the 360 video transmission apparatus of the present disclosure, the data encoder may independently encode each tile.

The region-wise packing and tiling described above be distinguished from each other. The region-wise packing may refer to dividing 360 video data projected onto a 2D image into regions and processing the regions to improve coding efficiency or to adjust resolution. The tiling may referred to an operation of the data decoder of dividing the projected frame or the packed frame into sections called tiles and independently encoding each tile. When 360 video is provided, the user does not consume all parts of the 360 video simultaneously. The tiling may make it possible to transmit or consume only tiles corresponding to an important part or a certain part, such as a viewport currently viewed by a user, to on the receiving side on a limited bandwidth. When tiling is performed, the limited bandwidth may be utilized more efficiently, and the receiving side may reduce the computational load compared to a case where all 360 video data are processed at once.

A region and a tile are distinguished from each other, and accordingly the region and the tile do not need to be the same. However, in accordance with some embodiments, the region and the tile may refer to the same area. In accordance with some embodiments, region-wise packing is performed in accordance with a tile, and thus the region and the tile may be the same. In accordance with some embodiments, when each face in accordance with the projection scheme and a region are the same, each face in accordance with the projection scheme, the region, and the tile may refer to the same area. Depending on the context, a region may be called a VR region, or a tiled may be called as a tile region.

A region of interest (ROI) may refer to an area of interest of users, as suggested by a 360 content provider. In producing a 360 video, the 360 content provider may create the 360 video, assuming that users will be interested in a certain area. In accordance with some embodiments, the ROI may correspond to an area in which important content is played in the content of the 360 video.

In accordance with another embodiment of the 360 video transmission/reception apparatus, the receiving-side feedback processor may extract and collect viewport information and transmit the same to the transmitting-side feedback processor. In this process, viewport information may be transferred between both sides using both network interfaces. In the 2D image of FIG. 10A, a viewport 1000 is displayed. Here, the viewport may span 9 tiles on the 2D image.

In some embodiments, the 360 video transmission apparatus may further include a tiling system. In accordance with some embodiments, the tiling system may be arranged next to the data encoder (as shown in FIG. 10B), may be included in the above-described data encoder or transmission processor, or may be included in the 360 video transmission apparatus as a separate internal/external element.

The tiling system may receive viewport information from the feedback processor of the transmitting side. The tiling system may select and transmit only tiles including the viewport region. In the 2D image shown in FIG. 10A, only 9 tiles including the viewport region 1000 among the 16 tiles may be transmitted. Here, the tiling system may transmit the tiles over broadband in a unicast manner. This is because the viewport region varies among users.

In some embodiments, the transmitting-side feedback processor may deliver the viewport information to the data encoder. The data encoder may encode the tiles including the viewport region with higher quality than the other tiles.

In some embodiments, the transmitting-side feedback processor may deliver the viewport information to the metadata processor. The metadata processor may deliver metadata related to the viewport region to each internal element of the 360 video transmission apparatus, or may include the same in the 360 video-related metadata.

As the tiling operation is performed, the transmission bandwidth may be saved, and data processing/transmission may be performed efficiently by performing differentiated processing on each tile.

The above-described embodiments related to the viewport region may be applied to specific regions other than the viewport region in a similar manner. For example, a region that users are determined to be mainly interested in through the gaze analysis described above, the ROI, and a region that is played first when the user views 360 video through a VR display (initial viewpoint) may be processed in the same manner as the viewport region described above.

In accordance with another embodiment of the 360 video transmission apparatus, the transmission processor may process each tile differently for transmission. The transmission processor may apply different transmission parameters (modulation order, code rate, etc.) for the respective tiles, such that the data delivered for each tile may have different robustness.

Then, the transmitting-side feedback processor may deliver the feedback information received from the 360 video reception apparatus to the transmission processor, such that the transmission processor performs differentiated processing on each tile for transmission. For example, the transmitting-side feedback processor may deliver viewport information received from the receiving side to the transmission processor. The transmission processor may perform processing for transmission on the tiles including the viewport region, such that the tiles may have higher robustness than the other tiles.

FIG. 11 shows an example of 360-degree video-related metadata in accordance with some embodiments.

As described above, the 360-degree video-related metadata may include various metadata about 360-degree video. Depending on the context, the 360-degree video-related metadata may be referred to as 360-degree video related signaling information. The 360-degree video-related metadata may be transmitted in a separate signaling table, may be transmitted in a DASH MPD, or may be transmitted in the form of a box in a file format such as ISOBMFF. When the 360-degree video-related metadata is included in a box form, it may be included in various levels such as file, fragment, track, sample entry, and sample to include metadata for the data of the corresponding level.

In accordance with some embodiments, a part of the metadata which will described later may be configured and delivered in a signaling table, and the other part thereof may be included in a file format in a box or track form.

In accordance with some embodiments of the 360-degree video-related metadata, the 360-degree video-related metadata may include default metadata related to a projection scheme, stereoscopic related metadata, and initial view/initial viewpoint-related metadata, ROI-related metadata, FOV (Field of View)-related metadata, and/or cropped region-related metadata. In accordance with some embodiments, the 360-degree video-related metadata may further include supplemental metadata.

Embodiments of 360-degree video-related metadata may include at least one of the default metadata, the stereoscopic related metadata, the initial view/viewpoint-related metadata, the ROI-related metadata, the FOV-related metadata, the cropped region-related metadata, and/or metadata that may be added later. Embodiments of the 360-degree video-related metadata in accordance with the present disclosure may be configured in various ways in accordance with the number of cases of detailed metadata included in each embodiment. In accordance with some embodiments, the 360-degree video-related metadata may further contain supplemental information in addition to the above-described information.

The stereo_mode field may indicate a 3D layout supported by the corresponding 360-degree video. Only this field may indicate whether the 360-degree video supports the 3D layout. In some embodiments, the is_stereoscopic field described above may be omitted. When the value of this field is 0, the 360-degree video may be in the mono mode.

That is, the projected 2D image may include only one mono view. In some embodiments, the 360-degree video may not support the 3D layout.

When the value of this field is 1 or 2, the 360-degree video may conform to a left-right layout and a top-bottom layout, respectively. The left-right layout and the top-bottom layout may also be called a side-by-side format and a top-bottom format, respectively. In the left-right layout, 2D images onto which the left/right images are projected may be positioned on the left and right in the image frame, respectively. In the top-bottom layout, the 2D images onto which the left/right images are projected may be positioned at the top and bottom of the image frame, respectively. When the other values for the field may be reserved for future use.

The initial view-related metadata may include information about a view (initial viewpoint) of the user when the 360-degree video is initially played. The initial view-related metadata may include an initial_view_yaw_degree field, an initial_view_pitch_degree field, and/or an initial_view_roll_degree field. In accordance with some embodiments, the initial view-related metadata may further include supplemental information.

The initial_view_yaw_degree field, the initial_view_pitch_degree field, and the initial_view_roll_degree field may indicate an initial view in playing back a corresponding 360-degree video. That is, the center point of the viewport that is initially displayed in playback may be indicated by these three fields. Specifically, the initial_view_yaw_degree field may indicate a yaw value for the initial view. That is, the initial_view_yaw_degree field may indicate the direction (sign) and degree (angle) of rotation of the position of the center point about the yaw axis. The initial_view_pitch_degree field may indicate a pitch value for the initial view. That is, the initial_view_pitch_degree field may indicate the direction (sign) and degree (angle) of rotation of the position of the center point about the pitch axis. The initial_view_roll_degree field may indicate a roll value for the initial view. That is, the initial_view_roll_degree field may indicate the direction (sign) and degree (angle) of rotation of the position of the center point about the roll axis. Based on the initial_view_yaw_degree field, the initial_view_pitch_degree field, and the initial_view_roll_degree field, an initial view in playing back a 360-degree video, that is, a center point of a viewport initially displayed in playback may be indicated. Thereby, a specific region of the 360-degree video may be displayed and provided to the user at the initial viewpoint. In addition, based on the field of view (FOV), the width and height of the initial viewport with respect to the indicated initial view may be determined. That is, using these three fields and the FOV information, the 360-degree video reception apparatus may provide the user with a certain region of the 360-degree video as an initial viewport.

In accordance with some embodiments, the initial view indicated by the initial view-related metadata may vary among scenes. That is, the scene of the 360-degree video changes in accordance with the temporal flow of the 360 content, and the initial view or initial viewport that the user sees first may vary among the scenes of the 360-degree video. In some embodiments, the initial view-related metadata may indicate an initial view for each scene. To this end, the initial view-related metadata may further include a scene identifier for identifies a scene to which the corresponding initial view is applied. In addition, since the FOV may vary among the scenes of the 360-degree video, the initial view-related metadata may further include scene-specific FOV information indicating the FOV corresponding to a scene.

The ROI-related metadata may include information related to the ROI described above. The ROI-related metadata may include a 2d_roi_range_flag field and/or a 3d_roi_range_flag field. The 2d_roi_range_flag field may indicate whether the ROI-related metadata includes fields representing an ROI based on a 2D image, and the 3d_roi_range_flag field may indicate whether the ROI-related metadata includes fields representing an ROI based on 3D space. In accordance with some embodiments, the ROI-related metadata may further include supplemental information such as differentiated encoding information in accordance with the ROI and differentiated transmission processing information in accordance with the ROI.

When the ROI-related metadata includes the fields representing an ROI based on a 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate minimum/maximum values of the coordinates of the top left end of the ROI. That is, the fields may indicate the minimum x coordinate, the maximum x coordinate, the minimum y coordinate, and the maximum y coordinate of the top left end, respectively.

The min_width field, the max_width field, the min_height field, and the max_height field may indicate the minimum/maximum values of the width and height of the ROI. That is, the fields may indicate the minimum value of the width, the maximum value of the width, the minimum value of the height, and the maximum value of the height, respectively.

The min_x field, the max_x field, the min_y field, and the max_y field may indicate the minimum/maximum values of the coordinates in the ROI. That is, the fields may indicate the minimum x coordinate, the maximum x coordinate, the minimum y coordinate, and the maximum y coordinate among the coordinates in the ROI, respectively. These fields may be omitted.

When the ROI-related metadata includes fields that represent an ROI based on coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate an area occupied by the ROI in 3D space with the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the the roll axis.

The min_field_of_view field and the max_field_of_view field may indicate the minimum/maximum value of the FOV of the corresponding 360-degree video data. FOV may refer to a field of view displayed at a time in playing back the 360-degree video. The min_field_of_view field and the max_field_of_view field may indicate the minimum and maximum values of the FOV, respectively. These fields may be omitted. These fields may be included in FOV-related metadata, which will be described later.

The FOV-related metadata may include information related to the FOV described above. The FOV-related metadata may include a content_fov_flag field and/or a content_fov field. In accordance with some embodiments, the FOV-related metadata may further include supplemental information, such as information related to the minimum/maximum values of the FOV described above.

The content_fov_flag field may indicate whether information about an FOV intended at the time of production of the 360-degree video is present. When the value of this field is 1, the content_fov field may be present.

The content_fov field may indicate information about an FOV intended at the time of production of a corresponding 360-degree video. In accordance with some embodiments, an area of a 360 image to be displayed to the user at one time may be determined based on a vertical or horizontal FOV of the 360-degree video reception apparatus. Alternatively, in accordance with some embodiments, an area of the 360-degree image to be displayed to the user at one time to may be determined considering the FOV information of this field.

The cropped region-related metadata may include information about an area actually containing 360-degree video data in an image frame. The image frame may include an active video area onto which the 360-degree video data is actually projected and an unprojected area. In some embodiments, the active video area may be referred to as a cropped region or a default display region. The active video area is a region where a 360-degree video is actually displayed on a VR display. The 360-degree video reception apparatus or VR display may process/display only the active video area. For example, when the aspect ratio of an image frame is 4:3, only the area of an image frame except a portion of the upper part and the lower part of the image frame may contain 360-degree video data. This area may be referred to as an active video area.

The cropped region-related metadata may include an is_cropped_region field, a cr_region_left_top_x field, a cr_region_left_top_y field, a cr_region_width field, and/or a cr_region_height field. In accordance with some embodiments, the cropped region-related metadata may further include supplemental information.

The is_cropped_region field may be a flag indicating whether the entire area of the image frame is used by a 360-degree video reception apparatus or a VR display. Here, an area to which 360-degree video data is mapped or an area displayed on the VR display may be referred to as an active video area. The is_cropped_region field may indicate whether the entire image frame is an active video area. When only a part of the image frame is an active video area, the following 4 fields may be further added.

The cr_region_left_top_x field, the cr_region_left_top_y field, the cr_region_width field, and the cr_region_height field may indicate an active video area in an image frame. These fields may indicate the x coordinate of the top left of the active video area, the y coordinate of the top left of the active video area, the width of the active video area, and the height of the active video area, respectively. The width and the height may be expressed in units of pixels.

The 360 video-based VR system may provide a visual/aural experience for different viewing orientations with respect to the user's position for the 360 video based on the above-described 360 video processing process. A VR system that provides a visual/aural experience for different viewing orientations at the user's fixed position for the 360 video may be referred to as a 3 degree of freedom (DoF)-based VR system. A VR system capable of providing an extended visual/aural experience for different viewing orientations at different viewpoints or viewing positions may be referred to as a 3DoF+ or 3DoF plus-based VR system.

Figure 12:
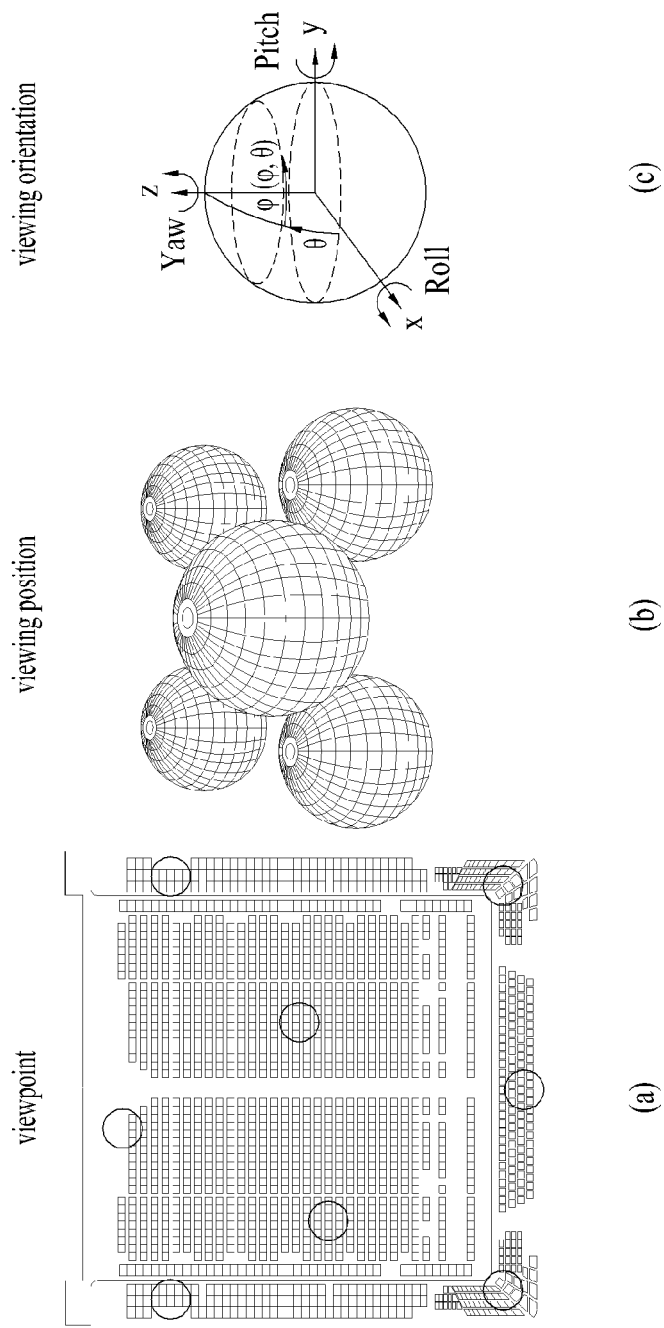
FIG. 12 schematically illustrates the concept of a viewpoint, a viewing position, and a viewing orientation.

FIG. 12 schematically illustrates the concept of a viewpoint, a viewing position, and a viewing orientation.

Referring to FIG. 12, when a space (e.g., a theater) as shown in (a) is assumed, circles marked in the space may represent different viewpoints. The video/audio provided at the respective viewpoints in the same space may be associated with each other in the same time zone. In some embodiments, different visual/aural experiences may be provided to the user in accordance with change in the user's gaze direction (e.g., head motion) at a specific viewpoint. That is, spheres of various viewing positions as shown in (b) may be assumes for a specific viewpoint, and image/audio/text information reflecting the relative position of each viewing position may be provided.

As shown in (c), at a specific viewing position of a specific viewpoint, visual/aural information for various directions may be delivered as in the case of the existing 3DoF. At this time, a main source (e.g., image/audio/text) and various additional sources may be integrated and provided. In some embodiments, information may be delivered in connection with or independently of the viewing orientation of the user.

Figure 13:
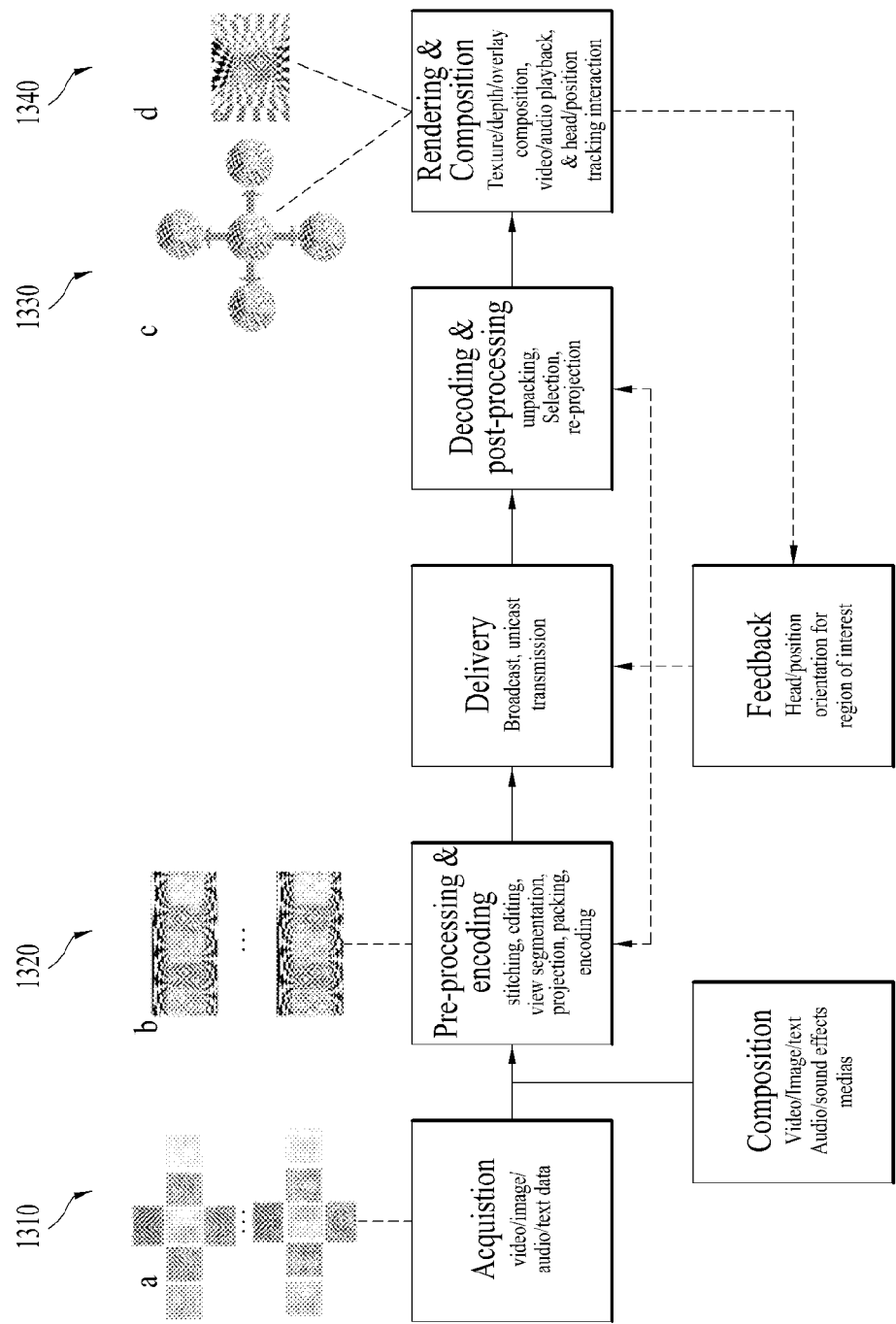
FIG. 13 is a diagram schematically showing an exemplary architecture for providing 3DoF+ video in accordance with some embodiments.

FIG. 13 is a diagram schematically showing an exemplary architecture for providing 3DoF+ video in accordance with some embodiments.

FIG. 13 may show a flow diagram of a 3DoF+ end-to-end system including 3DoF+ image acquisition, pre-processing, transmission, (post) processing, rendering, and feedback processes.

Referring to FIG. 13, the acquisition process may refer to a process of acquiring 360 video through capture, composition, or generation of 360 video. Through this process, multiple pieces of image/audio information in accordance with change in the gaze direction (e.g., head motion) may be acquired for multiple positions. Here, the image information may include depth information as well as visual information (e.g., texture). As illustrated in the example 1310 of image information, multiple pieces of information of different viewing positions in accordance with different viewpoints may be acquired respectively.

The composition process may include a procedure and method for composing video/image, audio/sound effect and text (a subtitle, etc.) from external media as well as the information acquired through an image/audio input device to include the same in the user experience.

The pre-processing process may be a preparation (pre-processing) process for transmitting/delivering the acquired 360 video, and may include the stitching process, the projection process, the region-wise packing process, and/or the encoding process described above. That is, this process may include a pre-processing process and an encoding process for changing/supplementing the image/sound/text information in accordance with the producer's intention. For example, the pre-processing of an image may include an operation of mapping the acquired visual information onto a 360 sphere (stitching), a correction operation of removing an area boundary, reducing a difference in color/brightness, or adding a visual effect to the image (editing), and operation of segmenting an image in accordance with a view (view segmentation), and operation of mapping an image on a 360 sphere to a 2D image (projection), and operation of rearranging the image in accordance with regions (region-wise packing), and an encoding operation of compressing the image information. As illustrated in the example 1320 in a video aspect, multiple projection images of different viewing positions in accordance with different viewpoint may be generated.

The transmission process may refer to a process of processing and transmitting the image/audio data and metadata formed through the preparation process (pre-processing process). As a method of transmitting multiple image/audio data and related metadata of different viewing positions in accordance with different viewpoints, a broadcast network or a communication network may be used as described above, or a unidirectional delivery method may be used.

The post-processing and composition process may refer to a post-processing process for decoding received/stored video/audio/text data and finally playing back the same. For example, the post-processing process may include an unpacking process of unpacking the packed image and a re-projection process of restoring a 3D spherical image from a 2D projected image.

The rendering process may refer to a process of rendering and displaying the re-projected image/video data in 3D space. In this process, the video/audio signal may be reconstructed into a form for final output. The viewing orientation, viewing position/head position, and viewpoint of the user's ROI may be tracked, and only necessary image/audio/text information may be selectively used in accordance with this information. In the case of an image signal, different viewing positions may be selected in accordance with the user's ROI as in the example 1330. Finally, an image of a specific viewing orientation of a specific viewing position at a specific viewpoint, like the example 1340, may be output.

Figure 14A:
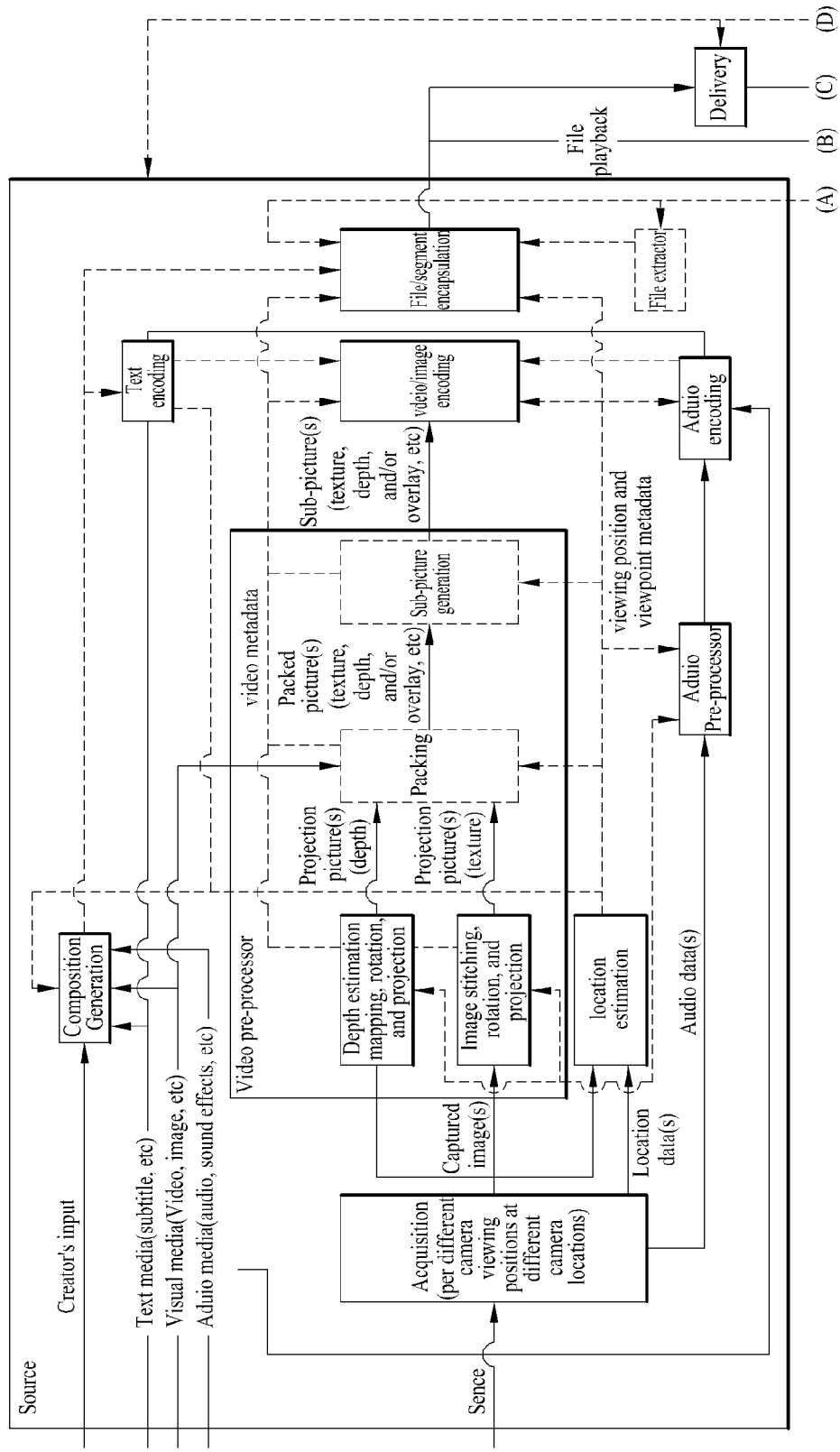
FIGS. 14A and 14B are diagrams illustrating an example of a 3DoF+ end-to-end system architecture.
Figure 14B:
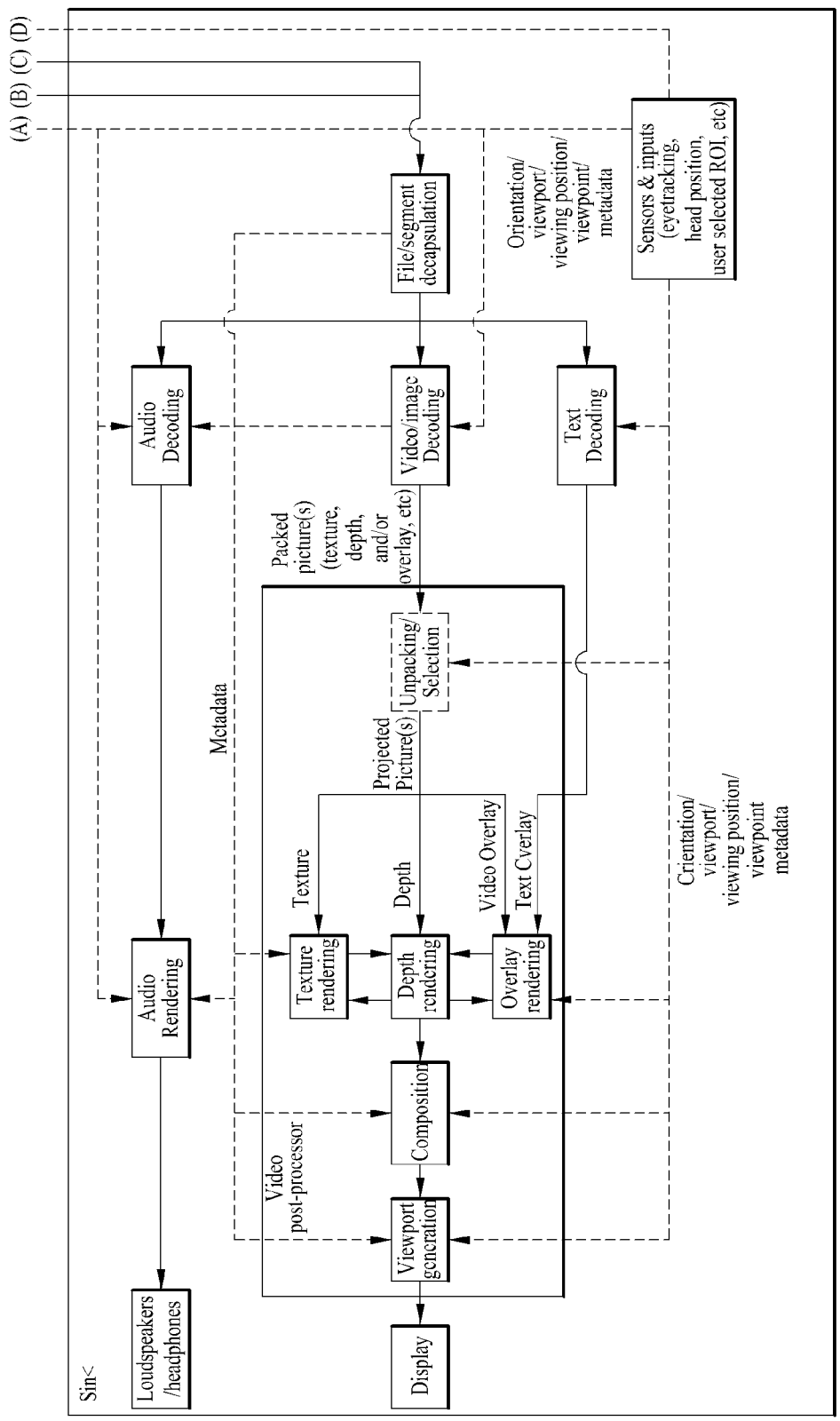

FIGS. 14A and 14B are diagrams illustrating an example of a 3DoF+ end-to-end system architecture.

3DoF+360 content as described above may be provided by the architecture of FIGS. 14A and 14B.

Referring to FIG. 14A, a 360 video transmission apparatus (transmission terminal) may include an acquisition unit configured to acquire 360 video (image)/audio data, a video/audio pre-processor configured to process the acquired data, and a composition generation unit configured to compose supplemental information, an encoding unit configured to encode text, audio, and a projected 360-degree video, an encapsulation unit configured to encapsulate the encoded data. As described above, the encoded data may be output in the form of a bitstream. The encoded data may be encapsulated in a file format such as ISOBMFF or CFF, or may be processed in the form of other DASH segments. The encoded data may be delivered to a 360 video reception apparatus through a digital storage medium. Alternatively, although not explicitly shown, the encoded data may be processed for transmission through a transmission processor as described above, and then transmitted over a broadcasting network or broadband.

The data acquisition unit may acquire different pieces of information simultaneously or sequentially in accordance with the sensor orientation (or viewing orientation for an image), sensor position for acquisition of information (or a viewing position for an image), and sensor information acquisition location (a viewpoint for an image). At this time, video, image, audio, and location information may be acquired.

In the case of image data, texture and depth information may be respectively acquired, and different video pre-processing may be performed thereon in accordance with characteristics of each component. For example, in the case of the texture information, a 360 omnidirectional image may be constructed using images of different viewing orientations of the same viewing position acquired at the same viewpoint based on the image sensor location information. To this end, an image stitching process may be performed. In addition, projection and/or region-wise packing for changing the image to a format for encoding may be performed. In the case of a depth image, an image may generally be acquired through a depth camera. In some embodiments, a depth image may be created in a form such as a texture. Alternatively, depth data may be generated based on separately measured data. After the images for the respective components are generated, sub-picture generation may be performed by performing additional packing into a video format for efficient compression or dividing the image into parts that are actually needed. Information about the video configuration used in the video pre-processing stage is delivered through video metadata.

When additionally given image/audio/text information is provided along with the acquired data (or data for a main service), information for composing such information at the time of final playback needs to be provided. The composition generation unit generates, based on the creator's intention, information for composing externally generated media data (video/image for visual media, audio/sound effect for audio media, and a subtitle for text) in the final playback stage. This information is delivered as composition metadata.

The image/audio/text information obtained after each process is compressed using each encoder and encapsulated in a file unit or a segment unit depending on the application. In some embodiments, only necessary information may be extracted (by a file extractor) in accordance with the video, file, or segment configuration method.

In addition, information for reconstructing each data in the receiver is delivered at a codec or file format/system level. This information includes information for video/audio reconstruction (video/audio metadata), composition information for overlay (composition metadata), video/audio playable position (viewpoint), and viewing position information (viewing position and viewpoint metadata) for each viewpoint. Such information may be generated through a separate metadata processor.

Referring to FIG. 14B, a 360 video reception apparatus (reception terminal) may include a file/segment decapsulation unit configured to decapsulate a received file or segment, a decoding unit configured to generate video/audio/text information from a bitstream, a post-processor configured to reconstruct image/audio/text in a form for playback, a tracking unit configured to track a user's ROI, and a display that is a playback device.

The bitstream generated through decapsulation may be divided into image/audio/text in accordance with the type of data and separately decoded into a playable form.

The tracking unit may generate information about a viewpoint of the user's region of interest, a viewing position at the viewpoint, and a viewing orientation at the viewing position based on the input information of the sensor and the user. This information may be used for selection or extraction of a region of interest by each module of the 360 video reception apparatus, or may be used for a post-processing process for emphasizing information about the region of interest. When delivered to the 360 video transmission apparatus, the information may be used for file extraction or sub-picture selection for efficient bandwidth use, and various ROI-based image reconstruction methods (viewport/viewing position/viewpoint dependent processing).

The decoded image signal may be processed using various processing methods in accordance with an image configuration method. When image packing is performed by the 360 video transmission apparatus, a process of reconstructing an image based on the information delivered through metadata is needed. In some embodiments, video metadata generated by the 360 video transmission apparatus may be used. In addition, the location of the user's region of interest generated through tracking, when images of multiple viewpoints, multiple viewing positions, or various viewing orientations are included in the decoded image, information matching the viewpoint, viewing position and viewing orientation of the user's ROI may be selected and processed. At this time, the viewing position and viewpoint related metadata generated by the transmission terminal may be used. When multiple components are delivered for a specific viewpoint, viewing position, or viewing orientation, or video information for overlay is separately delivered, a rendering process based thereon may be included. The video data (texture, depth, overlay) that has undergone the separate rendering process is subjected to a composition process. At this time, composition metadata generated by the transmission terminal may be used. Finally, information for playback in a viewport may be generated in accordance with the user's ROI.

A playable audio signal may be generated from the decoded audio signal through an audio renderer and/or a post-processing process. At this time, based on the information about the ROI of the user and the metadata delivered to the 360 video reception apparatus, information meeting the user's request may be generated.

The decoded text signal may be delivered to an overlay renderer and processed as text-based overlay information such as a subtitle. A separate text post-processing process may be included when necessary.

Figure 15:
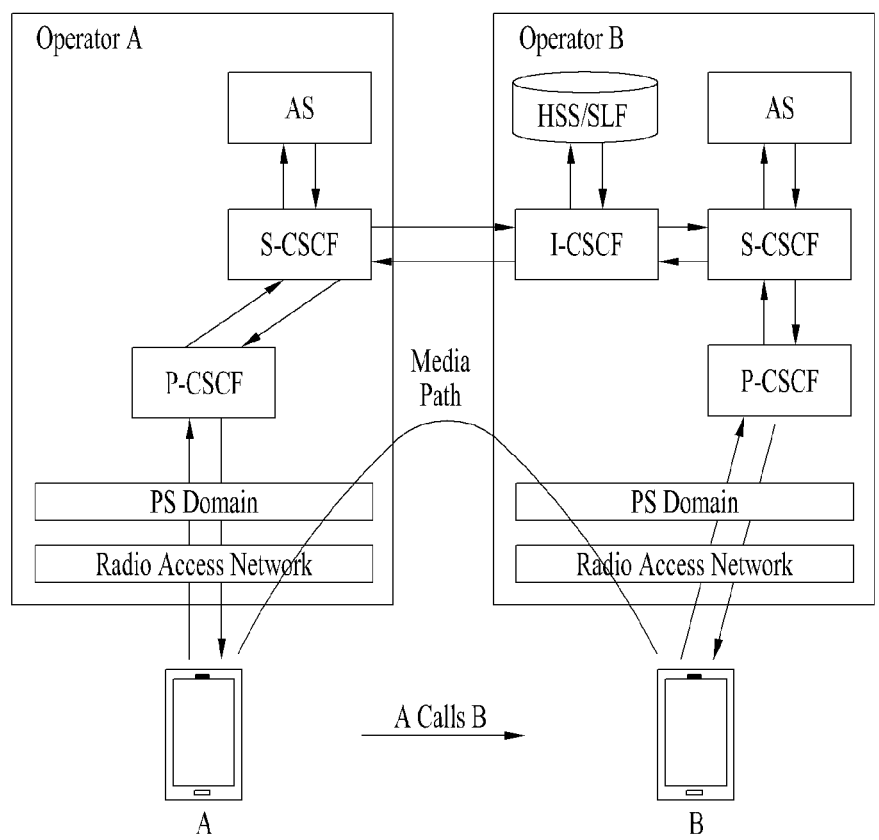
FIG. 15 is a diagram schematically illustrating an exemplary architecture for an MTSI service.
Figure 16:
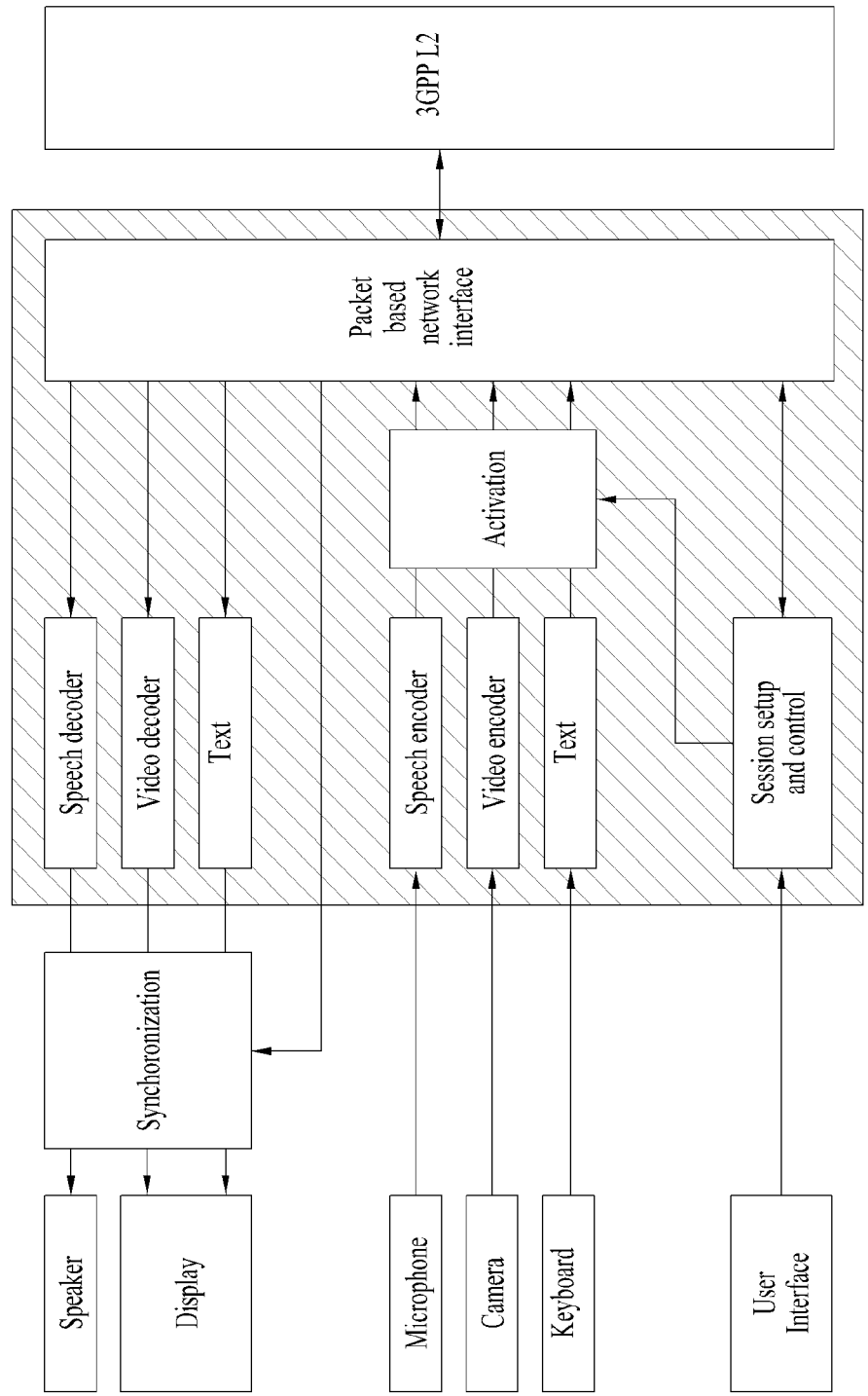
FIG. 16 is a diagram schematically illustrating an exemplary configuration of a terminal that provides an MTSI service.

FIG. 15 is a diagram schematically illustrating an exemplary architecture for an MTSI service, and FIG. 16 is a diagram schematically illustrating an exemplary configuration of a terminal that provides an MTSI service.

Multimedia Telephony Service for IMS (MTSI) represents a telephony service that establishes multimedia communication between user equipments (UEs) or terminals that are present in an operator network that is based on the IP Multimedia Subsystem (IMS) function. UEs may access the IMS based on a fixed access network or a 3GPP access network. The MTSI may include a procedure for interaction between different clients and a network, use components of various kinds of media (e.g., video, audio, text, etc.) within the IMS, and dynamically add or delete media components during a session.

FIG. 15 illustrates an example in which MTSI clients A and B connected over two different networks perform communication using a 3GPP access including an MTSI service.

MTSI client A may establish a network environment in Operator A while transmitting/receiving network information such as a network address and a port translation function to/from the proxy call session control function (P-CSCF) of the IMS over a radio access network. A service call session control function (S-CSCF) is used to handle an actual session state on the network, and an application server (AS) may control actual dynamic server content to be delivered to Operator B based on the middleware that executes an application on the device of an actual client.

When the I-CSCF of Operator B receives actual dynamic server content from Operator A, the S-CECF of Operator B may control the session state on the network, including the role of indicating the direction of the IMS connection. At this time, the MTSI client B connected to Operator B network may perform video, audio, and text communication based on the network access information defined through the P-CSCF. The MTSI service may perform interactivity such as addition and deletion of individual media stream setup, control and media components between clients based on SDP and SDPCapNeg in SIP invitation, which is used for capability negotiation and media stream setup, and individual, control and media components. Media translation may include not only an operation of processing coded media received from a network, but also an operation of encapsulating the coded media in a transport protocol.

When the fixed access point uses the MTSI service, as shown in FIG. 16, the MTSI service is applied in the operations of encoding and packetizing a media session obtained through a microphone, a camera, or a keyboard, transmitting the media session to a network, receiving and decoding the media session though the 3GPP Layer 2 protocol, and transmitting the same to a speaker and a display.

However, in the case of communication based on FIGS. 15 and 16, which are based on the MTSI service, it is difficult to apply the service when 3DoF, 3DoF+ or 6DoF media information for generating and transmitting one or more 360 videos (or 360 images) captured by two or more cameras is transmitted and received.

FIGS. 17 to 22 are diagrams schematically illustrating examples of FLUS architecture.

Figure 17:
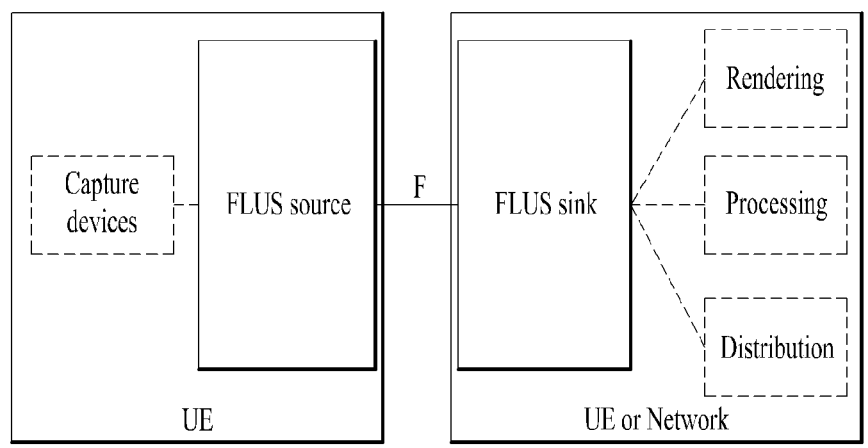
FIGS. 17 to 22 are diagrams schematically illustrating examples of FLUS architecture.

FIG. 17 illustrates an example of communication performed between user equipments (UEs) or between a UE and a network based on Framework for Live Uplink Streaming (FLUS) in a wireless communication system. The FLUS source and the FLUS sink may transmit and receive data to and from each other using an F reference point.

In this specification, "FLUS source" may refer to a device configured to transmit data to an FLUS sink through the F reference point based on FLUS. However, the FLUS source does not always transmit data to the FLUS sink. In some cases, the FLUS source may receive data from the FLUS sink through the F reference point. The FLUS source may be construed as a device identical/similar to the image transmission apparatus or 360 video transmission apparatus described herein, as including the image transmission apparatus or 360 video transmission apparatus, or as being included in the image transmission apparatus or 360 video transmission apparatus. The FLUS source may be, for example, a UE, a network, a server, a cloud server, a set-top box (STB), a base station, a PC, a desktop, a laptop, a camera, a camcorder, a TV, or the like, and may be an element or module included in the illustrated apparatuses. Further, devices similar to the illustrated apparatuses may also operate as a FLUS source. Examples of the FLUS source are not limited thereto.

In this specification, "FLUS sink" may refer to a device configured to receive data from an FLUS source through the F reference point based on FLUS. However, the FLUS sink does not always receive data from the FLUS source. In some cases, the FLUS sink may transmit data to the FLUS source through the F reference point. The FLUS sink may be construed as a device identical/similar to the image reception apparatus or 360 video reception apparatus described herein, as including the image reception apparatus or 360 video reception apparatus, or as being included in the image reception apparatus or 360 video reception apparatus. The FLUS sink may be, for example, a network, a server, a cloud server, an STB, a base station, a PC, a desktop, a laptop, a camera, a camcorder, a TV, or the like, and may be an element or module included in the illustrated apparatuses.

Further, devices similar to the illustrated apparatuses may also operate as a FLUS sink. Examples of the FLUS sink are not limited thereto.

While the FLUS source and the capture devices are illustrated in FIG. 17 as constituting one UE, embodiments are not limited thereto. The FLUS source may include capture devices. In addition, a FLUS source including the capture devices may be a UE. Alternatively, the capture devices may not be included in the UE, and may transmit media information to the UE. The number of capture devices may be greater than or equal to one.

While the FLUS sink, a rendering module (or unit), a processing module (or unit), and a distribution module (or unit) are illustrated in FIG. 17 as constituting one UE or network, embodiments are not limited thereto. The FLUS sink may include at least one of the rendering module, the processing module, and the distribution module. In addition, a FLUS sink including at least one of the rendering module, the processing module, and the distribution module may be a UE or a network. Alternatively, at least one of the rendering module, the processing module, and the distribution module may not be included in the UE or the network, and the FLUS sink may transmit media information to at least one of the rendering module, the processing module, and the distribution module. At least one rendering module, at least one processing module, and at least one distribution module may be configured. In some cases, some of the modules may not be provided.

In one example, the FLUS sink may operate as a media gateway function (MGW) and/or application function (AF).

In FIG. 17, the F reference point, which connects the FLUS source and the FLUS sink, may allow the FLUS source to create and control a single FLUS session. In addition, the F reference point may allow the FLUS sink to authenticate and authorize the FLUS source. Further, the F reference point may support security protection functions of the FLUS control plane F-C and the FLUS user plane F-U.

Figure 18:
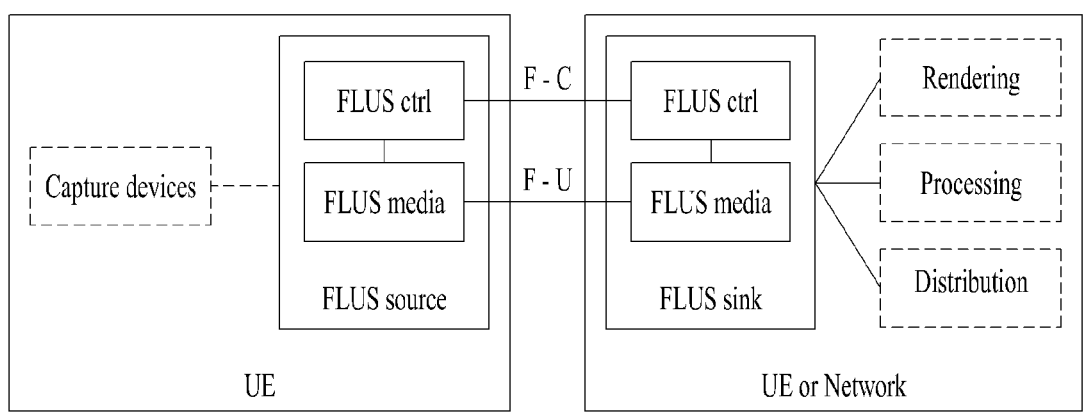

Referring to FIG. 18, the FLUS source and the FLUS sink may each include a FLUS ctrl module. The FLUS ctrl modules of the FLUS source and the FLUS sink may be connected via the F-C. The FLUS ctrl modules and the F-C may provide a function for the FLUS sink to perform downstream distribution on the uploaded media, provide media instantiation selection, and support configuration of the static metadata of the session. In one example, when the FLUS sink can perform only rendering, the F-C may not be present.

In one embodiment, the F-C may be used to create and control a FLUS session. The F-C may be used for the FLUS source to select a FLUS media instance, such as MTSI, provide static metadata around a media session, or select and configure processing and distribution functions.

The FLUS media instance may be defined as part of the FLUS session. In some cases, the F-U may include a media stream creation procedure, and multiple media streams may be generated for one FLUS session.

The media stream may include a media component for a single content type, such as audio, video, or text, or a media component for multiple different content types, such as audio and video. A FLUS session may be configured with multiple identical content types. For example, a FLUS session may be configured with multiple media streams for video.

Referring to FIG. 18, the FLUS source and the FLUS sink may each include a FLUS media module. The FLUS media modules of the FLUS source and the FLUS sink may be connected through the F-U. The FLUS media modules and the F-U may provide functions of creation of one or more media sessions and transmission of media data over a media stream. In some cases, a media session creation protocol (e.g., IMS session setup for an FLUS instance based on MTSI) may be required.

Figure 19:
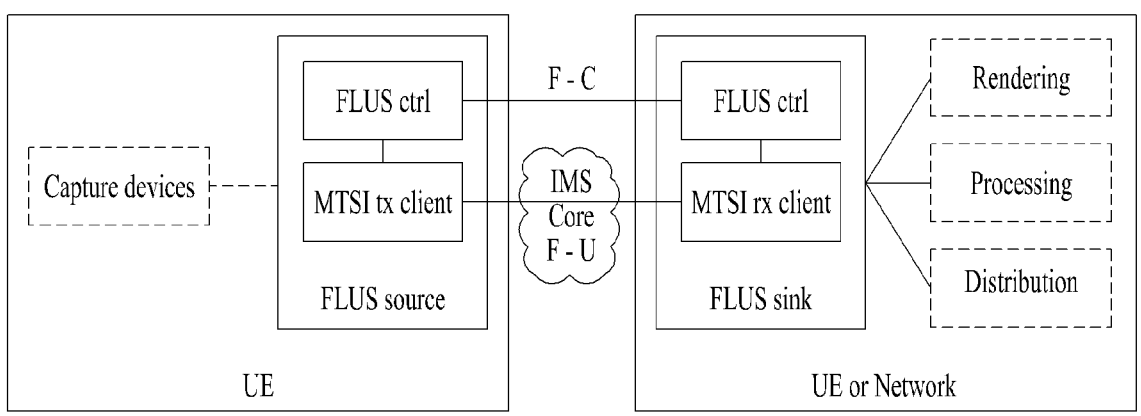

FIG. 19 may correspond to an example of an architecture of uplink streaming for MTSI. The FLUS source may include an MTSI transmission client (MTSI tx client), and the FLUS sink may include an MTSI reception client (MTSI rx client). The MTSI tx client and MTSI rx client may be interconnected through the IMS core F-U.

The MTSI tx client may operate as a FLUS transmission component included in the FLUS source, and the MTSI rx client may operate as a FLUS reception component included in the FLUS sink.

Figure 20:
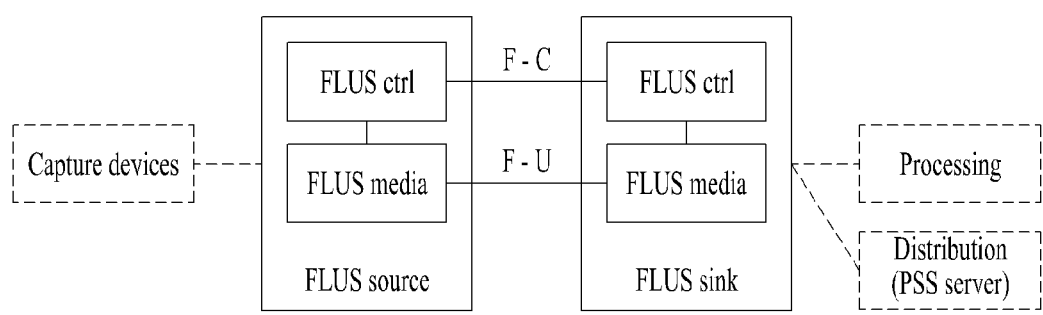

FIG. 20 may correspond to an example of an architecture of uplink streaming for a packet-switched streaming service (PSS). A PSS content source may be positioned on the UE side and may include a FLUS source. In the PSS, FLUS media may be converted into PSS media. The PSS media may be generated by a content source and uploaded directly to a PSS server.

Figure 21:
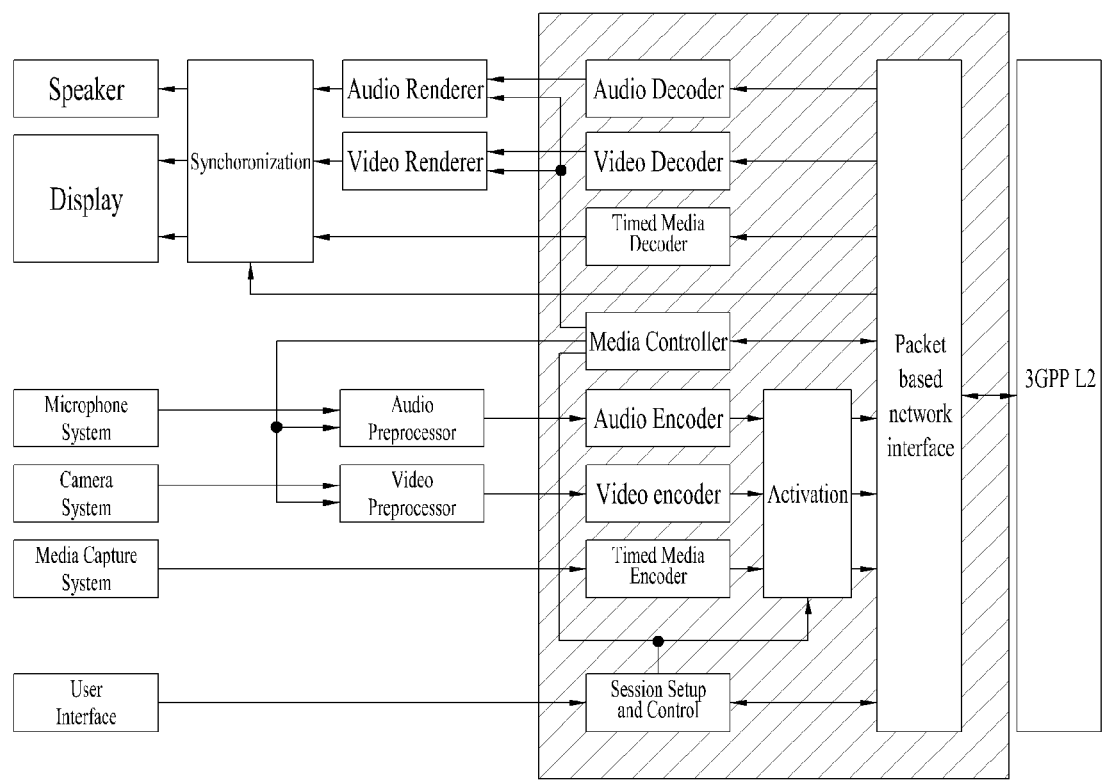

FIG. 21 may correspond to an example of functional components of the FLUS source and the FLUS sink. In one example, the hatched portion in FIG. 21 may represent a single device. FIG. 21 is merely an example, and it will be readily understood by those skilled in the art that embodiments of the present disclosure are not limited to FIG. 21.

Referring to FIG. 21, audio content, image content, and video content may be encoded through an audio encoder and a video encoder. A time media encoder may encode, for example, text media, graphic media, and the like.

Figure 22:
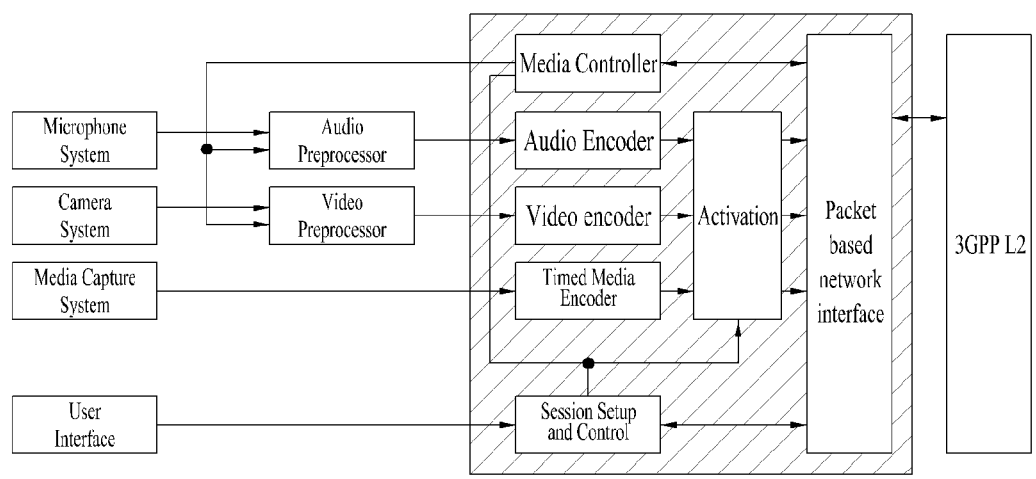

FIG. 22 may correspond to an example of a FLUS source for uplink media transmission. In one example, the hatched portion in FIG. 22 may represent a single device. That is, a single device may perform the function of the FLUS source. However, FIG. 22 is merely an example, and it will be readily understood by those skilled in the art that embodiments of the present disclosure are not limited to FIG. 22.

Figure 23:
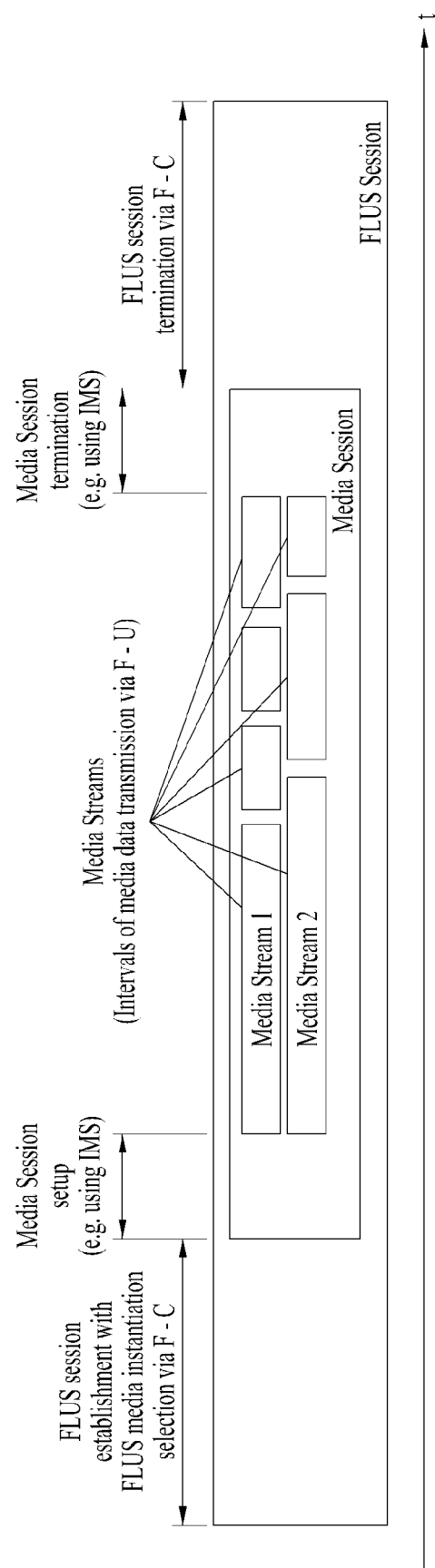
FIG. 23 is a diagram schematically illustrating an exemplary configuration of a FLUS session.

FIG. 23 is a diagram schematically illustrating an exemplary configuration of a FLUS session.

The FLUS session may include one or more media streams. The media stream included in the FLUS session is within a time range in which the FLUS session is present. When the media stream is activated, the FLUS source may transmit media content to the FLUS sink. In rest realization of HTTPS of the F-C, the FLUS session may be present even when an FLUS media instance is not selected.

Referring to FIG. 23, a single media session including two media streams included in one FLUS session is illustrated. In one example, when the FLUS sink is positioned in a UE and the UE directly renders received media content, the FLUS session may be FFS. In another example, when the FLUS sink is positioned in a network and provides media gateway functionality, the FLUS session may be used to select a FLUS media session instance and may control sub-functions related to processing and distribution.

Media session creation may depend on realization of a FLUS media sub-function. For example, when MTSI is used as a FLUS media instance and RTP is used as a media streaming transport protocol, a separate session creation protocol may be required. For example, when HTTPS-based streaming is used as a media streaming protocol, media streams may be directly installed without using other protocols. The F-C may be used to receive an ingestion point for the HTTPS stream.

FIGS. 24A to 24D are diagrams illustrating examples in which a FLUS source and a FLUS sink transmit and receive signals related to a FLUS session in accordance with some embodiments.

Figure 24A:
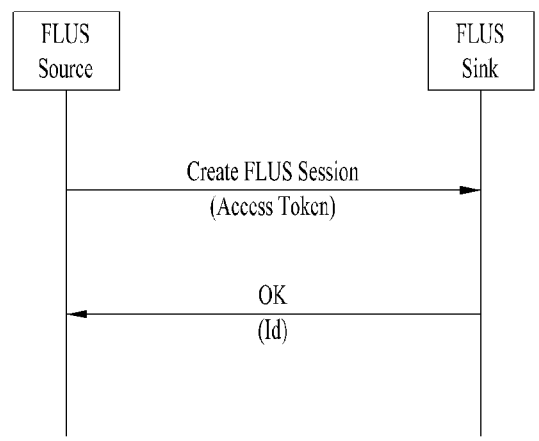
FIGS. 24A to 24D are diagrams illustrating examples in which a FLUS source and a FLUS sink transmit and receive signals related to a FLUS session in accordance with some embodiments.

FIG. 24A may correspond to an example in which a FLUS session is created between a FLUS source and a FLUS sink.

The FLUS source may need information for establishing an F-C connection to a FLUS sink. For example, the FLUS source may require SIP-URI or HTTP URL to establish an F-C connection to the FLUS sink.

To create a FLUS session, the FLUS source may provide a valid access token to the FLUS sink. When the FLUS session is successfully created, the FLUS sink may transmit resource ID information of the FLUS session to the FLUS source. FLUS session configuration properties and FLUS media instance selection may be added in a subsequent procedure. The FLUS session configuration properties may be extracted or changed in the subsequent procedure.

Figure 24B:
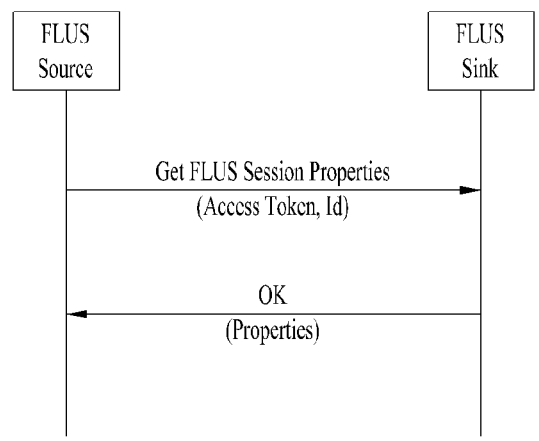

FIG. 24B may correspond to an example of acquiring FLUS session configuration properties.

The FLUS source may transmit at least one of the FLUS sink access token and the ID information to acquire FLUS session configuration properties. The FLUS sink may transmit the FLUS session configuration properties to the FLUS source in response to the at least one of the access token and the ID information received from the FLUS source.

In RESTful architecture design, an HTTP resource may be created. The FLUS session may be updated after the creation. In one example, a media session instance may be selected.

The FLUS session update may include, for example, selection of a media session instance such as MTSI, provision of specific metadata about the session such as the session name, copyright information, and descriptions, processing operations for each media stream including transcoding, repacking and mixing of the input media streams, and the distribution operation of each media stream. Storage of data may include, for example, CDN-based functions, Xmb for Xmb-u parameters such as BM-SC Push URL or address, and a social media platform for Push parameters and session credential.

Figure 24C:
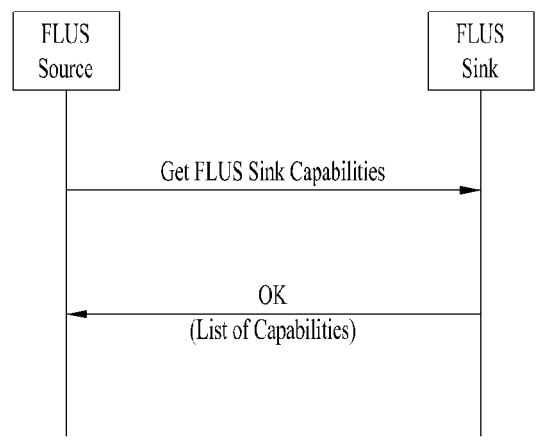

FIG. 24C may correspond to an example of FLUS sink capability discovery.

FLUS sink capabilities may include, for example, processing capabilities and distribution capabilities.

The processing capabilities may include, for example, supported input formats, codecs and codec profiles/levels, include transcoding with formats, output codecs, codec profiles/levels, bitrates, and the like, and reformatting with output formats, include combination of input media streams such as network-based stitching and mixing. Objects included in the processing capability are not limited thereto.

The distribution capabilities include, for example, storage capabilities, CDN-based capabilities, CDN-based server base URLs, forwarding, a supported forwarding protocol, and a supported security principle. Objects included in the distribution capabilities are not limited thereto.

Figure 24D:
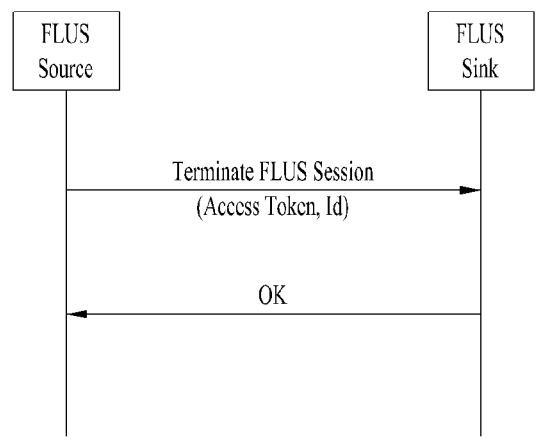

FIG. 24D may correspond to an example of FLUS session termination.

The FLUS source may terminate the FLUS session, data in accordance with the FLUS session, and the active media session. Alternatively, the FLUS session may be automatically terminated when the last media session of the FLUS session is terminated.

As illustrated in FIG. 24D, the FLUS source may transmit a Terminate FLUS Session command to the FLUS sink. For example, the FLUS source may transmit an access token and ID information to the FLUS sink to terminate the FLUS session. Upon receiving the Terminate FLUS Session command from the FLUS source, the FLUS sink may terminate the FLUS session, terminate all active media streams included in the FLUS session, and transmit, to the FLUS source, an acknowledgement that the Terminate FLUS Session command has been effectively received.

FIGS. 25A to 25F are diagrams illustrating examples of a process in which a FLUS source and a FLUS sink generate a 360 video while transmitting and receiving metadata about stitching of an image in accordance with some embodiments.

In this specification, the term "media acquisition module" may refer to a module or device for acquiring media such as images (videos), audio, and text. The media acquisition module may be a concept including an image acquisition module, an audio acquisition module, and a text acquisition module. The image acquisition module may be, for example, a camera, a camcorder, or a UE, or the like. The audio acquisition module may be a microphone, a UE, or the like. The text acquisition module may be a microphone, a PC, a UE, or the like. Objects included in the media acquisition module are not limited to the above-described example, and examples of each of the image acquisition module, audio acquisition module, and text acquisition module included in the media acquisition module are not limited to the above-described example.

A FLUS source in accordance with some embodiments may acquire image information for generating a 360 video from at least one media acquisition module. In some cases, the media acquisition module may be a FLUS source. In accordance with various examples as illustrated in FIGS. 25A to 25F, the media information acquired by the FLUS source may be delivered to the FLUS sink. As a result, at least one piece of 360 video content may be generated.

Figure 25A:
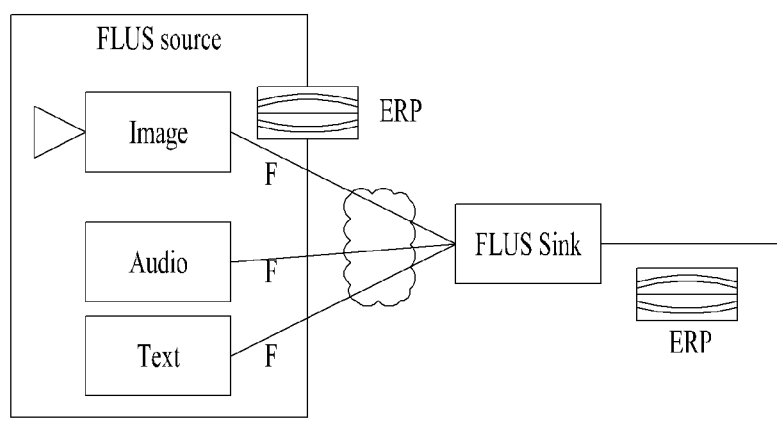
FIGS. 25A to 25F are diagrams illustrating examples of a process in which a FLUS source and a FLUS sink generate a 360 video while transmitting and receiving metadata about stitching of an image in accordance with some embodiments.

FIG. 25A shows an example in which each media acquisition module operates as a FLUS source. Referring to FIG. 25A, at least one image may be generated or acquired through streaming by one image (or video) acquisition module, which is a FLUS source. In some embodiments, the image acquisition module may be, for example, a fisheye camera, and the acquired image may be, for example, a fisheye image. The at least one image acquired by the image acquisition module may be stitched in a manner of equirectangular projection (ERP) based on the F-interface (or F reference point) and then transferred to the FLUS sink. An audio source acquired based on at least one microphone that is a FLUS source, a timed text acquired based on another FLUS source, a text acquisition module, and the image may be delivered to the FLUS sink based on different media sessions. The type of projection scheme is not limited to ERP, and may be replaced with other projection schemes such as cubemap and pyramid EAP. In FIG. 25A, the image session may be transmitted from the FLUS source to the FLUS sink based on one stream, and one stream may be received by the FLUS sink. For a video, multiple frames acquired by one image acquisition module may be continuously transmitted from the FLUS source to the FLUS sink.

Figure 25B:
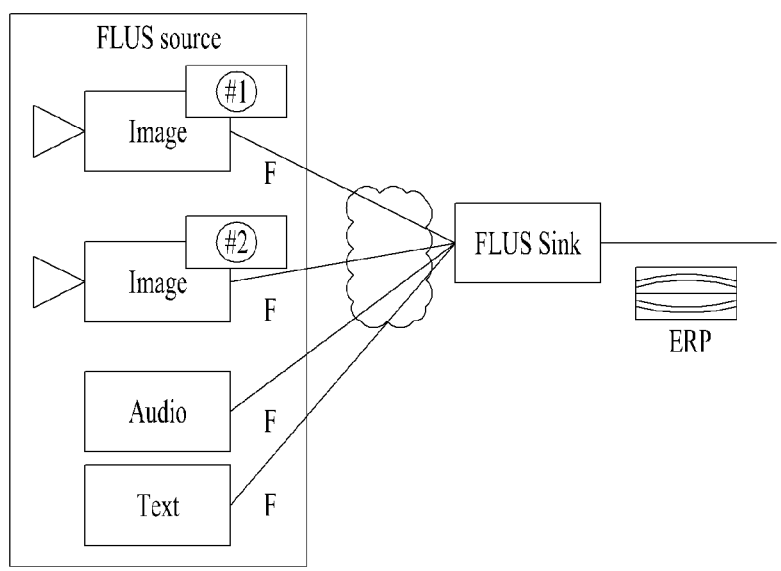

FIG. 25B shows another example in which each media acquisition module operates as a FLUS source. Unlike in FIG. 25A, in FIG. 25B, images acquired by at least one image acquisition module are not stitched by the cloud server based on the F-interface present between the FLUS source and the FLUS sink. Instead, multiple image streams may be transmitted from to the FLUS sink and multiple images transmitted through the multiple image streams may be stitched by the FLUS sink. For an audio stream and a text stream, multiple media streams may be transmitted from the FLUS source to the FLUS sink, as in the case of the image stream.

Figure 25C:
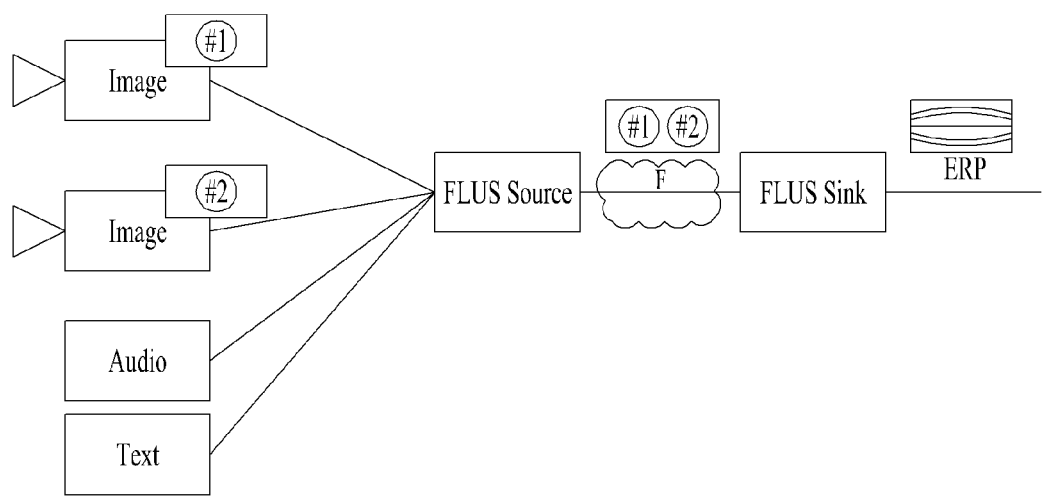

FIG. 25C shows an example in which the media acquisition module operates as a separate device separated from the FLUS source. As illustrated in FIG. 25C, multiple images acquired by multiple image acquisition modules may be transmitted to a FLUS source through multiple image streams. The multiple image streams may be packed into one image stream based on an F-interface that is present between the FLUS source and the FLUS sink, and transmitted to the FLUS sink. The FLUS sink may detect how many image (video) components are packed into one frame. When delivered from the FLUS sink to an end user or downstreamed, the packed image stream may be stitched and projected in a cloud.

Figure 25D:
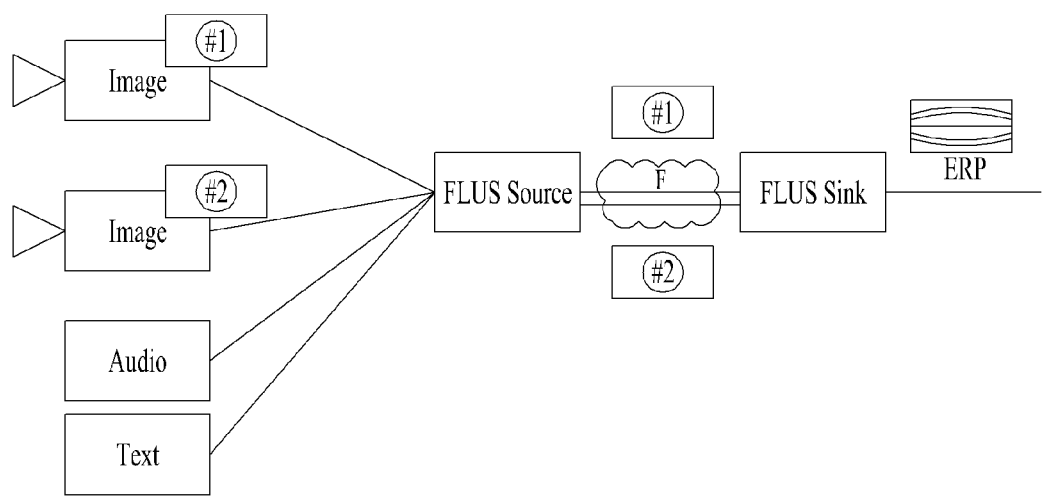

FIG. 25D shows another example in which the media acquisition module operates as a separate device separated from the FLUS source. Unlike in FIG. 25C, in FIG. 25D, multiple images may be transmitted to the FLUS source through multiple image streams, and then transmitted to the FLUS sink without being packed into one image stream by a cloud server. Here, the FLUS sink may include a post-processing module. The post-processing module may stitch and project the multiple images based on the field of view (FOV) direction or position information acquired from each image acquisition module.

Figure 25E:
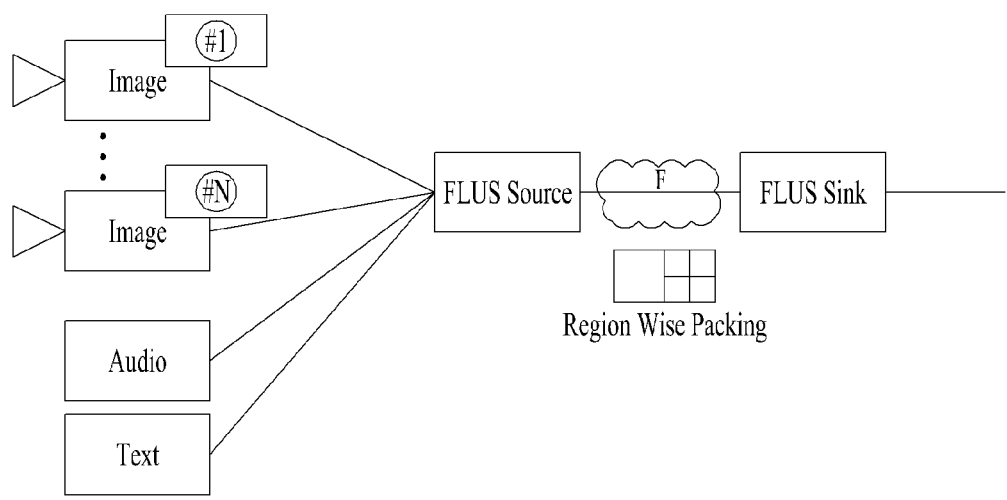

FIG. 25E shows another example in which the media acquisition module operates as a separate device separated from the FLUS source. Unlike in FIG. 25D, in FIG. 25E, after multiple images are transmitted to the FLUS source through multiple image streams, stitching, projection, and region-wise packing may be performed by the cloud server based on the F-interface, and then the image streams may be transmitted to the FLUS sink. Here, the FLUS sink may detect the type of projection scheme, information about each region of region-wise packing, and the like based on the metadata about the stitching received from the FLUS source.

Figure 25F:
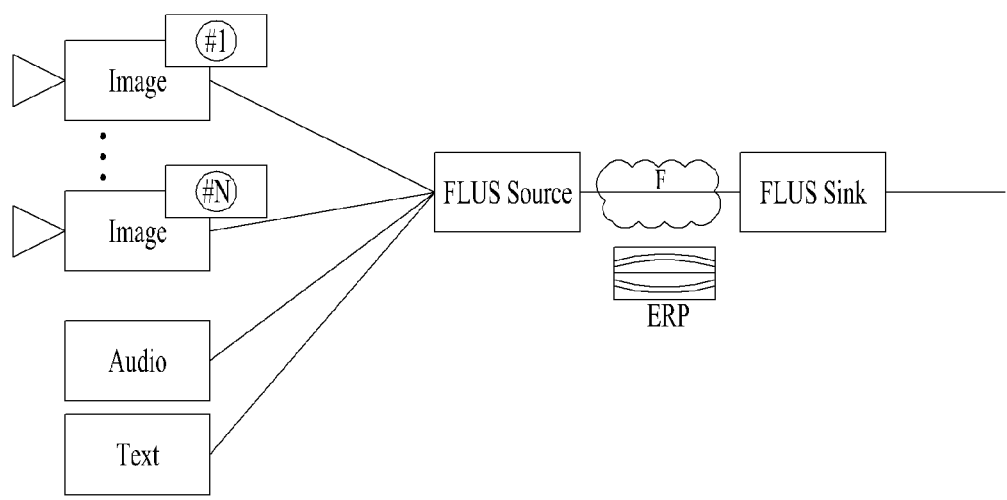

FIG. 25F shows another example in which the media acquisition module operates as a separate device separated from the FLUS source. Unlike in FIG. 25E, in FIG. 25F, after multiple images are transmitted to the FLUS source through multiple image streams, stitching and projection are performed by the cloud server based on the F-interface and then the image streams may be transmitted to the FLUS sink.

It will be readily understood by those skilled in the art that the scope of the present disclosure is not limited to some embodiments of FIGS. 25A to 25F and that the FLUS source and FLUS sink may use numerous architectures and processes in performing image stitching based on are the F-interface (or F reference point).

Figure 26A:
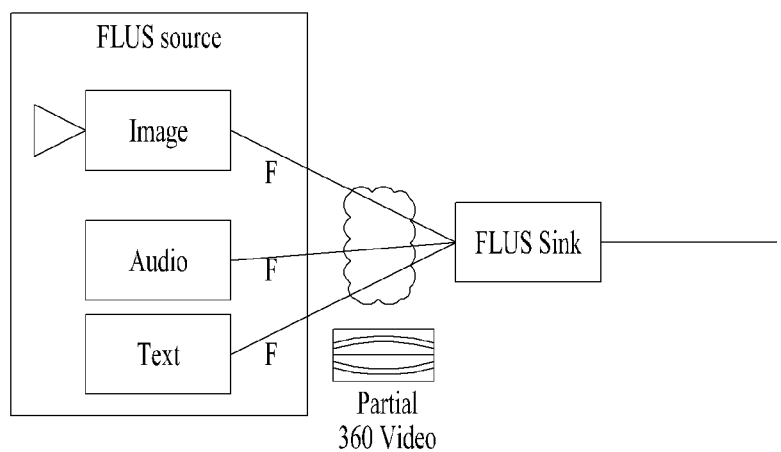
FIGS. 26A to 26C are diagrams illustrating examples of a process in which a FLUS source and a FLUS sink generate a partial 360 video while transmitting and receiving metadata about stitching of an image in accordance with some embodiments.
Figure 26B:
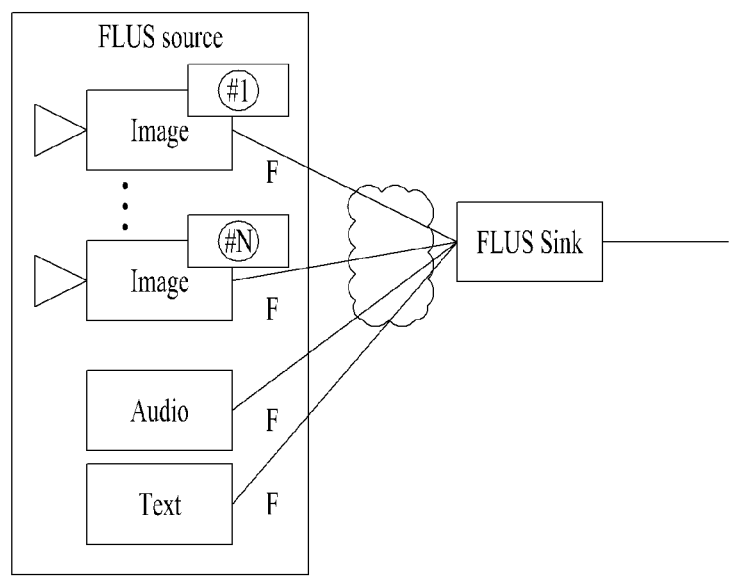
Figure 26C:
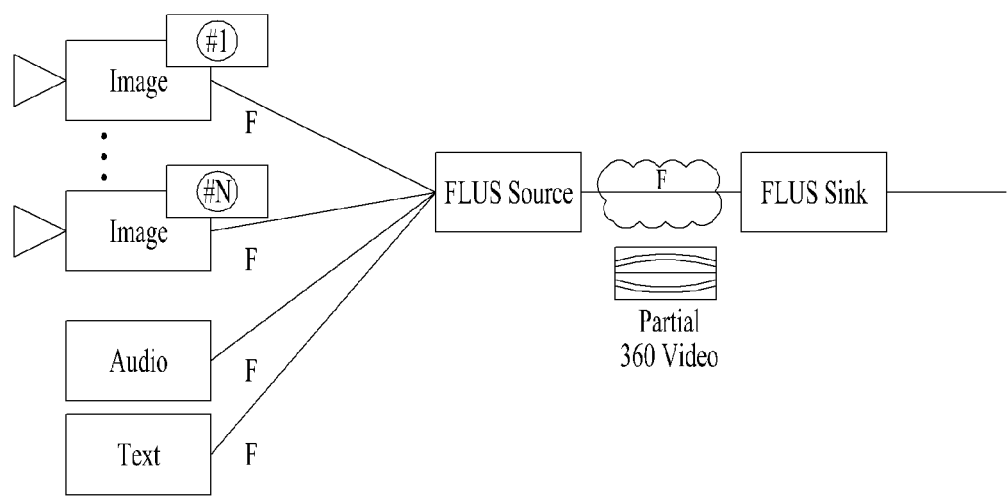

FIGS. 26A to 26C are diagrams illustrating examples of a process in which a FLUS source and a FLUS sink generate a partial 360 video while transmitting and receiving metadata about stitching of an image in accordance with some embodiments.

In some embodiments, as shown in FIGS. 26A and 26C, only partial 360 video that is part of the stitched 360 video may be transmitted from the FLUS source to the FLUS sink.

Referring to FIG. 26A, each media acquisition module may operate as a FLUS source, and at least one image acquired by one image acquisition module may be stitched into a 360 video by the cloud server based on the F-interface. Then, only a partial 360 video, which is a partial region of the stitched 360 video may be delivered to the FLUS sink. Here, the region of the partial 360 video may be determined based on the request information acquired from the FLUS sink by the FLUS source, or may be determined autonomously by the FLUS source.

Referring to FIG. 26B, each media acquisition module may operate as a FLUS source. After multiple images acquired by multiple image acquisition modules are stitched to a 360 video by the cloud server based on the F-interface, only partial 360 video may be delivered to the FLUS sink. As in the example of FIG. 26A, the region of the partial 360 video may be determined by the FLUS source based on the request information acquired from the FLUS sink, or may be autonomously determined by the FLUS source.

Referring to FIG. 26C, each media acquisition module may operate as a separate device from the FLUS source, and multiple images acquired by multiple image acquisition modules may be transmitted to the FLUS source through multiple image streams. The multiple images may be stitched by the cloud server present between the FLUS source and FLUS sink. Only the partial 360 video of the 360 video stitched by the cloud server (or based on the F-interface) may be transmitted to the FLUS sink. Here, as in FIG. 26A, the region of the partial 360 video may be determined based on the request information acquired from the FLUS sink by the FLUS source or may be determined autonomously by the FLUS source.

The series of image stitching operations described above with reference to FIGS. 25A to 26C may be performed based on the metadata about the stitching delivered from the F-interface of the FLUS source to the F-interface of the FLUS sink through the cloud server (or the F-interface may not be divided into an interface for the FLUS source and an interface for the FLUS sink, but may be considered as a single F-interface). The metadata about the stitching may be carried in a separate signaling table, or may be carried in an SDP parameter or 3GPP flus_metadata. In one example, the metadata about the stitching may be generated by the FLUS source or the FLUS sink. The metadata about the stitching may not only mean metadata transmitted from the FLUS source to the FLUS sink, but may also include metadata delivered from the FLUS sink to the FLUS source. In some cases, the metadata delivered from the FLUS source to the FLUS sink and the metadata delivered from the FLUS sink to the FLUS source may be distinguished from each other.

In this specification, the term "image transmission apparatus" may represent an apparatus that transmits information about an image to an image reception apparatus. However, the image transmission apparatus may not only transmit data to the image reception apparatus, but also, in some cases, receive information about an image from the image reception apparatus. In one example, the image transmission apparatus may communicate with the image reception apparatus based on FLUS. The image transmission apparatus may be interpreted as being the same as/similar to the FLUS source or the 360 video transmission apparatus described in this specification, including the FLUS source or the 360 video transmission apparatus, or being included in the FLUS source or the 360 video transmission apparatus. The image transmission apparatus may be, for example, a UE, a network, a server, a cloud server, a set-top box (STB), a base station, a PC, a desktop, a laptop, a camera, a camcorder, a TV, or the like, and may be an element or module included in the illustrated apparatuses. Further, devices similar to the illustrated apparatuses may also operate as an image transmission apparatus. Examples of the image transmission apparatus are not limited thereto.

In this specification, the term "image reception apparatus" may represent an apparatus that receives information about an image from an image transmission apparatus. However, the image reception apparatus may not only receive data from the image transmission apparatus, but also, in some cases, transmit information about an image to the image transmission apparatus. In one example, the image reception apparatus may communicate with the image transmission apparatus based on FLUS. The image reception apparatus may be interpreted as being the same as/similar to the FLUS sink or the 360 video reception apparatus described in this specification, including the FLUS sink or the 360 video reception apparatus, or being included in the FLUS sink or the 360 video reception apparatus. The image reception apparatus may be, for example, a network, a server, a cloud server, a UE, a set-top box (STB), a base station, a PC, a desktop, a laptop, a camera, a camcorder, a TV, or the like, and may be an element or module included in the illustrated apparatuses. Further, devices similar to the illustrated apparatuses may also operate as an image reception apparatus. Examples of the image reception apparatus are not limited thereto.

In this specification, specific terms or sentences are used to define specific information or concepts. For example, in this specification, specific terms or sentences are used to define specific metadata. In one example, this specification defines metadata representing information about whether stitching is available to the image transmission apparatus as "stitching_availability." However, "stitching_availability" may be replaced with various terms such as stitching availability information, stitching_avail_flag, and stitching_avail_index. Therefore, in this specification, a specific term or sentence used to define specific information or concepts should not be interpreted as limited to the name thereof, and needs to be interpreted based on various operations, functions, and effects in accordance with the content that the term intends to represent.

In one embodiment, the metadata about the stitching may contain at least one of information about image processing of the image transmission apparatus, capability information about at least one image (e.g., information about video capability), information about a case when a partial coverage function is available, information about a case when a synchronization function is available, characteristics information about at least one camera for acquiring at least one image, information about a case when the stitching is available, information about a case when packing is available, information about a case when region-wise packing is available, or information about a case when a fisheye-related function is available.

In this specification, the "information about the image processing" may include all information about acquisition of information about an image, stitching, projection, packing, region-wise packing, encoding, encapsulation, metadata generation, metadata transmission, metadata reception, and the like by the image transmission apparatus, and all information about acquisition of information about an image, stitching, projection, packing, region-wise packing, decoding, decapsulation, rendering, distribution, metadata generation, metadata transmission, metadata reception, and the like by the image reception apparatus. The information about the image processing included in the metadata about the stitching may include, for example, information about media session types supported by the image transmission apparatus (e.g., information about Media session type), information about stitching availability (e.g., information about Stitching_availability), information about packing availability (e.g., information about Packing_availability), information about 2D video availability (e.g., information about 2D video_availability), information about fisheye availability (e.g., information about Fisheye_availability), and information about region-wise packing availability (e.g., Region wise packing_availability), information about partial coverage availability (e.g., information about partial coverage_availability), and capability information about each of media types corresponding to the media session types (e.g., information about the video capability, information about the audio capability and information about the text capability), information about sync availability (e.g., information about Sync_availability), information about the number of the at least one camera (e.g., Number_of_capturing_device), information about the number of other image transmission apparatuses communicating with the image reception apparatus in parallel with the image transmission apparatus (e.g., information about the number of sources), and identification (ID) information about the image transmission apparatus, ID information about the image reception apparatus, ID information about the at least one camera, information about a file size of the at least one image (e.g., information about a media size), information about a playback time of the at least one image (e.g., information about the total media play time), information about a playback start time (e.g., information about a start time) and a playback end time (e.g., information about a stop time) of the at least one image, information about the number of streams receivable (or acceptable) by the image reception apparatus (e.g., information about the number of streams), information about the maximum number of image transmission apparatuses communicable with the image reception apparatus (e.g., information about the number of sources), information about the number of image reception apparatuses communicable with the image transmission apparatus (e.g., information about the number of sinks), or information about the maximum size of a file receivable (or acceptable) by the image reception apparatus (e.g., information about storage capability).

The information about the media session types may indicate media session types that the image transmission apparatus may transmit. The media session types may include, for example, a spherical video type, a 2D video type, a fisheye video type, an audio type, a text type, a stereo video type, and immersive_audio.

The information about stitching_availability may represent information about whether the stitching is available to the image transmission apparatus or information about whether the stitching is available to the image reception apparatus. The information about whether the stitching is available to the image transmission apparatus may be transmitted from the image transmission apparatus to an image reception apparatus, and the information about whether the stitching is available to the image reception apparatus may be transmitted from the image reception apparatus to the image transmission apparatus.

When the stitching is available to the image transmission apparatus, the image transmission apparatus may transmit detailed information about the stitching functionality of the image transmission apparatus to the image reception apparatus.

Alternatively, when the stitching is available to the image reception apparatus, the image transmission apparatus may receive detailed information about the stitching functionality of the image reception apparatus from the image reception apparatus. Then, the image transmission apparatus may perform re-stitching based on the information received from the image reception apparatus.

Alternatively, the image transmission apparatus and the image reception apparatus may perform the stitching. When the stitching is performed by the image transmission apparatus, the image reception apparatus may receive detailed information about the stitching functionality of the image transmission apparatus from the image transmission apparatus, and perform re-stitching based on the received detailed information about the stitching functionality of the image transmission apparatus.

When the image transmission apparatus has already completed packing, but a condition required by the image reception apparatus is not satisfied, the image transmission apparatus and the image reception apparatus may perform re-stitching through mutual negotiation. In some cases, the image reception apparatus alone may perform the re-stitching in accordance with the condition required by the image reception apparatus.

The information about Packing_availability may indicate information about whether the image transmission apparatus supports the function of packing captured media into one frame, or information about whether the image reception apparatus is capable of receiving the image of one frame into which the captured media is packed. The information about whether the packing is available to the image transmission apparatus may be transmitted from the image transmission apparatus to the image reception apparatus. The information about whether the packing is available to the image reception apparatus or the information about whether the image reception apparatus is capable of receiving the image of one frame into which the captured media is packed may be transmitted from the image reception apparatus to the image transmission apparatus.

When the packing is available to the image transmission apparatus, the image transmission apparatus may transmit information about the detailed function of the image transmission apparatus to the image reception apparatus.

Alternatively, when the image reception apparatus supports the packing frame, the image reception apparatus may transmit a detailed request for packing to the image transmission apparatus, and the image transmission apparatus may perform the packing based on the detailed request for the packing received from the image reception apparatus.

Alternatively, when the packing is already completed by the image transmission apparatus, but a condition required by the image reception apparatus is not satisfied, the image transmission apparatus and the image reception apparatus may perform re-packing through mutual negotiation.

The information about 2D video_availability may indicate information for signaling a case where the media type to be processed is 360 video, but the image transmission apparatus does not support the stitching functionality or the packing functionality, and stitching or packing should be performed by the image reception apparatus. In some embodiments, the image transmission apparatus may transmit detailed information about each stream of the captured video to the image reception apparatus.

The information about fisheye_availability may indicate whether the captured media was captured with a fisheye camera, information about whether the image reception apparatus can receive only fisheye type images (or videos), or the like. In addition, the information about fisheye_availability may include information about a function for stitching and packing a fisheye image, a detailed fisheye function of the image transmission apparatus, a detailed fisheye function of the image reception apparatus, and the like. When the image reception apparatus requests a fisheye image (or video), the image reception apparatus may transmit information about the detailed fisheye function of the image reception apparatus to the image transmission apparatus.

The information about region wise packing_availability may include information about whether the image transmission apparatus supports the region-specific packing function and information about a detailed region-wise packing function of the image reception apparatus. The image transmission apparatus may perform region-wise packing based on the request from the image reception apparatus. In addition, even when the region-wise packing has already been performed, the image transmission apparatus may perform the region-wise packing again based on a request from the image reception apparatus. In another example, the image reception apparatus may perform region-wise packing on a 360 video stitched image received from the image transmission apparatus.

The information about the partial coverage_availability may include information about whether the image transmission apparatus supports the partial coverage function for 360 video and information about whether the image reception apparatus supports the partial coverage function for 360 video. When the image transmission apparatus and the image reception apparatus support the partial coverage function, the image transmission apparatus may transmit information about a partial coverage region of the 360 video to the image reception apparatus based on the detailed information requested by the image reception apparatus. In addition, even when the partial coverage region has already been determined, the image transmission apparatus may reset the partial coverage region of the 360 video based on the detailed information requested by the image reception apparatus. In another example, the image reception apparatus may generate a stream only for a portion of the 360 video received from the image transmission apparatus.

The information about the video capability may indicate detailed information about a set value of a media stream when the type of media that may be transmitted through the media session is 360 video or 2D video. The image reception apparatus may transmit detailed information about a video media stream supported by the image reception apparatus to the image transmission apparatus. The detailed information about the video media stream requested by the image reception apparatus may be transmitted from the image transmission apparatus to the image reception apparatus.

The information about the audio capability may indicate detailed information about a set value of a media stream when the type of media that may be transmitted through a media session is audio. The image reception apparatus may transmit detailed information about an audio media stream supported by the image reception apparatus to the image transmission apparatus. Detailed information about an audio media stream requested by the image reception apparatus may be transmitted from the image transmission apparatus to the image reception apparatus.

The information about the text capability may indicate detailed information about a set value of a media stream when the type of media that may be transmitted through the media session is text. The image reception apparatus may transmit detailed information about a text media stream supported by the image reception apparatus to the image transmission apparatus. Detail information about a text media stream requested by the image reception apparatus may be transmitted from the image transmission apparatus to the image reception apparatus.

The information about the Sync_availability may indicate information about whether the image transmission apparatus supports synchronization between media such as video and audio, and information about whether the image reception apparatus supports synchronization between media such as video and audio, or the like. The image reception apparatus may send a request for a synchronized media stream to the image transmission apparatus. Alternatively, when synchronization is performed on the image reception apparatus, the image transmission apparatus may transmit information about a detailed synchronization function to the image reception apparatus.

The information about Number_of_capturing_device may indicate information about the number of streams that the image transmission apparatus may capture at one time when the image transmission apparatus is a capture device. The image reception apparatus may request one image transmission apparatus having one or more streams.

The information about the number of sources may indicate information about the number of other image transmission apparatuses communicating with the image reception apparatus in parallel with the image transmission apparatus, or the like.

The ID information about the image transmission apparatus may be transmitted to the image reception apparatus. The image reception apparatus may make a request to the image transmission apparatus for ID information about an image transmission apparatus, and the image transmission apparatus may transmit, to the image reception apparatus, the information about the image transmission apparatus having the ID requested by the image reception apparatus.

The ID information about the image reception apparatus may be transmitted to the image transmission apparatus. The image transmission apparatus may make a request for ID information about an image reception apparatus to the image reception apparatus. The image transmission apparatus may transmit media data to the image reception apparatus matching the ID information received from the image reception apparatus.

The ID information about the at least one camera or the ID information about the at least one capture device may be transmitted from the image transmission apparatus to the image reception apparatus. The image reception apparatus may make a request to the image transmission apparatus for the ID information about the at least one camera or at least one capture device.

The information about the media size may indicate information about the file size of the captured media. Alternatively, the information about the media size may indicate information about the size of a file for the image transmission apparatus to transmit to the image reception apparatus. The unit of media size may be, for example, byte, MB, GB, or the like.

The information about the total media play time may indicate information about the total play time for each media type. The unit of the total play time for each media type is, for example, seconds (sec). However, the unit is not limited thereto. For example, the unit may be minutes, hours, or the like.

The information about the start time may indicate information about a start time of playback of some media. For example, the information about the start time may indicate information about the start time of playback of at least one image captured by the capture device. The unit of the information about the start time may be seconds, but is not limited thereto. The start time may be determined autonomously by the image transmission apparatus, or may be determined by the image transmission apparatus based on the data received from the image reception apparatus. However, embodiments are not limited thereto.

The information about the stop time may indicate information about the end time of playback of some media. For example, the information about the stop time may indicate information about the end time of playback of at least one image captured by the capture device. The unit of the information about the stop time may be seconds, but is not limited thereto. The stop time may be determined autonomously by the image transmission apparatus, or may be determined by the image transmission apparatus based on the data received from the image reception apparatus. However, embodiments are not limited thereto.

The information about the number of streams may indicate information about the number of (media) streams receivable (or acceptable) by the image reception apparatus.

The information about the number of sources may indicate information about the maximum number of image transmission apparatuses communicable with the image reception apparatus.

The information about the number of sinks may indicate information about the number of image reception apparatuses communicating with an image transmission apparatus. When there is more than one image reception apparatus, each image reception apparatus may transmit information about the number of image transmission apparatuses receivable (or acceptable) by each image reception apparatus.

The information about the storage capability may indicate information about a maximum size of a file receivable (or acceptable) by an image reception apparatus, information about a maximum size of a file transmittable by an image transmission apparatus, or the like. The unit of the storage capability may be, for example, byte, MB, GB, or the like, and examples are not limited thereto.

The capability information about at least one image (or video capability information) may include, for example, at least one of information about a video type, information about an encoding type, information about a resolution, information about a chroma format, information about a color gamut, and information about a transfer function, information about an image file format, information about an image frame size, information about image a bit depth, information about a frame rate, information about a picture aspect ratio, information about color sampling, information about a white point, information about peak luminance, information about average luminance, information about codec configuration, or information about quality.

The information about "Video type" may specify information about whether the video type is a general 2D video or image, an image/video captured with a 360 camera, a stereoscopic image, or an image captured with a fisheye camera.

The information about "Encoding type" may indicate information about whether the encoding type of the captured image is HEVC/H.265 or AVC/H.264, information about a profile level, or the like.

The information about "Resolution" may define the resolution of each captured video stream (image stream). The resolution of the video stream (image stream) may be, for example, 1920×1080, 1280×1200, 3840×2160, or the like, but examples are not limited thereto.

The information about the chroma format may indicate information about the color space of the captured image. The information about the chroma format may include, for example, YCbCr, RGB, and XYZ, but is not limited thereto.

The information about the color gamut may indicate information about a container gamut of the captured image.

The information about the color gamut may include, for example, BT.709, BT.2020, and DCI P3, but is not limited thereto.

The information about the transfer function may indicate information about a transfer function of the captured image. The information about the transfer function may include, for example, BT.709, BT.2020, HDR PQ10, and HLG, but is not limited thereto.

The information about the image file format may indicate, for example, information about a file format of the captured image. The information about the image file format may include, for example, JPEG, EXR, BMP, RAW, and MP4, but is not limited thereto.

The information about the image frame size may include information about the frame size of at least one captured image.

The information about the bit depth may include information about a bit depth of at least one captured image, and may be, for example, 8 bits, 10 bits, 12 bits, or the like. Information that may be included in the information about the bit depth is not limited to the aforementioned examples.

The information about the frame rate may include information about the frame rate of at least one captured video (image). The information may include, for example, 25p, 30p, 48p, 50p, 60p, 90p, and 120p. Information that may be included in the information about the frame rate is not limited to the aforementioned examples.

The information about the picture aspect ratio may include information about a ratio of width to height of the captured video (image). The information about the picture aspect ratio may be, for example, 2:1, 16:9, 1:1, or the like, but is not limited to the aforementioned examples.

The information about color sampling may indicate information about downsampling of a captured video (image). For example, the information about color sampling may include 4:4:4, 4:2:2, and 4:2:0, but is not limited thereto.

The information about the white point may include information about the color value of white of a captured video (image).

The information about the peak luminance may indicate information about the highest luminance value among the luminance values represented by the pixel values present in one frame of the captured video (image).

The information about the average luminance may indicate information about the average value of the luminance values represented by the pixel values present in one frame of the captured video (image).

The information about the color configuration may indicate information for transmitting parameters of a format from the image transmission apparatus to the image reception apparatus or from the image reception apparatus to the image transmission apparatus. The information about the color configuration may be used as a setting value to be applied in accordance with an encoding type when the image transmission apparatus performs encoding.

The information about Quality may specify information for determining an encoding quality when the image transmission apparatus performs encoding on an image. For example, the information about Quality may be represented by a value between 0 and 10. When the information about the quality is 10, the quality may be determined as the best quality. When the information about the quality is 0, the quality may be determined as the worst quality. When the information about the quality is 5, the quality may be determined as a default quality.

The information about the case when the partial coverage function is available may include information about the center of a region to which the partial coverage function is applied (e.g., information about PartialCoverage_center_yaw, information about PartialCoverage_center_roll, information about PartialCoverage_center_pitch, etc.), and information about a vertical distance and horizontal distance for deriving a region to which the partial coverage function is applied (e.g., information about PartialCoverage_horizontal, information about PartialCoverage_vertical, etc.), information about the shape of the region to which the partial coverage function is applied (e.g., PartialCoverage_type), or processing information about a region to which the partial coverage function is not applied (e.g., information of the rest of 360 video coverage).

The information about the center of the region to which the partial coverage function is applied may include information for indicating a center value of a specific partial coverage region in transmitting the partial coverage region in a 360 video based on spherical coordinates. It may be expressed based on the angles of yaw, pitch and roll. The angle of each element may increase clockwise from the point of view directed from the origin to the positive end of each axis.

PartialCoverage_center_yaw may be specified based on the Z (up) axis, and may have a value greater than or equal to −90 degrees and less than 90 degrees. The information may be determined by the image transmission apparatus based on a request from the image reception apparatus, or may be determined by the image transmission apparatus based on predetermined data.

PartialCoverage_center_roll may be specified based on the X (back-to-front) axis, and may be a value greater than or equal to −180 degrees and less than 180 degrees. The information may be determined by the image transmission apparatus based on a request from the image reception apparatus, or may be determined by the image transmission apparatus based on predetermined data.

PartialCoverage_center_pitch may be specified based on the Y (lateral, side-to-side) axis, and may be a value greater than or equal to −180 degrees and less than 180 degrees. The information may be determined by the image transmission apparatus based on a request from the image reception apparatus, or may be determined by the image transmission apparatus based on predetermined data.

The information about PartialCoverage_horizontal may specify information about a horizontal distance for deriving a region to which the partial coverage function is applied. The horizontal distance may represent a horizontal distance from the center of the region to which the partial coverage described above is applied. The information may be determined by the image transmission apparatus based on a request from the image reception apparatus, or may be determined by the image transmission apparatus based on predetermined data.

The information about PartialCoverage_vertical may specify information about a vertical distance for deriving a region to which the partial coverage function is applied. The vertical distance may represent a vertical distance from the center of the region to which the partial coverage described above is applied. The information may be determined by the image transmission apparatus based on a request from the image reception apparatus, or may be determined by the image transmission apparatus based on predetermined data.

The information about PartialCoverage_type may specify information about a shape on the sphere of a partial coverage region. When PartialCoverage_type indicates 0, this may mean that the partial coverage region is in the form of four great circles. When PartialCoverage_type indicates 1, this may mean that the partial coverage region is in the form of two yaws and two pitches. However, embodiments are not limited to the above-described examples.

The information of the rest of 360 video coverage may specify processing information about a region that is not included in the partial coverage region.

The information of the case when a synchronization function is available may include at least one of information about a captured time of each of at least one stream acquired by the image transmission apparatus (e.g., information about a captured time for each stream), and information on spatial alignment between the at least one image (e.g., information about spatial Alignment), or information about a start time of each of the media types based on the at least one stream (e.g., Start time for each video/audio/text).

The information about the captured time for each stream may include information about the time record at which each stream is captured. In one example, when the synchronization function is supported in stitching or packing streams later, stitching and packing may be performed after establishing sync based on the captured time of each stream.

The information about spatial Alignment may specify information for performing coordinate system alignment, rotation, and the like when videos are not balanced on the horizontal axis and the vertical axis.

The information about the start time for each video/audio/text may specify information about a start time of an audio stream, a video (image) stream, a text stream, or the like. This information may be used to synchronize media streams having different start times. When the image transmission apparatus or the image reception apparatus supports the synchronization function, stitching and packing may be performed after the image transmission apparatus or the image reception apparatus performs synchronization based on the above information. Synchronization may be performed not only between different media types, but also between the same media types based on the above-described information.

The characteristics information (e.g., camera characteristics) about at least one camera for acquiring at least one image may include, for example, at least one of information about a camera type, information about the number of cameras, information about ref_view_id, information about the FoV, information about a resolution, information about an image format, information about a sensor type, information about a lens mode, information about lens distortion, information about prec_focal_length, information about prec_principal_point, information about prec_skew_factor, information about exponent_focal_length_x, information about mantissa_focal_length_x, information about exponent_focal_length_y, information about mantissa_focal_length_y, information about exponent_principal_point_x, information about mantissa_principal_point_x, information about exponent_principal_point_y, information about mantissa_principal_point_y, information about exponent_skew_factor, information about mantissa_skew_factor, information about prec_rotation_param, information about prec_translation_param, information about exponent_r[j][k], information about mantissa_r[j][k], information about mantissa_t[j], information about the number of streams for one camera, or information about a capture time.

The information about the camera type may indicate the type of capture camera, such as fisheye, 360 camera, 2D camera, 2D camera with rig, or stereoscopic. This information may be used by an image transmission apparatus that requires stitching or packing, or may be used when an image reception apparatus receiving a captured stream performs stitching or packing in accordance with the camera type.

The information about the number of cameras may specify information about the number of lenses used for a fisheye camera, a 360 camera, or a 2D camera to capture one stream image (or video). When the type is the 2D camera with rig, the number of cameras may mean the number of spots captured by the 2D camera while moving using the rig. The information may be used in stitching or packing, or may be used in defining the number of image transmission apparatuses or the number of image reception apparatuses. An image transmission apparatus may transmit the information to an image reception apparatus to allow the image reception apparatus to perform stitching or packing. Alternatively, the image transmission apparatus may perform stitching or packing based on the information and then transmit the information to the image reception apparatus.

The information about ref_view_id may specify ID information for identifying a view indicated by the Intrinsic Camera Parameters box based on intrinsic camera parameters.

The information about FoV may specify information about a field-of-view that may be represented by one camera. The FoV of each captured image may be divided into FoV_H and FoV_W and transmitted, and may be declared as a region that may be horizontally vertically symmetrical with resepec to camera_center. The value of each of FoV_H and FoV_W is always greater than 0 and less than or equal to 360.

The information about the resolution may specify information about the original resolution at the time when the captured image (or video) is delivered to the image transmission apparatus.

The information about the image format may specify information about the image format at the time when the captured image (or video) is delivered to the image transmission apparatus. The information about the image format may be one of the outputs of the camera.

The information about the sensor type may specify information about the type of a sensor used for the camera to capture an image (or video). The information about the sensor type may be used in performing image processing later.

The information about the lens mode may specify information about the lens mode in which an image or video is captured.

The information about lens distortion may specify information about distortion of a lens occurring when an image or video is captured.

The information about prec_focal_length may specify information about the exponential of the maximum allowable truncation error for focal_length_x and focal_length_y given by 2-prec_focal_length.

The information about prec_principal_point may specify information about the exponential of the maximum allowable truncation error for principal_point_x and principal_point_y given by 2-prec_principal_point.

The information about prec_skew_factor may specify information about the exponential of the maximum allowable truncation error for the skew factor given by 2-prec_skew_factor.

The information about exponent_focal_length_x may specify information about the exponential part of the horizontal focal length.

The information about mantissa_focal_length_x may specify information about the mantissa part of the horizontal focal length (of the i-th camera).

The information about exponent_focal_length_y may specify information about the exponential part of the vertical focal length.

The information about mantissa_focal_length_y may specify information about the mantissa part of the vertical focal length.

The information about exponent_principal_point_x may specify information about the exponential part of a horizontal principal point.

The information about mantissa_principal_point_x may specify information about the mantissa part of the horizontal principal point.

The information about exponent_principal_point_y may specify information about the exponential part of a vertical principal point.

The information about mantissa_principal_point_y may specify information about the mantissa part of the vertical principal point.

The information about exponent_skew_factor may specify information about the exponential part of the skew factor.

The information about mantissa_skew_factor may specify information about the mantissa part of the skew factor.

The information about prec_rotation_param may specify information about the exponential of the maximum allowable truncation error for r[j][k] given by 2-prec_rotation_param.

The information about prec_translation_param may specify information about the exponential of the maximum allowable truncation error for t[j] given by 2-prec_translation_param.

The information about exponent_r[j][k] may specify information about the exponential part of the (j, k) component of a rotation matrix.

The information about mantissa_r[j][k] may specify information about the mantissa part of the (j, k) component of the rotation matrix.

The information about exponent_t[j] may specify information about the exponential part of the j-th component of a translation vector. In one example, the value of exponent_t [j] may be included in a range of 0 to 62, inclusive.

The information about mantissa_t[j] may specify information about the mantissa part of the j-th component of the translation vector. In one example, the value of mantissa_t[j] may be included in a range of 0 to 62, inclusive.

The information about the number of streams for one camera may specify information about the number of streams that may be acquired in capturing an image (or video) with one camera. In one example, the information about the number of streams for one camera described above may be used in acquiring an image based on a fisheye camera.

The information about the capture time may specify information about record of the time at which each stream is captured. When the synchronization function is applied later in stitching or packing streams, synchronization may be performed based on the information about the capture time.

The information about the case when stitching is available may include at least one of information about the number of at least one stream acquirable by the image transmission apparatus (e.g., information about the number of streams for one FLUS source), information ID about the at least one stream (e.g., information about stream_ID), information about a projection scheme used when a 360 video generated based on the stitching is projected onto a 2D image (e.g., information about Projection scheme), information about a frame rate of the 360 video (e.g., information about the stitching video's output framerate), information about a resolution of the 360 video (e.g., information about the stitching image (video)'s output resolution), information about a sample rate of the 360 video (e.g., information about the stitching image (video)'s sample rate), and information about a chroma format of the 360 video (e.g., information about the stitching image (video)'s chroma format), information about an encoding quality of the at least one stream (e.g., information about Quality[stream_ID]), or information about a region covered by the at least one stream in the 360 video (e.g., information about 360coverage_stream [stream_ID]).

The information about the number of streams for one FLUS source may specify information about the number of streams acquirable from one image transmission apparatus when the image transmission apparatus supports 360 video. The information may be transmitted from the image transmission apparatus to the image reception apparatus.

The information about stream_ID may specify information about IDs of streams stitched into a 360 video.

The information about the projection scheme may specify information about the projection scheme used to project the stitched video data onto a 2D image. The projection scheme may be the same as or similar to the 360 video projection scheme. The information about the projection scheme may include, for example, an equirectangular projection scheme, a cylindrical projection scheme, a cube projection scheme, and a panoramic projection scheme. However, examples are not limited thereto. For example, the stitched video data may be projected onto a 2D image based on a method arbitrarily set by a user.

The information about the stitching video's output framerate may specify information about a frame rate of the stitched video (image) data. The information about the frame rate of the stitched video data may be transmitted from the image transmission apparatus to the image reception apparatus, but embodiments are not limited thereto. For example, the image reception apparatus may transmit the information about the frame rate at which the image reception apparatus may perform reception to the image transmission apparatus or make request for a specific frame rate to the image transmission apparatus. The image transmission apparatus may adjust the frame rate based on the information about the frame rate received from the image reception apparatus.

The information about the stitching video's output resolution may specify information about the resolution of the stitched video (image) data. The image transmission apparatus may arbitrarily determine a resolution for stitching, determine the resolution based on the data received from the image reception apparatus, or determine the resolution of the stitched video (image) data in accordance with a resolution transmittable by the image transmission apparatus or a resolution receivable (acceptable) by the image reception apparatus.

The information about the stitching image (video)'s sample rate may specify information about downsampling of a stitched image or video. For example, the information about the stitching image (video)'s sample rate may represent 4:4:4, 4:2:2, 4:2:0, or the like. The information about the stitching image (video)'s sample rate may be transmitted from the image transmission apparatus to the image reception apparatus or from the image reception apparatus to the image transmission apparatus. The image transmission apparatus may derive the capability of the image reception apparatus based on the information received from the image reception apparatus, and may stitch images (or videos) at the sample rate requested by the image reception apparatus.

The information about the stitching image (video)'s chroma format may specify information about a color space of a stitched image or video. For example, the information may be YCbCr, RGB, XYZ, or the like, but is not limited thereto. The information may be transmitted from the image reception apparatus to the image transmission apparatus or from the image reception apparatus to the image transmission apparatus. The image transmission apparatus may derive the capability of the image reception apparatus based on the information received from the image reception apparatus, and stitch images (or videos) based on the information requested by the image reception apparatus.

The information about Quality[stream_ID] may specify information about the encoding quality of the stitched stream. In an example, the best quality may be represented when the information indicates 1, the worst quality when the information indicates 0, and the default quality when the information indicates 5.

The information about 360coverage_stream [stream_ID] may specify information about a region occupied by each media stream in a 360 video. In one example, a region occupied by each media stream in the 360 video may be set based on information about 360coverage_stream_center [stream_ID], 360coverage_stream_vertical[stream_ID], and 360coverage_stream_horizontal[stream_ID]. The region of each stream may overlap with the regions of other streams. The information may be used when an image (or video) is not stitched in the image transmission apparatus but is stitched in the image reception apparatus, may be used when the image reception apparatus performs stitching based on the information about each stream stitched in the image transmission apparatus, and may also be used when the image transmission apparatus performs stitching based on information received from the image reception apparatus.

The information about the case when packing is available may include at least one of information about the number of at least one stream acquirable by the image transmission apparatus (e.g., information about the number of streams for one FLUS source), ID information about the at least one stream (e.g., information about ID for each stream), information about a size of a packed frame (e.g., information about a packed frame size), ID information about at least one sub-picture included in the packed frame (e.g., information about a sub picture ID), information about the number of the at least one sub-picture (e.g., information about the number of sub-images (pictures)), information about the center of each of the at least one sub-picture (e.g., information about the center of each sub-picture), information about the size of each of the at least one sub-picture (e.g., information about the sub-picture size)), information about an encoding quality of each of the at least one sub-picture (e.g., information about Quality[sub_picture_ID]), flip information about each of the at least one sub-picture (e.g., information about packing_flip[sub_picture_ID]), or rotation information about each of the at least one sub-picture (e.g., information about packing_rotation[sub_picture_ID]).

The information about the number of streams for one FLUS source may specify information about the number of streams acquirable from one image transmission apparatus when the image transmission apparatus supports 360 video. Alternatively, in one example, the information may represent information about the number of streams that one image transmission apparatus should include, which is requested by the image reception apparatus.

The information about the ID for each stream may represent information about the ID of each media stream. The image transmission apparatus may transmit the information to the image reception apparatus. Alternatively, the image reception apparatus may transmit ID information about a specific media stream to the image transmission apparatus to request the specific media stream.

The information about the packed frame size may specify information about the width and height of the packed frame. The image transmission apparatus may transmit the information to the image reception apparatus. Alternatively, the image reception apparatus may transmit, to the image transmission apparatus, information about a packed frame size receivable (acceptable) by the image reception apparatus.

The information about the sub-picture ID may specify ID information about each sub-picture present in the packed frame.

The information about the number of sub-images (picture) may specify information about the number of sub-pictures present in the packed frame. In one example, the image transmission apparatus may determine the number of sub-pictures in the packed frame based on the corresponding information received from the image reception apparatus.

The information about the center of each sub-picture may specify information about the center value of each sub-picture present in the packed frame.

The information about the sub-picture size may specify information about the size of each sub-picture present in the packed frame.

The information about Quality[sub_picture_ID] may specify information about an encoding quality of each sub-picture present in the packed frame. In one example, the best quality may be represented when the information indicates 10, the worst quality when the information indicates 0, and the default quality when the information indicates 5.

The information about the packing flip[sub_picture_ID] may specify information about the flip state of each sub-picture present in the packed frame. When the information indicates 0, this may indicate that the flip is not performed. When the information indicates 1, this may indicate that the top and bottom are flipped with respect to the horizontal axis. When the information indicates 2, this may indicate that the left and right sides are flipped with respect to the vertical axis.

The information about packing_rotation[sub_picture_ID] may specify information about rotation of each sub-picture present in the packed frame. The information may be a value for indicating the degree to which each media stream is rotated on the packed image into which each media stream is packed, and may be included in a range of values greater than or equal to 0 and less than 360.

The information about the case when the region-wise packing is available may include at least one of information about the number of packed regions (e.g., information about the number of regions), ID information about each of the packed regions (e.g., information about ID for each region), information about a guard band of the packed regions (e.g., information about guard_band_left_width, information about guard_band_right_width, information about guard_band_top_height, information about guard_band_bottom_height, information about gb_type, etc.), information about a projected picture to be subjected to the region-wise packing (e.g., information about proj_picture_height, information about proj_picture_width, etc.), information about projected regions included in the projected picture (e.g., information about proj_reg_width[i], information about proj_reg_height[i], information about proj_reg_top[i], information about proj_reg_left[i], etc.), information about packed regions (e.g., information about packed_reg_width, information about packed_reg_height, information about packed_reg_top, information about packed_reg_left, etc.), or information about an encoding quality of the packed regions (e.g., information about Quality[i]).

The information about the number of regions may include projected region information, packed region information, and information about the number of packed regions for indicating the guard band region information and the like.

The information about the ID for each region may specify ID information about each region. The number of IDs may not be greater than the number of regions.

The information about guard_band_left_width may specify information about the width of the guard band on the left side of the i-th packed region among related packed picture sample units.

The information about guard_band_right_width may specify information about the width of the guard band on the right side of the i-th packed region among the related packed picture sample units.

The information about guard_band_top_height may specify information about the height of the top guard band of the i-th packed region among the related packed picture sample units.

The information about guard_band_botttom_height may specify information about the height of the bottom guard band of the i-th packed region among the related packed picture sample units.

The information about gb_type may specify information about the type of the guard band of the i-th packed region. Suppose that j equal to 0, 1, 2, and 3 indicates the left, right, top, and bottom edges of each packed region, respectively. When gb_type[i][j] indicates 0, this may represent that the content of the guard band related to the content of the packed regions has not been specified. When the information about gb_not_used_for_pred_flag[i] indicates 0, gb_type[i][j] may not indicate 0. When gb_type[i][j] indicates 1, this may represent that the content of the guard band satisfies interpolation of sub-pixel values in the packed region and interpolation by fewer than 1 pixel outside the boundary of the packed region. When gb_type[i][j] indicates 2, this may represent actual image content having a quality that gradually changes from the picture quality of a region in which the content of the guard band is packed. When gb_type[i][j] indicates 3, this may represent actual image content having a picture quality of a region in which the content of the guard band is packed.

The information about Quality[i] may specify information about the encoding quality of each region. In one example, the best quality may be represented when the information indicates 10, the worst quality when the information indicates 0, and the default quality when the information indicates 5.

The information about proj_reg_width[i] may specify information about the width of the i-th projected region.

The information about proj_reg_height[i] may specify information about the height of the i-th projected region.

The information about proj_reg_top[i] and the information about proj_reg_left[i] may specify information about the top sample row and the leftmost sample column of the i-th projected region of a projected picture or a constituent picture included in the projected picture, respectively.

The information about proj_picture_height and the information about proj_picture_width may specify information about the width and height of the projected picture among the related projected picture sample units, respectively.

The information about packed_reg_width[i], the information about packed_reg_height[i], the information about packed_reg_top[i], and the information about packed_reg_left[i] may specify information about the width, height, top sample row, and leftmost sample column of the i-th packed region, respectively.

The information about the case when the fisheye-related function is available may include at least one of information about the number of at least one circular image (e.g., information about num_circular_images), information about a position of the at least one circular image (e.g., information about image_center_x and information about image_center_y), information about a size of at least one rectangle including each of the at least one circular image (e.g., information about rect_region_top, information about rect_region_left, information about rect_region_width, information about rect_region_height, etc.), information about a full-radius of the at least one circular image (e.g., information about full_radius), information about a scene-radius of the at least one circular image (e.g., information about scene_radius), information about a position of the fisheye camera (e.g., information about camera_center_azimuth, information about camera_center_elevation, information about camera_center_tilt, information about camera_center_offset_x, information about camera_center_offset_y, information about camera_center_offset_z, etc.), information about a field of view (FOV) of a fisheye lens included in the fisheye camera (e.g., information about field_of_view, information about displayed_fov, information about overlapped_fov, etc.), information about polynomial coefficients (e.g., information about num_polynomial_coefficients_distortion, information about polynomial_coefficient_K_distortion), flip information about the at least one circular image (e.g., information about image_flip), scaling information about the at least one circular image (e.g., information about image_scale_axis_angle, information about image_scale_x, information about image_scale_y, etc.), information for local application of the FOV (e.g., information about num_local_fov_region, information about start_radius, information about end_radius, information about start_angle, information about end_angle, etc.), information about a delta radius (e.g., information about radius_delta), information about a delta angle (e.g., information about angle_delta), information about deadzones (e.g., information about num_deadzones, information about deadzone_left_horizontal_offset, deadzone_top_vertical_offset, information about deadzone_width, information about deadzone_height, etc.), or information about an encoding quality of the at least one circular image (e.g., information about Quality).

The information about num_circular_images may specify information about the number of circular images in each sample of the coded picture, and the like. For example, the information about num_circular_images may indicate 2, but examples are not limited thereto.

The information about image_center_x may indicate the horizontal coordinate of the center of the circular image in each sample of the coded picture in units of luma samples, and may correspond to a fixed-point value of 16.16.

The information about image_center_y may indicate the vertical coordinate of the center of the circular image in each sample of the coded picture in units of luma samples, and may correspond to a fixed point value of 16.16.

The information about rect_region_top, information about rect_region_left, information about rect_region_width, and information about rect_region_height may indicate the coordinates, width and height of the top-left corner of a rectangular region containing a cropped or uncropped fisheye circular image. This information may be expressed in units of luma samples.

The information about full_radius may indicate a full-radius in units of luma samples, which means the distance from the center to the edge of the circular image corresponding to the maximum field of view of the fisheye lens specified by field_of_view. The information about full_radius may correspond to a fixed point value of 16.16.

The information about scene_radius may indicate a scene-radius, which is a distance from the center of the circular image to the nearest edge of a region in an image without obstruction of the camera body, in units of luma samples. In one example, the (enclosed) region may correspond to a recommended region for stitching provided by a content provider. The scene-radius information may correspond to a fixed point value of 16.16.

The information about camera_center_azimuth and the information about camera_center_elevation may represent the center of a sphere region corresponding to the center of the circular image. camera_center_azimuth may be included in a range of −180×2^16 to 180×2^16−1. camera_center_elevation may be included in a range of −90×216 to 90×216.

The information about camera_center_tilt may specify information about a tilt angle of a center of a sphere region corresponding to the center of the circular image, and the like. The information about camera_center_tilt may be included in a range of −180×2^16 to 180×2^16.

The information about camera_center_offset_x, the information about camera_center_offset_y, and the information about camera_center_offset_z may indicate the XYZ offset values of the focal center of each fisheye camera lens from the focal center origin of the overall fisheye camera configuration in millimeters. This information may correspond to a fixed point value of 16.16.

The information about field_of_view may indicate the field of view of the fisheye lens in degrees. The information may correspond to a fixed point value of 16.16. The field_of_view of a hemispherical fisheye lens may be, for example, 180.0.

The information about num_polynomial_coefficients_distortion may indicate an integer representing the number of polynomial coefficients. This information may correspond to a maximum order of the polynomial plus 1.

The information about polynomial_coefficient_K_distortion may indicate polynomial coefficient values representing coefficients in a polynomial for converting a radius r to an angle θ. This information may correspond to a fixed point polynomial coefficient value of 8.24. The information about polynomial_coefficient_K_distortion may be described based on Equation 5 below.

$$\theta = \Sigma_{i=1}^{N} p_{i-1} \cdot r^{i-1} \quad \text{Equation 5}$$

In Equation 5, p may denote polynomial_coefficient_K_distortion, and N may denote num_polynomial_coefficients_distortion. The normalized image coordinates ($u_N$, $v_N$) may be calculated by multiplying r by a normal vector ($x_c$, $y_c$).

The information about image_flip may indicate whether an image is flipped and how the image is flipped. Reverse flipping may be performed based on the information about image_flip. When the information indicates 0, this may represent that the image is not flipped. When the information indicates 1, this may represent that the image is vertically flipped. When the information indicates 2, this may represent that the image is horizontally flipped. When the information indicates 3, this may represent that the image is flipped horizontally and vertically.

The information about image_scale_axis_angle, the information about image_scale_x, and the information about image_scale_y may indicate whether an image is scaled along an axis, and how the image is scaled, and may correspond to three fixed point values of 16.16. The information may be used in considering a natural error in camera-mirror settings. The axis may be defined by a single angle value indicated by image_scale_axis_angle. When the single angle is 0, the horizontal vector may be perfectly horizontal, and the vertical vector may be perfectly vertical. The values of image_scale_x and image_scale_y may indicate scaling. In one example, the information about image_scale_axis_angle, the information about image_scale_x, and the information about image_scale_y may be expressed as Equation 6 below.

$$\begin{bmatrix} u \\ v \end{bmatrix} = \begin{bmatrix} c & d \\ e & 1 \end{bmatrix} \begin{bmatrix} u_N \\ v_N \end{bmatrix} + \begin{bmatrix} c_x \\ c_y \end{bmatrix} \quad \text{Equation 6}$$

In Equation 6, (u, v) may represent information about pixels of an actual image, ($u_N$, $v_N$) may represent information about pixels of an ideal image, and $c_x$ and $c_y$ may represent information about image_center_x and information about image_center_y, respectively. In the equation, c, d, and e may denote information about image_scale_x, information about image_scale_axis_angle, and information about image_scale_y, respectively.

Information about num_polynomial_coefficients_lsc, information about polynomial_coefficient_K_lsc_R, information about polynomial_coefficient_K_lsc_G, and information about polynomial_coefficient_K_lsc_B may represent lens shading compensation (LSC) parameters for compensating for shading artifacts of the fisheye lens, which reduce colors in the radial direction. The information may correspond to 8.24 of a fixed point format. A compensation weight to be multiplied by the original color may be approximated to a curve function in relation to the radius from the center of the image, based on Equation 7 below.

$$w = \Sigma_{i=1}^{N} p_{i-1} \cdot r^{i-1} \quad \text{Equation 7}$$

The weighting factors for R, G, and B may be independently calculated when p is represented by polynomial_coefficient_K_lsc_R, polynomial_coefficient_K_lsc_G, and polynomial_coefficient_K_lsc_B, respectively. r may be a corresponding radius from the center of the image after being normalized by the full radius. N may be represented by num_polynomial_coefficients_lsc.

Information about num_angle_for_displaying_fov may indicate the number of angles for displaying fov. Depending on the number of num_angle_for_displaying_fov, multiple values of displayed_fov and overlapped_fov may be defined at equal intervals. For example, it may be defined at equal intervals clockwise starting at 12 o'clock.

The information about displayed_fov may indicate a field of view for a portion of a circular image including overlapped circular images from adjacent circular images, which is recommended to be used in displaying without blending of the adjacent circular images.

The information about overlapped_fov may indicate a field of view for a portion of a circular image including overlapped circular images from adjacent circular images, which is recommended to be used in displaying by blending with the adjacent circular images.

The information about num_local_fov_region may specify information about the number of local fitting circular regions having different fields of view.

The information about start_radius, the information about end_radius, the information about start_angle, and the information about end_angle may indicate a circular region for local fitting/warping for changing the actual field of view for local display. The start_radius and end_radius may indicate the minimum and maximum values of a radius, and may correspond to a fixed point value of 16.16. The start_angle and end_angle may indicate minimum and maximum angles that start at 12 o'clock and increase clockwise in units of $2^{-16}$ degrees clockwise. Start_angle and end_angle may be values in a range of $-180 \times 2^{16}$ to $180 \times 2^{16}$, inclusive.

The information about radius_delta may indicate a delta radius value for indicating a different field of view for each radius. This information may correspond to a fixed point value of 16.16.

The information about angle_delta may indicate a delta angle value for indicating a different field of view for each angle in units of $2^{-16}$ degrees.

The information about local_fov_weight may indicate a weighting value for the field of view of a position derived by the information about start_radius, the information about end_radius, the information about start_angle, the information about end_angle, the information about angle index i, and information about radius index j. This information may correspond to a fixed point format 8.24. When the value of local_fov_weight is positive, this may mean expansion of the field of view. When the value of local_fov_weight is negative, this may mean contraction of the field of view.

The information about num_deadzones may specify information about the number of dead zones in the coded picture of each sample as an integer.

The information about Quality may specify information about the encoding quality of an image or video captured by a fisheye camera. The best quality may be represented when the information indicates 10, the worst quality when the information indicates 0, and the default quality when the information indicates 5.

The information about deadzone_left_horizontal_offset, the information about deadzone_top_vertical_offset, the information about deadzone_width, and the information about deadzone_height may specify information about the position and size of a dead zone rectangular region where pixels are not available. The information about deadzone_left_horizontal_offset and the information about deadzone_top_vertical_offset may indicate vertical and horizontal coordinates of the top left corner of the dead zone in the coded picture in units of luma samples. The information about deadzone_width and the information about deadzone_height may indicate the width and height of a dead zone in units of luma samples. To save bits for representing a video, all pixels in the dead zone may be set to the same pixel value (e.g., black).

The metadata for network-based stitching described above may be applied as metadata for configuration of 3GPP FLUS, and may be included in another box for stitching a 360 video on the network. In one example, SIP signaling may be used in a negotiation for FLUS session establishment in IMS-based signaling. In another example, the metadata about the stitching may be expressed based on the XML format. In another example, the metadata about the stitching described above may be expressed based on at least one of the SIP signaling and the XML format. In this specification, the metadata about the stitching described after the description of FIG. 26C may correspond to metadata included in the following SIP signaling and XML format-based signaling.

Table 1 below shows an example of metadata transmitted by an SDP offer (or FLUS source) in SIP signaling in accordance with some embodiments.

TABLE 1

<SDP offer>
v=0
o=− 25678 753849 IN IP4 192.0.2.1
s= FLUS
c=IN IP4 192.0.2.1
t=0 0
a=3pgg-FLUS-system:<urn>
m=sphericalVideo
m=cubemapVideo
m=stereoVideo
a=group:FLUS<mid_1><mid_2>
m=video 49154 RTP/AVPF 101
b=AS:500
a=rtpmap:101 H264/90000
a=fmtp:101 packetization-mode=0; profile-level-id=42e00c
a=3gpp-FLUS-system:stitching
a=3gpp-FLUS-system:packing
a=3gpp-FLUS-system:RWP
a=3gpp-FLUS-system:partialCover:0 180 20 40
a=sendonly
a=mid:mid_1
m=video 49154 RTP/AVPF 101
b=AS:500
a=rtpmap:101 H264/90000
a=fmtp:101 packetization-mode=0; profile-level-id=42e00c
a=3gpp-FLUS-system:stitching
a=3gpp-FLUS-system:packing
a=3gpp-FLUS-system:RWP
a=3gpp-FLUS-system:partialCover:0 180 20 40
a=sendonly
a=mid:mid_2

Table 1 represents a case where two or more media streams are present in one FLUS source and spherical video is supported. This case corresponds to an offer message for session initialization for transmission of a 3GPP-FLUS system-based media source. In the message, version (v=) is 0, the session-id value of Origin is 25678 753849, the network type is IN, the connection is a connection based on IP4, which is an address type, the address is 192.0.2.1, and the value of timing (t=) is fixed session 0 0.

Media (m=) that the Offer may transmit may be spherical/video, cubemapVideo, and stereoVideo. Two media streams are grouped in one session (a=group:FLUS). The elements in the group may be named <mid_1> and <mid_2>, respectively.

mid_1 may be video media that has a port of 49154, the transport protocol of RTP/AVPF, and a media format declared as 101. It may transmit a media stream for which the bandwidth is 500, the dynamic payload type is 101, the encoding name is H.264, and the clock rate is 90000. The format parameter is 101. For mid_1, an incoming RTP packet is packetized in one NAL mode. When Packetization-mode=1, this may mean that an incoming RTP packet is packetized in a non-interleaved mode. When Packetization-mode is 2, this may mean that the incoming RTP packet is packetized in an interleaved mode. mid_1 may support the functions of FLUS-system: stitching, packing, region-wise-packing (RWP), and partial coverage. The range of the partial coverage may indicate the range of a region occupied on a sphere by an image or video sent in order of horizontal_min, horizontal_max, vertical_min, and vertical_max, have a value between −180 to 180 degrees in the horizontal direction and between −90 to 90 in the vertical direction. In some embodiments, a region covering a range of 0 to 180 degrees in the horizontal direction and 20 to 40 degrees in the vertical direction may be transmitted. mid_1 may be sent only. mid_2 may also transmit a video stream in the same state as mid_1. The above-mentioned port number and the values specified in the transport protocol and the format may be replaced with other values depending on the operation point.

The SDP answer (or FLUS sink) may receive only spherical video, may support only the results packed in the 3GPP-FLUS_system, and may only receive media. It may receive the other information on the same conditions as for the SDP offer. Table 2 below may correspond to an example of metadata transmitted by the SDP answer in SIP signaling.

TABLE 2

<SDP answer>
v=0
o=− 25678 753849 IN IP4 192.0.2.1
s= FLUS
c=IN IP4 192.0.2.1
t=0 0
a=3pgg-FLUS-system:<urn>
m=sphericalVideo
a=group:FLUS<mid_1><mid_2>
m=video 49154 RTP/AVPF 101
b=AS:500
a=rtpmap:101 H264/90000
a=fmtp:101 packetization-mode=0; profile-level-id=42e00c
a=3gpp-FLUS-system:packing
a=recvonly
a=mid:mid_1
m=video 49154 RTP/AVPF 101
b=AS:500
a=rtpmap:101 H264/90000
a=fmtp:101 packetization-mode=0; profile-level-id=42e00c
a=3gpp-FLUS-system:packing
a=recvonly
a=mid:mid_2

Based on the message of the SDP answer in Table 2, the SDP offer may update and send the message in accordance with information receivable (acceptable) by the answer, as shown in Table 3 or Table 4.

TABLE 3

<SDP offer>
v=0
o=− 25678 753849 IN IP4 192.0.2.1
s= FLUS
c=IN IP4 192.0.2.1
t=0 0

TABLE 3-continued a=3pgg-FLUS-system:<urn>
m=sphericalVideo
a=group:FLUS<mid_1><mid_2>
m=video 49154 RTP/AVPF 101
b=AS:500
a=rtpmap:101 H264/90000
a=fmtp:101 packetization-mode=0; profile-level-id=42e00c
a=3gpp-FLUS-system:packing
a=sendonly
a=mid:mid_1
m=video 49154 RTP/AVPF 101
b=AS:500
a=rtpmap:101 H264/90000
a=fmtp:101 packetization-mode=0; profile-level-id=42e00c
a=3gpp-FLUS-system:packing
a=sendonly
a=mid:mid_2

TABLE 4

<SDP offer>
v=0
o=− 25678 753849 IN IP4 192.0.2.1
s= FLUS
c=IN IP4 192.0.2.1
t=0 0
a=3pgg-FLUS-system:<urn>
m=sphericalVideo
m=video 49154 RTP/AVPF 101
b=AS:500
a=rtpmap:101 H264/90000
a=fmtp:101 packetization-mode=0; profile-level-id=42e00c
a=3gpp-FLUS-system:stitching
a=3gpp-FLUS-system:RWP
a=sendonly Table 3 and Table 4 represent cases where one media stream is present in one FLUS source and spherical video is supported. These cases correspond to a message for session initialization for the offer to transmit a 3gpp-FLUS-system-based media source. In the message, version (v=) is 0, the session-id value of Origin is 25678 753849, the network type is IN, the connection is a connection based on IP4, which is an address type, the address is 192.0.2.1, and the value of timing (t=) is fixed session 0 0. Media (m=) that the Offer may transmit may be sphericalVideo and may be video media that has a port of 49154, the transport protocol of RTP/AVPF, and a media format declared as 101. It may transmit a media stream for which the bandwidth is 500, the dynamic payload type is 101, the encoding name is H.264, and the clock rate is 90000. A video having the format parameter of 101 and an incoming RTP packet may be packetized in one NAL mode. When Packetization-mode=1, this may mean that an incoming RTP packet is packetized in a non-interleaved mode. When Packetization-mode is 2, this may mean that the incoming RTP packet is packetized in the interleaved mode. It may be seen that stitching, region-wise-packing (RWP), and partial coverage, which are functions of FLUS-system, are supported. Here, the functions may be sent only. The above-mentioned port number and the values specified in the transport protocol and the format may be replaced with other values depending on the operation point.

Table 5 below may correspond to another example of metadata transmitted by the SDP answer in SIP signaling.

TABLE 5

<SDP answer>
v=0

TABLE 5-continued

```
o=- 25678 753849 IN IP4 192.0.2.1
s= FLUS
c=IN IP4 192.0.2.1
t=0 0
a=3pgg-FLUS-system:<urn>
m=sphericalVideo
m=video 49154 RTP/AVPF 101
b=AS:500
a=rtpmap:101 H264/90000
a=fmtp:101 packetization-mode=0; profile-level-id=42e00c
a=3gpp-FLUS-system:stitching
a=3gpp-FLUS-system:RWP
a=recvonly
```

Table 5 corresponds to a message for session initialization for the offer to transmit a 3gpp-FLUS-system-based media source. In the message, the version (v=) of the SDP answer is 0, the session-id value of Origin is 25678 753849, the network type is IN, the connection is a connection based on IP4, which is an address type, the address is 192.0.2.1, and the timing value (t=) is fixed session 0 0.

Media (m=) that the Answer may receive may be sphericalVideo and may be video media that has a port of 49154, the transport protocol of RTP/AVPF, and a media format declared as 101. It may transmit a media stream for which the bandwidth is 500, the dynamic payload type is 101, the encoding name is H.264, and the clock rate is 90000. The format parameter may be 101 and an incoming RTP packet is packetized in one NAL mode. When Packetization-mode=1, this may mean that an incoming RTP packet is packetized in the non-interleaved mode. When Packetization-mode is 2, this may mean that the incoming RTP packet is packetized in the interleaved mode. Stitching and region-wise-packing (RWP), which are functions of the FLUS-system, may be supported. Only reception may be allowed by recvonly. The above-mentioned port number and the values specified in the transport protocol and the format may be replaced with other values depending on the operation point.

Since the messages of the Offer and Answer are different from each other, the Offer may transmit a second message. The other information is the same as that of the SDP answer, but the information about 3gpp-FLUS-system is different. Accordingly, the 2nd SDP offer may send a message indicating that the offer will transmit a RWP (Region-Wise-Packed) media stream, as shown in Table 6 below.

TABLE 6

```
<2nd SDP offer>
v=0
o=- 25678 753849 IN IP4 192.0.2.1
s= FLUS
c=IN IP4 192.0.2.1
t=0 0
a=3pgg-FLUS-system:<urn>
m=sphericalVideo
m=video 49154 RTP/AVPF 101
b=AS:500
a=rtpmap:101 H264/90000
a=fmtp:101 packetization-mode=0; profile-level-id=42e00c
a=3gpp-FLUS-system:RWP
a=sendonly
```

Upon receiving the 2nd SDP offer, the answer may send the offer a message indicating that the answer will receive data for the RWP function between the stitching and RWP functions supported by the answer, as shown in Table 7 below.

TABLE 7

```
<2nd SDP answer>
v=0
o=- 25678 753849 IN IP4 192.0.2.1
s= FLUS
c=IN IP4 192.0.2.1
t=0 0
a=3pgg-FLUS-system:<urn>
m=sphericalVideo
m=video 49154 RTP/AVPF 101
b=AS:500
a=rtpmap:101 H264/90000
a=fmtp:101 packetization-mode=0; profile-level-id=42e00c
a=3gpp-FLUS-system:RWP
a=recvonly
```

Table 7 corresponds to a message for session initialization for the offer to transmit a 3GPP-FLUS-system-based media source. In the message, the version (v=) of the SDP answer is 0, the session-id value of Origin is 25678 753849, the network type is IN, the connection is a connection based on IP4, which is an address type, the address is 192.0.2.1, and the timing value (t=) is fixed session 0 0.

Media (m=) that the Answer may receive may be a fisheye video and may be video media that has a port of 49154, the transport protocol of RTP/AVPF, and a media format declared as 101. It may transmit a media stream for which the bandwidth is 500, the dynamic payload type is 101, the encoding name is H.264, and the clock rate is 90000. The format parameter may be 101 and an incoming RTP packet may be packetized in one NAL mode. Stitching, packing, region-wise-packing (RWP), and partial coverage, which are functions of the FLUS-system, may be supported. Only reception may be allowed by recvonly. The above-mentioned port number and the values specified in the transport protocol and the format may be replaced with other values depending on the operation point.

Table 8 below corresponds to another example of the message transmitted by the SDP offer.

TABLE 8

```
<SDP offer>
v=0
o=- 25678 753849 IN IP4 192.0.2.1
s= FLUS
c=IN IP4 192.0.2.1
t=0 0
m=fishVideo
m=video 49154 RTP/AVPF 101
b=AS:500
a=rtpmap:101 H264/90000
a=fmtp:101 packetization-mode=0; profile-level-id=42e00c
a=3pgg-FLUS-system:<urn>
a=3gpp-FLUS-system:stitching
a=3gpp-FLUS-system:packing
a=3gpp-FLUS-system:RWP
a=3gpp-FLUS-system:partialCover:0 180 20 40
a=sendonly
```

Table 9 below corresponds to another example of the message transmitted by the SDP answer.

TABLE 9

```
<SDP answer>
v=0
o=- 25678 753849 IN IP4 192.0.2.1
s= FLUS
c=IN IP4 192.0.2.1
t=0 0
a=3pgg-FLUS-system:<urn>
```

TABLE 9-continued

```
m=fishVideo
m=video 49154 RTP/AVPF 101
b=AS:500
a=rtpmap:101 H264/90000
a=fmtp:101 packetization-mode=0; profile-level-id=42e00c
a=3gpp-FLUS-system:stitching
a=3gpp-FLUS-system:RWP
a=3gpp-FLUS-system:partialCover:20 200 0 20
a=recvonly
```

Since the details included in the message of the SDP offer in Table 8 are different from those included in the message of the SDP answer in Table 9, the SDP offer may transmit a second message to the SDP answer. Of the details of the message of the SDP offer, only 3GPP-FLUS-system is different from that in the message of the SDP answer. Accordingly, the 2nd SDP offer message may contain information about a partial coverage region that is reset based on the message received from the SDP answer. Another example of the 2nd SDP offer message may be given as shown in Table 10 below.

TABLE 10

```
<2nd SDP offer>
v=0
o=- 25678 753849 IN IP4 192.0.2.1
s= FLUS
c=IN IP4 192.0.2.1
t=0 0
m=fishVideo
m=video 49154 RTP/AVPF 101
b=AS:500
a=rtpmap:101 H264/90000
a=fmtp:101 packetization-mode=0; profile-level-id=42e00c
a=3pgg-FLUS-system:<urn>
a=3gpp-FLUS-system:partialCover:20 200 0 20
a=sendonly
```

Upon receiving the 2nd SDP offer message as shown in Table 10, the SDP answer may send the SDP offer a message indicating that the answer will receive a media stream for the partial coverage region contained in the 2nd SDP offer message, as shown in Table 11 below.

TABLE 11

```
<2nd SDP answer>
v=0
o=- 25678 753849 IN IP4 192.0.2.1
s= FLUS
c=IN IP4 192.0.2.1
t=0 0
a=3pgg-FLUS-system:<urn>
```

TABLE 11-continued

```
m=fishVideo
m=video 49154 RTP/AVPF 101
b=AS:500
a=rtpmap:101 H264/90000
a=fmtp:101 packetization-mode=0; profile-level-id=42e00c
a=3gpp-FLUS-system:partialCover:20 200 0 20
a=recvonly
```

In the non-IMS based FLUS system, the SDP messages described in Tables 1 to 11 may be modified and signaled in accordance with the HTTP scheme.

Hereinafter, a FLUS metadata signaling method using an XML format in accordance with another embodiment is disclosed. When FLUS metadata is transmitted in the XML schema format, the media type may be represented as shown in Table 12 below. The XML forma, which will be later, may be written and applied in the JSON format.

TABLE 12

```
<xs:schema attributeFormDefault="unqualified" elementFormDefault="qualified"
xmlns:xs="http://www.w3.org/2001/XMLSchema">
    <xs:element name="FLUSMedia" type="FLUSMediaType"/>
    <xs:complexType name="FLUSMediaType">
        <!-- FLUS media types can be either audio or video -->
        <xs:all>
            <xs:element type="SphvideoType" name="Sphvideo"/>
            <xs:element type="audioType" name="audio"/>
            <xs:element type="imaudioType" name="imaudio"/>
            <xs:element type="2DVideoType" name="2DVideo"/>
            <xs:element type="fishVideoType" name="fishVideo"/>
            <xs:element type="StereoVideoType" name="StereoVideo"/>
        </xs:all>
    </xs:complexType>
```

Information about FLUSMedia and information about FLUSMediaType are configured to deliver metadata of FLUSMedia. Each element included in FLUSMediaType may or may not be included in FLUSMediaType by declaring <xs:all>, and one or more elements may be selected. FLUSMedia may include 2D video, audio, immersive audio, spherical video, fisheye type video, and stereoscopic type video. When media parsed from the FLUS source corresponds to FLUS media, a plurality of types may be included among the media types described above, and necessary metadata for each type may be transmitted or received.

"Sphvideo Type" may be referred to as Sphvideo and may represent a 360 video type that may be rendered in the form of a sphere.

"audioType" may be referred to as audio, and may correspond to general 2D audio, that is, stereo type audio.

"imaudioType" may be referred to as imaudio, and may be immersive audio, that is, media corresponding to sensory audio.

"2DVideoType" may be referred to as 2DVideo, and may be a video type displayed on a display plane without any other processes of stitching and rendering.

"fishVideoType" may be referred to as fishVideo, and may be a media type that is captured by a fisheye camera and parsed by a FLUS sink.

"StereoVideoType" may be referred to as StereoVideo, and may be selected when the captured and transmitted media is stereoscopic video.

When FLUS metadata is transmitted in the XML schema format, spherical video may be rendered, stitched, or packed among the media types described above. An example is shown in Table 13 below.

TABLE 13

```
<!-- FLUS Spherical video metadata categories -->
    <xs:complexType name="SphvideoType">
        <xs:all>
            <xs:element type="StitchingType" name = "Stitching"/>
            <xs:element type="PackingType" name = "Packing"/>
            <xs:element type="RWPType" name = "RWP"/>
            <xs:element type="VideoType" name = "video"/>
            <xs:element type="SyncType" name ="sync"/>
            <xs:element type="CameraType" name="Camera"/>
            <xs:element type="PartialCoverType" name="PartialCover"/>
        </xs:all>
    </xs:complexType>
```

SphvideoType is configured to deliver metadata containing information related to spherical video. Each element included in sphvideoTypee may or may not be included in SphvideoType by declaring <xs:all>, and one or more elements may be selected. sphvideoType may include StitchingType, PackingType, RWPType, VideoType, SyncType, and CameraType. When corresponding media of the media parsed from the FLUS source is included in the FLUS media, the above-described types may be sent to the FLUS sink in accordance with a predetermined sequence, and necessary metadata for each type may be transmitted or received.

StitchingType may be referred to as Stitching and be used as a reference. The StitchingType may include metadata information necessary for stitching images captured in the 360-degree direction into content of a spherical shape. Each element may or may not be included in the SphvideoType by declaring <xs:all>, and one or more elements may be selected.

PackingType may be referred to as Packing and be used as a reference. PackingType may include metadata information that is necessary when captured 360 videos are not stitched but packed in a planar image frame so as not to overlap each other in the frame.

RWPType may be referred to as RWP and be used as a reference. RWPType may represent Region-wise-packing for increasing the efficiency of encoding the stitched 360 video into, for example, ROI or Director's cut, and may include metadata information necessary for region-wise packing.

VideoType may be referred to as video and be used as a reference. VideoType may include metadata information necessary for encoding of a general video, such as a file format, a color gamut, a transfer function, and sub-sampling of the captured video.

SyncType may be referred to as sync and be used as a reference. SyncType may include metadata necessary for synchronization of 360 videos captured in different directions.

CameraType may be referred to as Camera and be used as a reference. It may include camera setting information applied in capturing a 360 video, and metadata containing information about the original video or image captured from the Camera.

PartialCoverType may be referred to as PartialCover and be used as a reference. It may include metadata information that is needed when only a part of the entire 360 video region is covered or when only a part of the entire 360 video region is transmitted.

When FLUS metadata is transmitted in the XML schema format, metadata containing information related to audio and 2D video (2D image or video) among the aforementioned media types may be transmitted. An example is shown in Table 14 below.

TABLE 14

```
<!-- FLUS audio metadata categories -->
    <xs:complexType name="audioType">
        <xs:sequence>
            <xs:element type="audioArrangementType" name="audioArrangement"/>
            <xs:element type="audioCherecteristicsType"
            name="audioCherecteristics"/>
            <xs:element type="audioDataType" name="audioData"/>
        </xs:sequence>
    </xs:complexType>
``` audioType is configured to deliver metadata that contains information related to audio. Elements included in a group in a specified sequence among the elements included in audioType are indicated by declaring <xs:sequence>. AudioType may include audioArrangement, audioCharacteristicsType, and audioDataType. When corresponding media of the media parsed from the FLUS source is included in the FLUS media, the above-described types may be sent to the FLUS sink in accordance with a predetermined sequence, and necessary metadata for each type may be transmitted or received.

audioArrangementType may include information about the capture environment, such as information about the number and locations of installed microphones during audio capture.

audioCharacteristicsType may include information about an audio source, that is, audio characteristics such as the audio file format, the number of channels, and the sample rate.

audioDataType may include rendering information that may be acquired from a source captured for audio rendering.

When FLUS metadata is transmitted in the XML schema format, metadata containing information related to 2D video (2D image or video) among the aforementioned media types may be transmitted. An example is shown in Table 15 below.

TABLE 15

```
<!-- FLUS 2d video metadata categories -->
    <xs:complexType name="2DvideoType">
        <xs:sequence>
            <xs:element type="VideoType" name = "video"/>
            <xs:element type="SyncType" name ="sync"/>
            <xs:element type="CameraType" name="Camera"/>
        </xs:sequence>
    </xs:complexType>
```

2DvideoType is configured to deliver metadata that contains information related to 2Dvideo. Elements included in a group in a specified sequence among the elements included in 2DvideoType are indicated by declaring <xs:sequence>. 2DvideoType may include VideoType, SyncType, and CameraType. When corresponding media of the media parsed from the FLUS source is included in the FLUS media, the above-described types may be sent to the FLUS sink in accordance with a predetermined sequence, and necessary metadata for each type may be transmitted or received.

VideoType may be referred to as video and be used as a reference. VideoType may include metadata information necessary for encoding of a general image, such as a file format, a color gamut, a transfer function, and sub-sampling of the captured video.

SyncType may be referred to as sync and be used as a reference. SyncType may include metadata necessary for synchronization of 360 videos captured in different directions.

CameraType may be referred to as Camera and be used as a reference. It may include camera setting information applied in capturing a 360 video, and metadata containing information about the original video or image captured from the Camera.

When FLUS metadata is transmitted in the XML schema format, metadata containing information related to fisheye and stereoscopic videos among the media types described above may be transmitted. An example may be shown in Table 16 below.

TABLE 16

```
<!-- FLUS Fisheye video metadata categories -->
    <xs:complexType name="fishvideoType">
        <xs:all>
            <xs:element type="PackingType" name = "Packing"/>
            <xs:element type="RWPType" name = "RWP"/>
            <xs:element type="VideoType" name = "video"/>
            <xs:element type="SyncType" name ="sync"/>
            <xs:element type="CameraType" name="Camera"/>
            <xs:element type="fishcameraType" name="fishcamera"/>
            <xs:element type="PartialCoverType" name="PartialCover"/>
        </xs:all>
    </xs:complexType>
``` fishvideoType is configured to deliver metadata that contains information related to a video or image captured by a fisheye camera. Each element included in fishvideoType may or may not be included in fishvideoType by declaring <xs:all>, and one or more elements may be selected. fishvideoType may include PackingType, RWPType, VideoType, SyncType, CameraType, fishcameraType, and PartialCoverType. When corresponding media of the media parsed from the FLUS source is included in the FLUS media, the above-described types may be sent to the FLUS sink in accordance with a predetermined sequence, and necessary metadata for each type may be transmitted or received.

PackingType may be referred to as Packing and be used as a reference. PackingType may include metadata information that is necessary when captured 360 videos are not stitched but packed in a planar image frame so as not to overlap each other in the frame.

RWPType may be referred to as RWP and be used as a reference. RWPType may represent Region-wise-packing for increasing the efficiency of encoding the stitched 360 video into, for example, ROI or Director's cut, and may include metadata information necessary for region-wise packing.

VideoType may be referred to as video and be used as a reference. VideoType may include metadata information necessary for encoding of a general video, such as a file format, a color gamut, a transfer function, and sub-sampling of the captured video.

SyncType may be referred to as sync and be used as a reference. SyncType may include metadata necessary for synchronization of 360 videos captured in different directions.

CameraType may be referred to as Camera and be used as a reference. It may include camera setting information applied in capturing a 360 video, and metadata containing information about the original video or image captured from the Camera.

fishcameraType may be referred to as fishcamera and be used as a reference. When a 360 video or image is captured with a fisheye camera, information about the characteristics of the fisheye camera may be included in metadata. The information may be used in stitching the 360 video or image, or only the information may be sent to the FLUS sink.

PartialCoverType may be referred to as PartialCover and be used as a reference. It may include metadata information that is needed when only a part of the entire 360 video region is covered or when only a part of the entire 360 video region is transmitted.

When FLUS metadata is transmitted in the XML schema format, metadata containing information related to stereoscopic video among the aforementioned media types may be transmitted. In the case of stereoscopic video, the metadata may be information about a stereoscopic video for a VR stream source or information about a stereoscopic video for a 2D video. Accordingly, a different metadata signaling method may be used in each case. Table 17 below corresponds to an example of a metadata signaling method used in the case of the stereoscopic video type for the 2D video.

TABLE 17

```
<!-- FLUS stereoscopic video metadata categories -->
    <xs:complexType name="StereoVideoType">
        <xs:all>
```

TABLE 17-continued

```
            <xs:element type="xs:integer" name="StereoType"/>
            <xs:element type="2DVideoType" name="2DVideo"/>
            <xs:element type="PackingType" name = "Packing"/>
        </xs:all>
    </xs:complexType>
```

StereoType may indicate a stereo packing type by which stereoscopic video is packed in one frame. The stereo packing type may include side-by-side, top-bottom, and temporal interleaving.

2DVideoType may be referred to as 2DVideo, and may be a video type displayed on the display plane without any other processes of stitching and rendering.

PackingType may be referred to as Packing and be used as a reference. PackingType may include metadata information that is necessary when captured 360 videos are not stitched but packed in a planar image frame so as not to overlap each other in the frame.

The metadata in Table 18 below may be an example of a metadata signaling configuration in the case of a stereoscopic video type for a spherical video.

TABLE 18

```
<!-- FLUS stereoscopic video metadata categories -->
    <xs:complexType name="StereoVideoType">
        <xs:all>
            <xs:element type="xs:integer" name="StereoType"/>
            <xs:element type="SphvideoType" name="Sphvideo"/>
            <xs:element type="PackingType" name = "Packing"/>
        </xs:all>
    </xs:complexType>
```

StereoType may indicate a stereo packing type by which stereoscopic video is packed in one frame. The stereo packing type may include side-by-side, top-bottom, and temporal interleaving.

Sphvideo Type may be referred to as Sphvideo, and may represent a 360 video type that may be rendered in a spherical shape.

PackingType may be referred to as Packing and be used as a reference. PackingType may include metadata information that is necessary when captured 360 videos are not stitched but packed in a planar image frame so as not to overlap each other in the frame.

The metadata in Table 19 below corresponds to an example of metadata for the stitching type.

TABLE 19

```
<!-Stitching Type Description details -->
    <xs:complexType name="StitchingType">
        <xs:all>
            <xs:element type="xs:integer" name="numberOfStream"/>
            <xs:element type="xs:integer" name="streamID"/>
            <xs:element type="xs:string" name="projectionType"/>
            <xs:element type="xs:byte" name="outFramerate"/>
            <xs:element type="xs:string" name="outResolution"/>
            <xs:element type="xs:string" name="Samplerate"/>
            <xs:element type="xs:string" name="Chromaformat"/>
            <xs:element type="xs:byte" name="Quality"/>
        </xs:all>
    </xs:complexType>
``` numberOfStream may represent the number of streams that may be obtained from one source when the 360 video is supported by the FLUS source. It may be delivered to the FLUS sink or may be defined as the number of streams requested by the FLUS sink.

streamID may represent identifiers of streams as many as the number of streams stitched into a 360 video.

projectionType may represent a projection type used in projecting stitched video data onto a 2D image at a corresponding time. The projection type may be the same as or similar to the 360 video projection type. It may correspond to an equirectangular projection type, a cylindrical projection type, a cube projection type, a panoramic projection type, or the like. However, examples are not limited thereto. For example, the data may be projected onto a 2D image using a method arbitrarily set by a user.

outFramerate represents a frame rate after stitching of a stitching video. The frame rate after stitching may be sent from the FLUS source to the FLUS sink, or a frame rate that may be received by the FLUS sink may be sent to the FLUS source. Alternatively, the FLUS source may specify a frame rate requested by the FLUS sink.

outResolution represents the resolution after stitching of the stitching video. It may be arbitrarily specified by the FLUS source for stitching, or stitching may occur in the FLUS source at the resolution requested by the FLUS sink. Alternatively, the resolution may be a resolution that the FLUS source may send to the FLUS sink, or a resolution that the FLUS sink may receive.

samplerate may specify information about down sampling of a stitched image or video. It may be 4:4:4, 4:2:2, 4:2:0, or the like. The information may be sent from the FLUS sink to the FLUS source to announce the capability of the FLUS sink, or the FLUS source may send the stitched information to the FLUS sink. Alternatively, the FLUS source may stitch the image or video at the sample rate requested by the FLUS sink.

Chromaformat may define the color space of stitched images or videos. Examples include YCbCr, RGB, and XYZ. The information may be sent from the FLUS sink to the FLUS source to announce the capability of the FLUS sink, or the FLUS source may send the stitched information to the FLUS sink. Alternatively, the FLUS source may stitch images or videos at the sample rate requested by the FLUS sink.

Quality may specify the encoding quality of the stitched stream. It may indicate the best quality when set to 10, the worst quality when set to 0, and the default when set to 5.

The metadata in Table 20 below corresponds to an example of metadata for the packing type.

TABLE 20

```
<!-Packing Type Description details -->
    <xs:complexType name="PackingType">
        <xs:all>
            <xs:element type="xs:integer" name="numberOfStream"/>
            <xs:element type="xs:integer" name="streamID"/>
            <xs:element type="xs:string" name="packedFrameSize"/>
            <xs:element type="xs:integer" name="subPictureID"/>
            <xs:element type="xs:integer" name="numberOfsubimages"/>
            <xs:element type="xs:string" name="SubpictureCenter"/>
            <xs:element type="xs:string" name="SubpictureSize"/>
            <xs:element type="xs:byte" name="Quality"/>
            <xs:element type="xs:string" name="PackingFlip"/>
            <xs:element type="xs:string" name="PackingRotation"/>
        </xs:all>
    </xs:complexType>
```

When the 360 video is supported by the FLUS source, numberOfStream may deliver, to the FLUS sink, the number of streams obtainable by one source from a capture device. It may be defined as the number of streams that one FLUS source requested by the FLUS sink should have.

streamID may carry the identifier of each stream from the FLUS source to the FLUS sink. A specific stream in the FLUS source may be requested by the FLUS sink by the identifier of the stream.

packedFrameSize may represent the width and height of a packed frame. The FLUS source may deliver the packed frame size to the FLUS sink. A request for a packed frame size that may be received by the FLUS sink may be made to the FLUS source.

subPictureID may define an identifier of each sub-picture present in the packed frame.

numberOfsubimages may represent the number of sub-pictures present in the packed frame, and sub-images requested by the FLUS sink may be packed.

SubpictureCenter may define the value of the center of each sub-picture present in the packed frame.

SubpictureSize may define the size of each sub-picture present in the packed frame.

Quality may specify the encoding quality for each sub-picture. It may indicate the best quality when set to 10, the worst quality when set to 0, and the default when set to 5.

PackingFlip may specify the flip state of each sub-picture present in the packed frame. When the value is 0, it may indicate that the flip did not occur. The value of 1 may indicate that the flip occurs vertically with respect to the horizontal axis. The value of 2 may indicate that the flip occurs horizontally with respect to the vertical axis.

PackingRotation may specify the rotation state of each sub-picture present in the packed frame. It may have a value for indicating the degree of rotation of each stream on the packing image. 2d_image_rotation may declare a value greater than or equal to 0 and less than 360.

The metadata in Table 21 below corresponds to an example of metadata for the region-wise packing type.

TABLE 21

```
<!-RegionWisePacking Type Description details -->
    <xs:complexType name="RWPType">
        <xs:all>
            <xs:element type="xs:byte" name="numberOfRegions"/>
            <xs:element type="xs:integer" name="regionID"/>
            <xs:element type="xs:string"
            name="guardBandLeftwidth"/>
            <xs:element type="xs:string"
            name="guardBandRightwidth"/>
            <xs:element type="xs:string"
            name="guardBandTopheight"/>
            <xs:element type="xs:string"
            name="guardBandBottomheight"/>
            <xs:element type="xs:string" name="gbtype"/>
            <xs:element type="xs:string" name="Quality"/>
            <xs:element type="xs:string" name="projRegwidth"/>
            <xs:element type="xs:string" name="projRegheight"/>
            <xs:element type="xs:string" name="projRegtop"/>
            <xs:element type="xs:string" name="projRegleft"/>
            <xs:element type="xs:string"
            name="packedPicturewidth"/>
            <xs:element type="xs:string"
            name="packedPictureheight"/>
            <xs:element type="xs:string" name="packedRegtop"/>
            <xs:element type="xs:string" name="packedRegleft"/>
        </xs:all>
    </xs:complexType>
``` numberOfRegions may specify information about the number of packed regions for indicating information about a projected region, information about a packed region, and information about a guard band region.

regionID corresponds to ID information about each region. The FLUS source may transmit the information to the FLUS sink. The FLUS sink may differently apply settings (setting of size, position, guard band, etc.) for each region based on the ID of each region.

guardBandLeftwidth may specify information about the width of the guard band on the left side of the i-th packed region included in the related packed picture sample units.

guardBandTopheight may specify information about the height of the top guard band of the i-th packed region included in the related packed picture sample units.

guardBandBottomheight may specify information about the height of the bottom guard band of the i-th packed region included in the related packed picture sample units.

gb_type may specify information about the type of the guard band of the i-th packed region. Suppose that j equal to 0, 1, 2, and 3 indicates the left, right, top, and bottom edges of each packed region, respectively. When gb_type[i][j] indicates 0, this may represent that the content of the guard band related to the content of the packed regions has not been specified. When the information about gb_not_used_for_pred_flag[i] indicates 0, gb_type[i][j] may not indicate 0. When gb_type[i][j] indicates 1, this may represent that the content of the guard band satisfies interpolation of sub-pixel values in the packed region and interpolation by fewer than 1 pixel outside the boundary of the packed region. When gb_type[i][j] indicates 2, this may represent actual image content having a quality that gradually changes from the picture quality of a region in which the content of the guard band is packed. When gb_type[i][j] indicates 3, this may represent actual image content having a picture quality of a region in which the content of the guard band is packed.

Quality may specify information about the encoding quality of each region. In one example, the best quality may be represented when the information indicates 10, the worst quality when the information indicates 0, and the default quality when the information indicates 5.

projRegwidth may specify information about the width of each projected region.

projRegheight may specify information about the height of each projected region.

projRegtop may specify information about the top sample row of each projected region in a projected picture or a constituent picture of the projected picture.

projRegleft may specify information about the leftmost sample column of each projected region in a projected picture or a constituent picture of the projected picture.

packedPicturewidth may specify information about the width of a sample row of each packed region.

packedPictureheight may specify information about the height of a sample column (or row) of each packed region.

packedRegtop may specify information about the top sample row of each packed region.

packedRegleft may specify information about the leftmost sample column of each packed region.

The metadata in Table 22 below corresponds to an example of metadata for the region-wise packing type.

TABLE 22

```
<!-Partial Coverage Type Description details -->
    <xs:complexType name="PartialCoverType">
        <xs:all>
            <xs:element type="xs:integer"
            name="PartialCoverCenterYaw"/>
            <xs:element type="xs:string"
            name="PartialCoverCenterRoll"/>
            <xs:element type="xs:string"
            name="PartialCoverCenterPitch"/>
            <xs:element type="xs:string" name="PartialCoverHor"/>
            <xs:element type="xs:string" name="PartialCoverVer"/>
```

TABLE 22-continued

```
        <xs:element type="xs:string" name="CoverType"/>
        <xs:element type="xs:string" name="InfoOfRestRegion"/>
    </xs:all>
</xs:complexType>
```

PartialCoverage_center may be configured to transmit only a part of the 360 video, and may indicate the values of the center of a position in transmitting a region at the position based on spherical coordinates. The angle of each element may increase clockwise from the point of view directed from the origin to the positive end of each axis. PartialCoverageCenterYaw may be specified based on the Z (up) axis. PartialCoverage_center_yaw may have a value greater than or equal to −90 and less than 90. This information may be used when the FLUS source designates some of the stitched regions at the request from the FLUS sink, or may be used when the FLUS source separates some regions in accordance with a predetermined value and sends the same to the FLUS sink.

PartialCoverageCenterRoll may be an angle value by which rotation about the X (back-to-front) axis is performed, and may be greater than or equal to −180 degrees and less than +180. This information may be used when the FLUS source designates some of the stitched regions at the request from the FLUS sink, or may be used when the FLUS source separates some regions in accordance with a predetermined value and sends the same to the FLUS sink.

PartialCoverageCenterPitch may be a value by which rotation about the Y (lateral, side-to-side) axis is performed, and may be greater than or equal to −180 degrees and less than +180. This information may be used when the FLUS source designates some of the stitched regions at the request from the FLUS sink, or may be used when the FLUS source separates some regions in accordance with a predetermined value and sends the same to the FLUS sink.

PartialCoverage may be configured to define a PartialCoverage region based on PartialCoverage_center, and may define PartialCoverHor (or PartialCoverage_horizontal) and PartialCoverVer (or PartialCoverage_vertical). It is declared along with PartialCoverage_center. PartialCoverHor indicates a horizontal direction with respect to PartialCoverage_center, and PartialCoverVer indicates a vertical direction with respect to PartialCoverage_center. This information may be used when the FLUS source designates some of the stitched regions at the request from the FLUS sink, or may be used when the FLUS source separates some regions in accordance with a predetermined value and sends the same to the FLUS sink.

CoverType is used to indicate the form of the PartialCoverage region on the sphere when declaring the the PartialCoverage region. It may represent the form of four great circles when equal to 0, and may represent the form of two yaws and two pitches when equal to 1.

InforOfRestRegion may specify processing information about a region that is not included in the PatialCoverage region.

The metadata in Table 23 below corresponds to an example of metadata for the sync type.

TABLE 23

```
<!--Sync Type Description details -->
    <xs:complexType name="SyncType">
        <xs:all>
            <xs:element type="xs:integer" name="CapturedTime"/>
            <xs:element type="xs:string" name="spatialAlignment"/>
            <xs:element type="xs:string" name="startTime"/>
        </xs:all>
    </xs:complexType>
```

CapturedTime may specify information about a time at which each stream is captured. When the sync function is supported in stitching or packing streams later, stitching and packing may be performed after establishing synchronization based on the capture time of each stream.

When videos are not balanced on the horizontal axis and the vertical axis, coordinate system alignment such as rotation may be performed, and spatialAlignment may include information about coordinate system alignment.

startTime represents the start time of each media stream such as audio/video/text. This information may be used to establish synchronization between streams having different start times. When the sync function is supported, stitching and packing may be performed after establishing synchronization based on the information. Even in the case of the same video type, stitching may be performed after establishing synchronization based on the start times.

The metadata in Table 24 below corresponds to an example of metadata for the fisheye camera type.

TABLE 24

```
<!--Fisheye CameraType Description details -->
    <xs:complexType name="fishcameraType">
        <xs:all>
            <xs:element type="xs:byte" name="numberOfcircular"/>
            <xs:element type="xs:string" name="imageCenterX"/>
            <xs:element type="xs:string" name="imageCenterY"/>
            <xs:element type="xs:string" name="recRegionTop"/>
            <xs:element type="xs:string" name="recRegionLeft"/>
            <xs:element type="xs:string" name="recRegionWidth"/>
            <xs:element type="xs:string" name="recRegionHeight"/>
            <xs:element type="xs:string" name="FullRadius"/>
            <xs:element type="xs:string" name="SceneRadius"/>
            <xs:element type="xs:string" name="CameraCenterAzimuth"/>
            <xs:element type="xs:string" name="CameraCenterElevation"/>
            <xs:element type="xs:string" name="CameraCenterTilt"/>
            <xs:element type="xs:string" name="CameraCenterOffsetX"/>
            <xs:element type="xs:string" name="CameraCenterOffsetY"/>
            <xs:element type="xs:string" name="CameraCenterOffsetZ"/>
            <xs:element type="xs:string" name="FieldOfView"/>
            <xs:element type="xs:integer" name="NumPolyCoefDistortion"/>
            <xs:element type="xs:string" name="PolyCoefKDistortion"/>
            <xs:element type="xs:byte" name="ImageFlip"/>
            <xs:element type="xs:string" name="ImageScaleAxisAngle"/>
            <xs:element type="xs:string" name="ImageScaleX"/>
            <xs:element type="xs:string" name="ImageScaleY"/>
            <xs:element type="xs:string" name="NumPolyCoefIsc"/>
        <xs:element type="xs:string" name="NumPolyCoefIscR"/>
        <xs:element type="xs:string" name="NumPolyCoefIscG"/>
        <xs:element type="xs:string" name="NumPolyCoefIscB"/>
            <xs:element type="xs:string" name="NumAngleforDisplayFOV"/>
            <xs:element type="xs:string" name="DisplayedFOV"/>
            <xs:element type="xs:string" name="OverlappedFOV"/>
            <xs:element type="xs:interger" name="NumLocalFOVRegion"/>
```

TABLE 24-continued

```
    <xs:element type="xs:string" name="StartRadius"/>
    <xs:element type="xs:string" name="EndRadius"/>
    <xs:element type="xs:string" name="StartAngle"/>
    <xs:element type="xs:string" name="EndAngle"/>
    <xs:element type="xs:string" name="RadiusDelta"/>
    <xs:element type="xs:string" name="AngleDelta"/>
    <xs:element type="xs:string" name="LocalFOVWeight"/>
    <xs:element type="xs:string" name="NumDeadzones"/>
    <xs:element type="xs:string" name = "Quality"/>
    <xs:element type="xs:string"
    name="DeadzoneLeftHorOffset"/>
    <xs:element type="xs:string"
    name="DeadzoneTopVerOffset"/>
    <xs:element type="xs:string" name="DeadzoneWidth"/>
    <xs:element type="xs:string" name="DeadzoneHeight"/>
  </xs:all>
</xs:complexType>
``` numberOfcircular may specify information about the number of circular images in each sample of the coded picture, and the like. For example, the information about num_circular_images may indicate 2, but examples are not limited thereto.

imageCenterX may indicate the horizontal coordinate of the center of the circular image in each sample of the coded picture in units of luma samples, and may correspond to a fixed-point value of 16.16.

imageCenterY may indicate the vertical coordinate of the center of the circular image in each sample of the coded picture in units of luma samples, and may correspond to a fixed point value of 16.16.

recRegionTop, recRegionLeft, recRegionWidth and recRegionHeight may indicate the coordinates, width and height of the top-left corner of a rectangular region containing a cropped or uncropped fisheye circular image. This information may be expressed in units of luma samples.

FullRadius may indicate a full-radius in units of luma samples, which means the distance from the center to the edge of the circular image corresponding to the maximum field of view of the fisheye lens specified by field_of_view. The information about full_radius may correspond to a fixed point value of 16.16.

SceneRadius may indicate a scene-radius, which is a distance from the center of the circular image to the nearest edge of a region in an image without obstruction of the camera body, in units of luma samples. In one example, the (enclosed) region may correspond to a recommended region for stitching provided by a content provider. The scene-radius information may correspond to a fixed point value of 16.16.

CameraCenterAzimuth and CameraCenterElevation may represent the center of a sphere region corresponding to the center of the circular image. camera_center_azimuth may be included in a range of $-180 \times 2^{16}$ to $180 \times 2^{16}-1$. camera_center_elevation may be included in a range of $-90 \times 2^{16}$ to $90 \times 2^{16}$.

CameraCenterTilt may specify information about a tilt angle of a center of a sphere region corresponding to the center of the circular image, and the like. The information about camera_center_tilt may be included in a range of $-180 \times 2^{16}$ to $180 \times 2^{16}$.

Information about CameraCenterOffsetX, CameraCenterOffsetY, and CameraCenterOffsetZ may indicate the XYZ offset values of the focal center of each fisheye camera lens from the focal center origin of the overall fisheye camera configuration in millimeters. This information may correspond to a fixed point value of 16.16.

FieldOfView may indicate the field of view of the fisheye lens in degrees. The information may correspond to a fixed point value of 16.16. The field_of_view of a hemispherical fisheye lens may be, for example, 180.0.

NumPolyCoefDistortion may indicate an integer representing the number of polynomial coefficients. This information may correspond to a maximum order of the polynomial plus 1.

PolyCoefDistortion may indicate polynomial coefficient values representing coefficients in a polynomial for converting a radius r to an angle θ. This information may correspond to a fixed point polynomial coefficient value of 8.24. PolyCoefDistortion may be described based on Equation 8 below.

$$\theta = \Sigma_{i=1}^{N} p_{i-1} \cdot r^{i-1} \qquad \text{Equation 8}$$

In Equation 8, p may denote PolyCoefDistortion, and N may denote NumPolyCoefDistortion. The normalized image coordinates $(u_N, v_N)$ may be calculated by multiplying r by a normal vector $(x_c, y_c)$.

ImageFlip may indicate whether an image is flipped and how the image is flipped. Reverse flipping may be performed based on the information about image_flip. When the information indicates 0, this may represent that the image is not flipped. When the information indicates 1, this may represent that the image is vertically flipped. When the information indicates 2, this may represent that the image is horizontally flipped. When the information indicates 3, this may represent that the image is flipped horizontally and vertically.

ImageScaleAxisAngle, ImageScaleX, and ImageScaleY may indicate whether an image is scaled along an axis, and how the image is scaled, and may correspond to three fixed point values of 16.16. The information may be used in considering a natural error in camera-mirror settings. The axis may be defined by a single angle value indicated by ImageScaleAxisAngle. When the single angle is 0, the horizontal vector may be perfectly horizontal, and the vertical vector may be perfectly vertical. The values of ImageScaleX and ImageScaleY may indicate scaling. In one example, the information about image_scale_axis_angle, the information about image_scale_x, and the information about image_scale_y may be expressed as Equation 9 below.

$$\begin{bmatrix} u \\ v \end{bmatrix} = \begin{bmatrix} c & d \\ e & 1 \end{bmatrix} \begin{bmatrix} u_N \\ v_N \end{bmatrix} + \begin{bmatrix} c_x \\ c_y \end{bmatrix} \qquad \text{Equation 9}$$

In Equation 9, (u, v) may represent information about pixels of an actual image, $(u_N, u_N)$ may represent information about pixels of an ideal image, and $c_x$ and $c_y$ may represent information about ImageCenterX and information about ImageCenterY, respectively. In the equation, c, d, and e may denote ImageScaleX, ImageScaleAxisAngle and ImageScaleY, respectively.

NumPolyCoefIsc, NumPolyCoefIscR, NumPolyCoefIscG, and NumPolyCoefIscB may represent lens shading compensation (LSC) parameters for compensating for shading artifacts of the fisheye lens, which reduce colors in the radial direction. The information may correspond to 8.24 of a fixed point format. A compensation weight to be multiplied by the original color may be approximated to a curve function in relation to the radius from the center of the image, based on Equation 10 below.

$$w = \Sigma_{i=1}^{N} p_{i-1} \cdot r^{i-1} \qquad \text{Equation 10}$$

The weighting factors for R, G, and B may be independently calculated when p is represented by polynomial_coefficient_K_lsc_R, polynomial_coefficient_K_lsc_G, and polynomial_coefficient_K_lsc_B, respectively. r may be a corresponding radius from the center of the image after being normalized by the full radius. N may be represented by num_polynomial_coefficients_lsc.

NumAngleforDisplayFOV may indicate the number of angles for displaying fov. Depending on the number of NumAngleforDisplayFOV, multiple values of DisplayedFov and OverlappedFOV may be defined at equal intervals. For example, they may be defined at equal intervals clockwise starting at 12 o'clock.

DisplayedFov may indicate a field of view for a portion of a circular image including overlapped circular images from adjacent circular images, which is recommended to be used in displaying without blending of the adjacent circular images.

OverlappedFOV may indicate a field of view for a portion of a circular image including overlapped circular images from adjacent circular images, which is recommended to be used in displaying by blending with the adjacent circular images.

NumLocalFOVRegion may specify information about the number of local fitting circular regions having different fields of view.

StartRadius, EndRadius, StartAngle and EndAngle may indicate a circular region for local fitting/warping for changing the actual field of view for local display. StartRadius and EndRadius may indicate the minimum and maximum values of a radius, and may correspond to a fixed point value of 16.16. StartAngle and EndAngle may indicate minimum and maximum angles that start at 12 o'clock and increase clockwise in units of $2^{-16}$ degrees clockwise. StartAngle and EndAngle may be values in a range of $-180 \times 2^{16}$ to $180 \times 2^{16}$, inclusive.

RadiusDelta may indicate a delta radius value for indicating a different field of view for each radius. This information may correspond to a fixed point value of 16.16.

AngleDelta may indicate a delta angle value for indicating a different field of view for each angle in units of $2^{-16}$ degrees.

LocalFOVWeight may indicate a weighting value for the field of view of a position derived by StartRadius, EndRadius, StartAngle, EndAngle, information about angle index i, and information about radius index j. This information may correspond to a fixed point format 8.24. When the value of LocalFOVWeight is positive, this may mean expansion of the field of view. When the value of LocaFOVWeight is negative, this may mean contraction of the field of view.

NumDeadzones may specify information about the number of dead zones in the coded picture of each sample as an integer.

Quality may specify information about the encoding quality of an image or video captured by a fisheye camera. The best quality may be represented when the information indicates 10, the worst quality when the information indicates 0, and the default quality when the information indicates 5.

DeadzoneLeftHorOffset, DeadzoneTopVerOffset, DeadzoneWidth, and DeadzoneHeight may specify information about the position and size of a dead zone rectangular region where pixels are not available. DeadzoneLeftHorOffset and DeadzoneTopVerOffset may indicate vertical and horizontal coordinates of the top left corner of the dead zone in the coded picture in units of luma samples. DeadzoneWidth and DeadzoneHeight may indicate the width and height of a dead zone in units of luma samples. To save bits for representing a video, all pixels in the dead zone may be set to the same pixel value (e.g., black).

The metadata in Table 25 below corresponds to an example of metadata about camera characteristics.

TABLE 25

```
<!- camera characteristics Description details -->
    <xs:complexType name="CameraType">
        <xs:all>
            <xs:element type="xs:string"
            name="CameraCaptureType"/>
                <xs:element type="xs:integer"
                name="NumOfCamera"/>
                <xs:element type="xs:integer"
                name="NumStreamPerOneCam"/>
                    <xs:element type="xs:date" name="CaptureTime"/>
            <xs:element type="xs:string"
            name="cameraResolution"/>
            <xs:element type="xs:string"
            name="CaptureImageFormat"/>
            <xs:element type="xs:string" name="sensorType"/>
            <xs:element type="xs:string" name="lensMode"/>
            <xs:element type="xs:string" name="lensDistortion"
            minOccurs="0"/>
            <xs:element type="xs:string" name="FOV"/>
            <xs:element type="intrinsicParameterType"
            name="intrinsicParameter"/>
            <xs:element type="extrinsicParameterType"
            name="extrinsicParameter"/>
        </xs:all>
    </xs:complexType>
```

CameraCaptureType may indicate the type of capture camera, such as Fisheye, 360 Camera, 2D camera, 2D camera with rig, or stereoscopic.

When the type is Fisheye, 360 Camera, or 2D camera, NumOfCamera may indicate the number of lenses used to capture an image or video of one stream. When the type is 2D camera with rig, NumOfCamera may indicate the number of spots captured by the 2D camera while moving using the rig.

NumStreamPerOneCam may indicate the number of streams that may be acquired with one camera in capturing a video or image. In the case of the fisheye type, two streams may be acquired per camera, and accordingly this information may be needed.

CaptureTime may record and deliver the time at which each stream is captured. When the sync function is supported in stitching or packing streams later, synchronization may be established based on the capture time of each stream.

CameraResolution may include information about the resolution of the original captured video or image (the video or image delivered to the FLUS source).

CaptureImageFormat may include information about the image format of the original captured video or image (the video or image delivered to the FLUS source).

sensorType represents the type of a sensor used when the camera captures an image or video. The information may be used for image processing later.

lensMode may specify information about the mode of the lens in capturing an image or video.

lensDistortion may indicate the degree of distortion of the lens in capturing an image or video.

FOV may specify a field-of-view that may be represented by one camera. As values to deliver the field-of-view of each captured image, FoV_H and FoV_W may be declared for the FOV. FOV may be declared as a region that may be horizontally or vertically symmetric with respect to camera_center. Each value may always be greater than 0 and not greater than 360.

intrinsicParameterType may indicate a camera parameter that links pixel coordinates of an image point to corresponding coordinates of a camera reference frame.

extrinsicParameterType may include camera parameters for defining the position and orientation of the camera reference frame in relation to the world reference frame.

The metadata in Table 26 below corresponds to another example of metadata about camera characteristics.

TABLE 26

```
<!- camera characteristics Description details -->
    <xs:complexType name="intrinsicParameterType">
        <xs:all>
            <xs:element type="xs:integer" name="RefViewID"/>
            <xs:element type="xs:string name="precfocalLength"/>
            <xs:element type="xs:string name="precprincipalpoint"/>
            <xs:element type="xs:string name="precskewfactor"/>
            <xs:element type="xs:string"
            name="exponentfocalLength"/>
            <xs:element type="xs:string"
            name="mantissafocalLength"/>
            <xs:element type="xs:string"
            name="exponentprincipalpoint"/>
            <xs:element type="xs:string"
            name="mantissaprincipalpoint"/>
            <xs:element type="xs:string"
            name="expoenentskewfactor"/>
            <xs:element type="xs:string"
            name="mantissaskewfactor"/>
        </xs:all>
</xs:complexType>
```

RefViewID may specify ID information for identifying a view indicated by the Intrinsic Camera Parameters Box based on the intrinsic camera parameters.

precfocalLength may specify information about the exponential of the maximum allowable truncation error for focal_length_x and focal_length_y given by 2-prec_focal_length.

precprincipalpoint may specify information about the exponential of the maximum allowable truncation error for principal_point_x and principal_point_y given by 2-prec_principal_point.

Precskewfactor may specify information about the exponential of the maximum allowable truncation error for the skew factor given by 2-prec_skew_factor.

exponentfocalLength may specify at least one of information about the exponential part of the horizontal focal length and information about the exponential part of the vertical focal length.

mantissafocalLength may specify at least one of information about the mantissa part of the horizontal focal length and information about the mantissa part of the vertical focal length.

exponentprincipalpoint may specify at least one of information about the exponential part of the horizontal principal point and information about the exponential part of the vertical principal point.

mantissaprincipalpoint may indicate at least one of information about the mantissa part of the horizontal principal point and information about the mantissa part of the vertical principal point.

exponentskewfactor may specify information about the exponential part of the skew factor.

mantissaskewfactor may specify information about the mantissa part of the skew factor.

The metadata in Table 27 below corresponds to another example of metadata about camera characteristics.

TABLE 27

```
<!- camera characteristics Description details -->
    <xs:complexType name="extrinsicParameterType">
        <xs:all>
            <xs:element type="xs:string" name="rotation"/>
            <xs:element type="xs:string" name="translation"/>
            <xs:element type="xs:string" name="exponentR"/>
            <xs:element type="xs:string" name="mantissaR"/>
            <xs:element type="xs:string" name="exponentT"/>
            <xs:element type="xs:string" name="mantissaT"/>
        </xs:all>
</xs:complexType>
```

The "rotation" may specify information about the exponential of the maximum allowable truncation error for r[j][k] given by 2-prec_rotation_param.

The "translation" may specify information about the exponential of the maximum allowable truncation error for t[j] given by 2-prec_translation_param.

"exponentR" may specify information about the exponential part of the (j, k) component of a rotation matrix.

"mantissaR" may specify information about the mantissa part of the (j, k) component of the rotation matrix.

"exponentT" may specify information about the exponential part of the j-th component of a translation vector. In one example, the value of exponent_t[j] may be included in a range of 0 to 62, inclusive.

"mantissaT" may specify information about the mantissa part of the j-th component of the translation vector. In one example, the value of mantissa_t[j] may be included in a range of 0 to 62, inclusive.

The metadata in Table 28 below corresponds to an example of metadata about the video type.

TABLE 28

```
<!-- video data description -->
    <xs:complexType name="videoType">
        <xs:all>
            <xs:element type="xs:string" name="VideoCaptureType"/>
            <xs:element type="xs:string" name="EncodingType"/>
            <xs:element type="xs:string" name="Resolution"/>
            <xs:element type="xs:string" name="ChromaFormat"/>
            <xs:element type="xs:string" name="ColorGamut"/>
            <xs:element type="xs:string" name="TransferFunction"/>
            <xs:element type="xs:string" name="ImageFileFormat"/>
            <xs:element type="xs:string" name="ImageFrameSize"/>
            <xs:element type="xs:string" name="BitDepth"/>
            <xs:element type="xs:string" name="FrameRate"/>
            <xs:element type="xs:string" name="PictureAspectRatio"/>
            <xs:element type="xs:string" name="ColorSampling"/>
            <xs:element type="xs:string" name="WhitePoint"/>
            <xs:element type="xs:string" name="PeakLuminance"/>
            <xs:element type="xs:string"
            name="AverageLuminance"/>
            <xs:element type="xs:string" name="CodecConfig"/>
            <xs:element type="xs:byte" name="Quality"/>
        </xs:all>
    </xs:complexType>
```

"VideoCaptureType" may define whether the video type is a general 2D video or an image, an image/video captured with a 360 camera, a stereoscopic image, or an image captured with a fisheye camera.

"EncodingType" may define whether the encoding type of the captured image is HEVC/H.265 or AVC/H.264, what the profile level is, and so on.

"Resolution" may define the resolution of each captured video stream, which may correspond to 1920×1080, 1280×1200, 3840×2160, or the like.

"ChromaFormat" may define the color space of the captured image, which may be YCbCr, RGB, XYZ, or the like.

"ColorGamut" may define the container gamut of the captured image, which may be BT.709, BT.2020, DCI P3, or the like.

"TransferFunction" may define the transfer function of the captured image, which may be BT.709, BT.2020, HDR PQ10, HLG, or the like.

"ImageFileFormat" may define the file format of the captured image, which may be JPEG, EXR, BMP, RAW, MP4, or the like.

"ImageFrameSize" may define the frame size of the captured image.

"BitDepth" may define the bitdepth of the captured image, which may be 8 bits, 10 bits, 12 bits, or the like.

"FrameRate" may define the frame rate of the captured video, which may be 25p, 30p, 48p, 50p, 60p, 90p, 120p, or the like.

"PictureAspectRatio" may define the ratio of width to width of the captured video, which may be 2:1, 16:9, 1:1, 3:2, or the like.

"ColorSampling" may specify information about downsampling of the captured video, which may be 4:4:4, 4:2:2, 4:2:0, or the like.

"WhitePoint" may indicate the color value of white of the captured video

"PeakLuminance" may define the highest luminance value among the luminance values of the pixel values present in one frame of the captured video.

"AverageLuminance" may define the average value of luminance of the pixel values present in one frame of the captured video.

"CodecConfig" may be configured to send the parameter of Format to the FLUS sink or the FLUS source. In encoding, codec may be applied to video or images in accordance with a setting value to be executed in accordance with the encoding type.

"Quality" may be configured to designate the quality of encoding at the time of entire encoding, and have a value between 0 and 10. It may represent the best quality when equal to 10, the worst quality when equal to 0, and the default when equal to 5.

The metadata in Table 29 below corresponds to an example of metadata about the audio capture arrangement.

TABLE 29

```
<!-- audio capture arrangement details -->
    <xs:complexType name="audioArrangementType">
        <xs:all>
            <xs:element type="xs:byte"
            name="numberOfMicrophones"/>
            <xs:element type="xs:string"
            name="microphoneLocation"/>
        </xs:all>
    </xs:complexType>
```

"numberOfMicrophones" may indicate the number of microphones used for audio capture.

"microphoneLocation" may indicate the location of each microphone during audio capture.

The metadata in Table 30 below corresponds to an example of metadata about the audio capture characteristics.

TABLE 30

```
<!-- audio capture characteristics -->
    <xs:complexType name="audioCharacteristicsType">
        <xs:all>
            <xs:element type="xs:string" name="microphoneType"/>
            <xs:element type="xs:string" name="audioFormat"/>
```

TABLE 30-continued

```
            <xs:element type="xs:byte" name="numberChannels"/>
            <xs:element type="xs:byte" name="audioSampleRate"/>
            <xs:element type="xs:byte" name="outputSampleRate"/>
            <xs:element type="xs:string"
            name="audioChannelAzimuth"/>
            <xs:element type="xs:string"
            name="audioChannelElevation"/>
        </xs:all>
    </xs:complexType>
```

"microphoneType" may indicate the type of a microphone. The microphone types may include omnidirectional, bidirectional, cardioid, and hypercardioid mictrophones.

"audioFormat" may indicate the format of the audio source after being captured. The format may be MP3, AC3, AAC, TTA, AU, WAV, or the like.

"numberChannels" may indicate the number of channels through which the audio source may be output after being processed by an engineer or a producer.

"audioSampleRate" may indicate the sample rate of the audio source, which may be 44.1 kHz, 48 kHz, or the like.

"outputSampleRate" may separately define the sample rate for audio output, which may be 44.1 kHz, 48 kHz, or the like.

When outputting audio, "audioChannelAzimuth" may indicate the direction of sound based on the angle of rotation in a direction parallel to the ground among the output directions.

When outputting audio, "audioCahnnelElevation" may indicate the direction of sound based on the angle of rotation in a direction vertical to the ground among the output directions.

The metadata in Table 31 below corresponds to an example of metadata for the audio capture data.

TABLE 31

```
<!-- audio capture data description -->
    <xs:complexType name="audioDataType">
        <xs:all>
            <xs:element type="xs:string"
            name="audioRecordingFromEachMicrophone"/>
            <xs:element type="xs:string"
            name="audioCaptureStartTime" minOccurs="0"/>
            <xs:element type="xs:string"
            name="audioPropagationTime" minOccurs="0"/>
            <xs:element type="xs:string"
            name="audioInitialTimeDelayGap" />
            <xs:element type="xs:string"
            name="audioEnergyDecayCover">
        </xs:all>
    </xs:complexType>
</xs:schema>
```

"audioRecodingFromEachMicrophone" may indicate an audio source recorded on each microphone.

"audioCaptureStartTime" may indicate the start time of captured audio.

"audioPropagationTime" may indicate the time taken for audio to arrive directly into the microphone without reflection after the time at which the audio begins to be captured by the microphone.

"audioInitialTimeDelayGap" may indicate the time taken for sound to be reflected, and returned to and captured and captured by the microphone from the audioPropagationTime.

"audioEnergyDecayCover" may indicate the time taken for the captured audio to be reduced by 10 dB from the audioPropagationTime. It may also be abbreviated as EDC. Using the EDC, the time taken to the moment at which RT60 (reverbertation 60 dB) is reached, that is, the audio is reduced by 60 dB to 40 dB given that propagationTime is 100 dB may be predicted.

Figure 27:
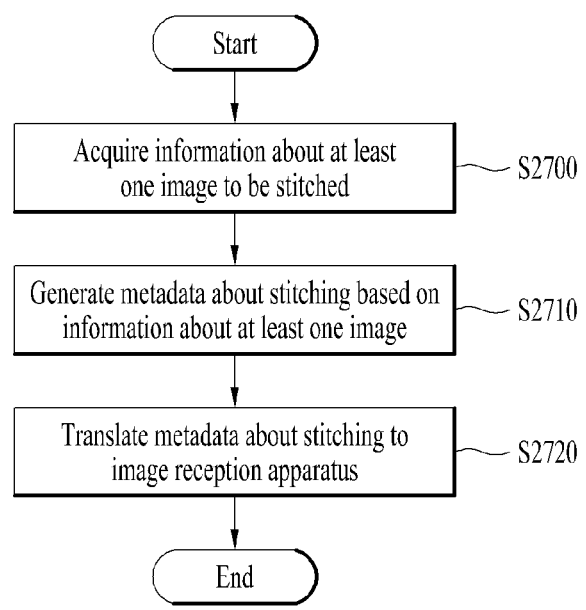
FIG. 27 is a flowchart illustrating an operation method of an image transmission apparatus in accordance with some embodiments.
Figure 28:
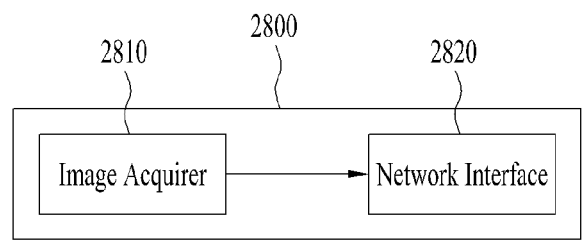
FIG. 28 is a block diagram illustrating the configuration of the image transmission apparatus in accordance with some embodiments.

FIG. 27 is a flowchart illustrating an operation method of an image transmission apparatus in accordance with some embodiments, and FIG. 28 is a block diagram illustrating the configuration of the image transmission apparatus in accordance with some embodiments.

Each operation disclosed in FIG. 27 may be performed by the 360 video transmission apparatus disclosed in FIG. 5, the 360 video transmission apparatus disclosed in FIG. 14A, or the FLUS source disclosed in FIGS. 17 to 22. In one example, S2700 of FIG. 27 may be performed by the data input unit of the 360 video transmission apparatus disclosed in FIG. 5, and S2710 of FIG. 27 may be performed by the metadata processor of the 360 video transmission apparatus disclosed in FIG. 5 or the packet-based network interface of the FLUS source disclosed in FIG. 22, and S2720 of FIG. 27 may be performed by the transmitter disclosed in FIG. 5 or the packet-based network interface of the FLUS source disclosed in FIG. 22. Therefore, in describing each operation of FIG. 27, description of details described with reference to FIGS. 5, 14A, and 17 to 22 will be omitted or simplified.

As illustrated in FIG. 28, an image transmission apparatus 2800 in accordance with some embodiments may include an image acquirer 2810 and a network interface 2820. However, in some cases, not all elements shown in FIG. 28 may be mandatory elements of the image transmission apparatus 2800, and the image transmission apparatus 2800 may be implemented by more or fewer elements than those shown in FIG. 28.

In the image transmission apparatus 2800 in accordance with some embodiments, the image acquirer 2810 and the network interface 2820 may be implemented as separate chips, or at least two elements may be implemented through one chip.

The image transmission apparatus 2800 in accordance with some embodiments may acquire information about at least one image to be stitched (S2700). More specifically, the image acquirer 2810 in accordance with some embodiments of the image transmission apparatus 2800 may acquire information about at least one image to be stitched.

The at least one image may include, for example, a 2D image (or video), an image (or video) captured by a 360 camera, a stereoscopic image, and an image captured with a fisheye camera. However, embodiments are not limited to the above-described example. In some cases, the at least one image may be referred to as at least one non-stitched image.

While S2700 limits that at least one image will be "stitched," stitching may not necessarily be performed on at least one image. That is, the S2700 should be interpreted as including some embodiments of acquiring information about at least one image on which "a determination related to stitching is to be performed."

In S2700, information about at least one image may be acquired in various ways. In one example, the image acquirer 2810 may be a capture device, and the at least one image may be captured directly by the capture device. In another example, the image acquirer 2810 may be a reception module configured to receive information about an image from an external capture device, and the reception module may receive the information about the at least one image from the external capture device. In another example, the image acquirer 2810 may be a reception module configured to receive information about an image from an external user equipment (UE) or a network, and the reception module may receive the information about the at least one image from the external UE or the network. The manner in which the information about the at least one image is acquired may be more diversified by linking the above-described examples and descriptions of FIGS. 25A to 26C.

The image transmission apparatus 2800 in accordance with some embodiments may generate metadata about stitching based on the acquired information on the at least one image (S2710). More specifically, the network interface 2820 in accordance with some embodiments of the image transmission apparatus 2800 may generate metadata about the stitching based on the information about the at least one image.

The metadata about the stitching refers to the metadata about the stitching described herein after the description of FIG. 26C. A person skilled in the art will readily understand that the "metadata about the stitching" in S2710 may be the same as/similar to the "metadata about the stitching described after the description of FIG. 26C in this specification," may be a concept including the "metadata about the stitching described after the description of FIG. 26C in this specification," or may be a concept included in the "metadata about the stitching described after the description of FIG. 26C in this specification."

The network interface 2820 in accordance with some embodiments may be a concept including an F-interface, an F-C, an F-U, an F reference point, and a packet-based network interface described above. In one embodiment, as shown in FIG. 22, the image transmission apparatus 2800 and the image reception apparatus may be separate devices, and the network interface 2820 may be present inside the image transmission apparatus 2800 as an independent module. In another embodiment, although the image transmission apparatus 2800 and the image reception apparatus are separate devices, the network interface 2820 may not be divided into an interface for the image transmission apparatus 2800 and an interface for the image reception apparatus, but may be interpreted as being shared by the image transmission apparatus 2800 and the image reception apparatus. In another embodiment, as shown in FIG. 21, the image transmission apparatus and the image reception apparatus are combined to form one (image transmission) apparatus 2800, and the network interface 2820 may be present in one (image transmission) apparatus 2800. However, operation of the network interface 2820 is not limited to the above-described examples or the above-described embodiments.

In one embodiment, the image transmission apparatus 2800 may receive metadata about stitching from the image reception apparatus, and may generate metadata about the stitching based on the metadata about stitching received from the image reception apparatus. More specifically, the image transmission apparatus 2800 may receive information (metadata) about image processing of the image reception apparatus from the image reception apparatus, and generate metadata about stitching based on the received information (metadata) about image processing of the image reception apparatus. Here, the information (metadata) about the image processing of the image reception apparatus may be generated based on the metadata about stitching received from the image transmission apparatus 2800 by the image reception apparatus.

In one example, the image transmission apparatus 2800 may determine whether the stitching is available, based on the information about stitching availability included in the metadata about the image processing of the image reception apparatus and the metadata about the stitching. When the image transmission apparatus 2800 determines that the stitching is available, the metadata about the stitching may include information about a case when the stitching is available.

In another example, the image transmission apparatus 2800 may determine whether packing is available based on the metadata about image processing of the image reception apparatus and information about packing availability. When the image transmission apparatus 2800 determines that the packing is available, the metadata about the stitching may contain information about a case when the packing is available.

In another example, the image transmission apparatus 2800 may determine whether region-wise packing is available, based on the metadata about image processing of the image reception apparatus and information about region-wise packing availability. When the image transmission apparatus 2800 determines that the region-wise packing is available, the metadata about the stitching may include information about a case when the region-wise packing is available.

In another example, the image transmission apparatus 2800 may determine whether a fisheye-related function is available, based on the metadata about image processing of the image reception apparatus and information about fisheye availability. When the image transmission apparatus 2800 determines that the fisheye-related function is available, the metadata about the stitching may contain information about a case when the fisheye-related function is available.

In another example, the image transmission apparatus 2800 may determine whether a partial coverage function is available, based on the metadata about image processing of the image reception apparatus and information about partial coverage availability. When the image transmission apparatus 2800 determines that the partial coverage function is available, the metadata about the stitching may contain information about a case when the partial coverage function is available.

In another example, the image transmission apparatus 2800 may determine whether a synchronization function is available, based on the metadata about image processing of the image reception apparatus and information about sync availability. When the image transmission apparatus 2800 determines that the synchronization function is available, the metadata about the stitching may contain information about a case when the synchronization function is available.

However, since the operations of the image transmission apparatus 2800 receiving the metadata about image processing of the image reception apparatus from the image reception apparatus and generating metadata about the stitching based on the received metadata about the image processing of the image reception apparatus are not mandatory, they may be omitted.

In S2710, the metadata about the stitching may not necessarily be generated based on the network interface 2820. In accordance with some embodiments, the image transmission apparatus 2800 may further include a metadata generator, wherein the metadata generator may generate metadata about the stitching based on the information about at least one image received from the image acquirer 2810.

In accordance with some embodiments, the image transmission apparatus 2800 may transmit the metadata about the stitching to the image reception apparatus (S2720). More specifically, the network interface 2820 in accordance with some embodiments of the image transmission apparatus 2800 may transmit the metadata about the stitching to the image reception apparatus.

In one embodiment, the image transmission apparatus 2800 and the image reception apparatus may transmit and receive data to and from each other based on FLUS in a wireless communication system. In one example, the image transmission apparatus 2800 and the image reception apparatus may transmit and receive data to and from each other using an F reference point.

In one embodiment, the image reception apparatus may generate information (metadata) about image processing of the image reception apparatus based on the metadata about the stitching received from the image transmission apparatus 2800, and transmit the generated information (metadata) about image processing of the image reception apparatus to the image transmission apparatus 2800. The image transmission apparatus 2800 may regenerate metadata about the stitching based on the metadata about image processing of the image reception apparatus received from the image reception apparatus, and transmit the regenerated metadata about the stitching to the image reception apparatus.

In accordance with the image transmission apparatus 2800 and the operation method of the image transmission apparatus 2800 disclosed in FIGS. 27 and 28, the image transmission apparatus 2800 may acquire information about at least one image to be stitched (S2700), generate metadata about stitching based on the information about the at least one image (S2710), and transmit the metadata about the stitching to an image reception apparatus (S2720). When S2700 to S2720 are applied in the FLUS system, the image transmission apparatus 2800, which is a FLUS source, may efficiently deliver the metadata about the stitching to the image reception apparatus, which is a FLUS sink, through uplink (UL) transmission. Accordingly, in the FLUS system, the FLUS source may efficiently deliver media information of 3DoF or 3DoF+ to the FLUS sink through UL transmission (and 6DoF media information may also be transmitted, but embodiments are not limited thereto).

Figure 29:
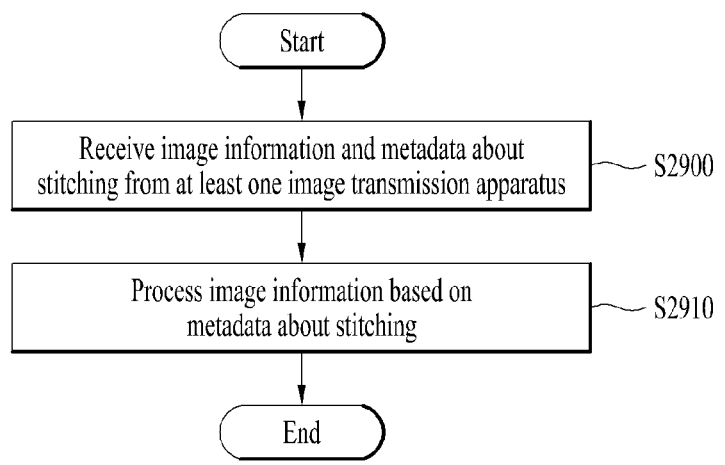
FIG. 29 is a flowchart illustrating an operation method of an image reception apparatus in accordance with some embodiments.
Figure 30:
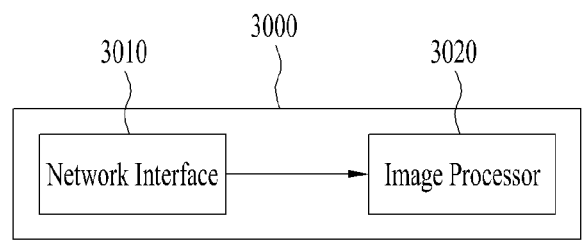
FIG. 30 is a block diagram illustrating the configuration of the image reception apparatus in accordance with some embodiments.

FIG. 29 is a flowchart illustrating an operation method of an image reception apparatus in accordance with some embodiments, and FIG. 30 is a block diagram illustrating the configuration of the image reception apparatus in accordance with some embodiments.

Each operation disclosed in FIG. 29 may be performed by the 360 video reception apparatus disclosed in FIG. 6, the 360 video reception apparatus disclosed in FIG. 14B, or the FLUS sink disclosed in FIGS. 17 to 22. In one example, S2900 of FIG. 29 may be performed by the receiver of the 360 video reception apparatus disclosed in FIG. 6, and S2910 of FIG. 29 may be performed by the metadata decoder, re-projection processor and renderer of the 360 video reception apparatus disclosed in FIG. 6, or by the audio decoder, video decoder, and timed media decoder of the FLUS source of FIG. 21. Therefore, in describing each operation of FIG. 29, description of details described with reference to FIGS. 6, 14B, and 17 to 22 will be omitted or simplified.

As illustrated in FIG. 30, the image reception apparatus 2900 in accordance with some embodiments may include a network interface 3010 and an image processor 3020. However, in some cases, not all elements shown in FIG. 30 may be mandatory elements of the image reception apparatus 3000, and the image reception apparatus 3000 may be implemented by more or fewer elements than those shown in FIG. 30.

In the image reception apparatus 3000 in accordance with some embodiments, the network interface 3010 and the image processor 3020 may be implemented as separate chips, or at least two elements may be implemented through one chip.

In accordance with some embodiments, the image reception apparatus 3000 may receive image information and metadata about stitching from at least one image transmission apparatus (S2900). More specifically, the network interface 3010 in accordance with some embodiments of the image reception apparatus 3000 may receive the image information and the metadata about stitching from the at least one image reception apparatus.

In one example, when stitching is not performed by the at least one image transmission apparatus, the image information may include information about at least one non-stitched image. In another example, when stitching is performed by the at least one image transmission apparatus, the image information may include information about a 360 video generated by stitching the at least one non-stitched image.

The metadata about the stitching refers to the metadata about the stitching described herein after the description of FIG. 26C. A person skilled in the art will readily understand that the "metadata about the stitching" in S2910 may be the same as/similar to the "metadata about the stitching described after the description of FIG. 26C in this specification," may be a concept including the "metadata about the stitching described after the description of FIG. 26C in this specification," or may be a concept included in the "metadata about the stitching described after the description of FIG. 26C in this specification."

In one example, the metadata about the stitching may contain at least one of information about image processing of the at least one image transmission apparatus, capability information about the at least one non-stitched image, information about a case when a partial coverage function is available, information about a case when a synchronization function is available, characteristics information about at least one camera for acquiring the at least one non-stitched image, information about a case when the stitching is available, information about a case when packing is available, information about a case when region-wise packing is available, or information about a case when a fisheye-related function is available. The details of each information contained in the metadata about the stitching are described above after the description of FIG. 26C in the specification.

The network interface 3010 in accordance with some embodiments may be a concept including an F-interface, an F-C, an F-U, an F reference point, and a packet-based network interface described above. In one embodiment, as shown in FIG. 22, the image transmission apparatus 2800 and the image reception apparatus 3000 may be separate devices, and the network interface 3010 may be present inside the image reception apparatus 3000 as an independent module. In another embodiment, although the image transmission apparatus 2800 and the image reception apparatus 3000 are separate devices, the network interface 3010 may not be divided into an interface for the image transmission apparatus 2800 and an interface for the image reception apparatus 3000, but may be interpreted as being shared by the image transmission apparatus 2800 and the image reception apparatus 3000. In another embodiment, the image transmission apparatus and the image reception apparatus are combined to form one (image reception) apparatus 3000, and the network interface 3010 may be present in one (image reception) apparatus 3000. However, operation of the network interface 3010 is not limited to the above-described examples or the above-described embodiments.

In one embodiment, the image transmission apparatus 2800 and the image reception apparatus 3000 may transmit and receive data to and from each other based on FLUS in a wireless communication system. In one example, the image transmission apparatus 2800 and the image reception apparatus 3000 may transmit and receive data to and from each other using an F reference point.

In one embodiment, the image reception apparatus 3000 may receive metadata about stitching from the image transmission apparatus 2800, and generate metadata about stitching (related to the image reception apparatus 3000) based on the metadata about stitching received from the image transmission apparatus 2800. More specifically, the image reception apparatus 3000 may receive metadata about stitching from the image transmission apparatus 2800, and generate information (metadata) about image processing of the image reception apparatus 3000 based on the metadata about the stitching received from the image transmission apparatus 2800. The image reception apparatus 3000 may transmit the information about image processing of the image reception apparatus 3000 to the image transmission apparatus 2800, and receive, from the image transmission apparatus 2800, metadata about stitching regenerated by the image transmission apparatus 2800 based on the information about image processing of the image reception apparatus 3000.

In one example, the metadata about the image processing of the image reception apparatus 3000 may contain at least one of information about stitching availability, information about stitching media required by the image reception apparatus, information about packing availability, information about a packing frame required by the image reception apparatus, information about a region required by the image reception apparatus in relation to the region-wise packing, information about partial coverage availability, information about a coverage required by the image reception apparatus in relation to the partial coverage function, information about a video media stream required by the image reception apparatus, information about an audio media stream required by the image reception apparatus, information about a text required by the image reception apparatus, information about sync availability, information about a playback start and a playback end time of the at least one non-stitched image required by the image reception apparatus, information about a maximum number of streams receivable by the image reception apparatus, information about a maximum number of at least one external terminal communicable with the image reception apparatus, or information about a maximum size of a file receivable by the image reception apparatus. The details of the metadata about the image processing of the image reception apparatus 3000 are described above after the description of FIG. 26C in the specification.

However, since the operations of the image reception apparatus 3000 generating metadata about the image processing of the image reception apparatus 3000 based on the metadata about the stitching received from the image transmission apparatus 2800 and transmitting the generated metadata about the image processing of the image reception apparatus 3000 to the image transmission apparatus 2800 are not mandatory, they may be omitted.

In accordance with some embodiments, the image reception apparatus 3000 may process the image information based on the metadata about the stitching (S2910). More specifically, the image processor 3020 in accordance with some embodiments of the image reception apparatus 3000 may process the image information based on the metadata about the stitching.

In one embodiment, the processing of the image information may include any information related to stitching, projection, packing, region-wise packing, decoding, decapsulation, rendering, distribution, metadata reception, metadata generation, metadata transmission, and the like for images, but is not limited thereto.

The image processor 3020 in accordance with some embodiments is a module for processing image information, and may include, for example, at least one of a renderer, a processor, or a distributor. However, depending on some embodiments, not all of the renderer, the processor, and the distributor may be included, or other modules may be included in addition to the renderer, the processor, and the distributor.

In accordance with the image reception apparatus 3000 and the operation method of the image reception apparatus 3000 disclosed in FIGS. 29 and 30, the image reception apparatus 3000 may receive image information and metadata about stitching from at least one image transmission apparatus (S2900), and process the image information based on the metadata about the stitching (S2910). When S2900 and S2910 are applied in the FLUS system, the image reception apparatus 3000, which is a FLUS sink, may receive the metadata about the stitching transmitted from the image transmission apparatus 2800, which is a FLUS source, through uplink. Accordingly, in the FLUS system, the FLUS sink may efficiently receive 3DoF or 3DoF+ media information from the FLUS source through uplink transmission of the FLUS source (and 6DoF media information may also be transmitted, but embodiments are not limited thereto).

Some of the modules included in the block diagrams of the image transmission apparatus 2800 and the image reception apparatus 3000 described above may be omitted or replaced by other modules performing similar/same operations in accordance with embodiments. Alternatively, modules other than those included in the block diagrams of the image transmission apparatus 2800 and the image reception apparatus 3000 may also be included as elements of the image transmission apparatus 2800 and the image reception apparatus 3000

Each of the above-described parts, modules, or units may be a processor or hardware part that executes successive procedures stored in a memory (or storage unit). Each of the operations described in the above-described embodiments may be performed by processors or hardware parts. Each module/block/unit described in the above-described embodiments may operate as a hardware element/processor. In addition, the methods described in the present disclosure may be executed as code. The code may be written in a recoding medium readable by a processor, and thus may be read by the processor provided by the apparatus.

While the methods in the above-described embodiments are described based on a flowchart of a series of operations or blocks, the present disclosure is not limited to the order of the operations. Some operations may take place in a different order or simultaneously. It will be understood by those skilled in the art that the operations shown in the flowchart are not exclusive, and other operations may be included or one or more of the operations in the flowchart may be deleted within the scope of the present disclosure.

When embodiments of the present disclosure are implemented in software, the above-described methods may be implemented as modules (processes, function, etc.) configured to perform the above-described functions. The module may be stored in a memory and may be executed by a processor. The memory may be inside or outside the processor, and may be connected to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The internal elements of the above-described apparatuses may be processors that execute successive processes stored in the memory, or may be hardware elements composed of other hardware. These elements may be arranged inside/outside the device.

The above-described modules may be omitted or replaced by other modules configured to perform similar/same operations in accordance with embodiments.

Each of the above-described parts, modules, or units may be a processor or hardware part that executes successive procedures stored in a memory (or storage unit). Each of the operations described in the above-described embodiments may be performed by processors or hardware parts. Each module/block/unit described in the above-described embodiments may operate as a hardware element/processor. In addition, the methods described in the present disclosure may be executed as code. The code may be written in a recoding medium readable by a processor, and thus may be read by the processor provided by the apparatus.

While the methods in the above-described embodiments are described based on a flowchart of a series of operations or blocks, the present disclosure is not limited to the order of the operations. Some operations may take place in a different order or simultaneously. It will be understood by those skilled in the art that the operations shown in the flowchart are not exclusive, and other operations may be included or one or more of the operations in the flowchart may be deleted within the scope of the present disclosure.

When embodiments of the present disclosure are implemented in software, the above-described methods may be implemented as modules (processes, function, etc.) configured to perform the above-described functions. The module may be stored in a memory and may be executed by a processor. The memory may be inside or outside the processor, and may be connected to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The invention claimed is:

1. A method of processing communication by an image transmission apparatus in a wireless communication system, the method comprising:
   capturing one or more pictures for 360 degree content;
   receiving metadata for image processing of an image reception apparatus from the image reception apparatus, the metadata for image processing of the image reception apparatus including information representing whether network based stitching is available, the network based stitching including an equirectangular stitching;
   generating information for the 360 degree content, wherein the information for the 360 degree content includes:

type information representing whether video stream of the 360 degree content is 360 stereo type video stream or not; and transmitting the information on the image transmission apparatus and media components for the 360 degree content to the image reception apparatus.

2. The method of claim 1,
wherein the information for the 360 degree content includes information for a case when a synchronization function is available, characteristics information for at least one camera for acquiring the at least one image, information for a case when packing is available, information for a case when region-wise packing is available or information for a case when a fisheye-related function is available.

3. The method of claim 2,
wherein the information for the 360 degree content includes at least one of information for media session types supported by the image transmission apparatus.

4. The method of claim 1, wherein,
the information for the 360 degree content includes:
information for the number of at least one stream acquirable by the image transmission apparatus;
ID information for the at least one stream;
information for a projection scheme used when a 360 video generated based on the stitching is projected onto a 2D image;
information for a frame rate of the 360 video;
information for a resolution of the 360 video;
information for a sample rate of the 360 video;
information for a chroma format of the 360 video;
information for an encoding quality of the at least one stream; or
information for an area covered by the at least one stream in the 360 video.

5. The method of claim 1, wherein the transmitting of the information on the image transmission apparatus by the image transmission apparatus is uplink (UL) transmission based on a Framework for Live Uplink Streaming (FLUS) system.

6. An image transmission apparatus for processing communication in a wireless communication system, comprising:
an image acquirer configured to capture one or more pictures for 360 degree content; and
a network interface configured to:
receive metadata for image processing of an image reception apparatus from the image reception apparatus, the metadata for image processing of the image reception apparatus including information representing whether network based stitching is available, the network based stitching including an equirectangular stitching;
generate information for the 360 degree content, wherein the information for the 360 degree content includes:
type information representing whether video stream of the 360 degree content is 360 stereo type video stream or not; and
transmit the information on the image transmission apparatus and media components for the 360 degree content to the image reception apparatus.

7. A method of processing communication by an image reception apparatus in a wireless communication system, the method comprising:
transmitting metadata for image processing of the image reception apparatus, the metadata for image processing of the image reception apparatus including information representing whether network based stitching is available;
receiving information on an image transmission apparatus and the media components from the image transmission apparatus, wherein:
the information on the image transmission apparatus is generated by determining whether the network based stitching is available based on the metadata for the image processing of the image reception apparatus, the information on the image transmission apparatus includes codec configuration for a video stream including media components and type information representing whether the video stream is 360 stereo type video stream or not; and
receiving the information on the image transmission apparatus and the media components and processing the media components.

8. The method of claim 7, wherein transmission of the information on the image transmission apparatus is uplink (UL) transmission based on a Framework for Live Uplink Streaming (FLUS) system.

* * * * *